United States Patent
Gu et al.

(10) Patent No.: US 6,892,230 B1
(45) Date of Patent: May 10, 2005

(54) DYNAMIC SELF-CONFIGURATION FOR AD HOC PEER NETWORKING USING MARK-UP LANGUAGE FORMATED DESCRIPTION MESSAGES

(75) Inventors: Ye Gu, Seattle, WA (US); Peter S. Ford, Carnation, WA (US); Holly Knight, Woodinville, WA (US); Yaron Y. Goland, Redmond, WA (US); Paul J. Leach, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/496,318

(22) Filed: Feb. 1, 2000

(Under 37 CFR 1.47)

Related U.S. Application Data

(60) Provisional application No. 60/139,137, filed on Jun. 11, 1999, and provisional application No. 60/160,235, filed on Oct. 18, 1999.

(51) Int. Cl.[7] .................. G06F 15/177; H04L 12/28
(52) U.S. Cl. ...................... 709/220; 370/254; 713/1
(58) Field of Search ................... 709/220, 217–219, 709/223, 224, 221, 230; 715/513; 370/254–258; 713/1

(56) References Cited

U.S. PATENT DOCUMENTS

| | | |
|---|---|---|
| 5,394,556 A | 2/1995 | Oprescu |
| 5,491,796 A * | 2/1996 | Wanderer et al. ........... 709/224 |
| 5,491,800 A | 2/1996 | Goldsmith et al. |
| 5,546,574 A | 8/1996 | Grosskopf et al. |
| 5,559,967 A | 9/1996 | Oprescu et al. |
| 5,627,964 A | 5/1997 | Reynolds et al. |
| 5,655,148 A | 8/1997 | Richman et al. |
| 5,748,980 A | 5/1998 | Lipe et al. |
| 5,764,930 A | 6/1998 | Staats |
| 5,787,246 A | 7/1998 | Lichtman et al. |
| 5,787,259 A | 7/1998 | Haroun et al. |
| 5,793,979 A | 8/1998 | Lichtman et al. |
| 5,809,331 A | 9/1998 | Staats et al. |
| 5,835,723 A * | 11/1998 | Andrews et al. ............ 709/226 |
| 5,881,230 A | 3/1999 | Christensen et al. |
| 5,903,728 A | 5/1999 | Semenzato |
| 5,903,894 A | 5/1999 | Reneris |

(Continued)

FOREIGN PATENT DOCUMENTS

| | | |
|---|---|---|
| WO | 99/35856 | 7/1999 |
| WO | WO 02/01833 | 1/2002 |

OTHER PUBLICATIONS

Network Working Group: Request for Comments (2563): DHCP Option to Disable Stateless Auto–Configuration in IPV4 Clients Troll, R., @Home Network, May 1999.*

(Continued)

*Primary Examiner*—Beatriz Prieto
(74) *Attorney, Agent, or Firm*—Klarquist Sparkman, LLP

(57) ABSTRACT

A device control model provides an integrated set of addressing, naming, discovery and description processes that enables automatic, dynamic and ad-hoc self-setup by devices to interoperate with other devices on a network. This permits a computing device when introduced into a network to automatically configure so as to connect and interact with other computing devices available on the network, without a user installation experience and without downloading driver software or persisting a configuration setup for connecting and interacting with such other computing devices. Upon completing interaction with such other devices, the computing device automatically releases the setup for such other devices so as to avoid persistent device configurations that might create a configuration maintenance and management burden.

18 Claims, 48 Drawing Sheets

U.S. PATENT DOCUMENTS

| | | | | |
|---|---|---|---|---|
| 5,938,752 A | | 8/1999 | Leung et al. | |
| 5,960,167 A | | 9/1999 | Roberts et al. | |
| 5,960,439 A | * | 9/1999 | Hamner et al. | 707/103 |
| 5,987,135 A | | 11/1999 | Johnson et al. | |
| 6,085,236 A | | 7/2000 | Lea | |
| 6,101,499 A | | 8/2000 | Ford et al. | |
| 6,115,545 A | * | 9/2000 | Mellquist | 709/220 |
| 6,122,362 A | | 9/2000 | Smith et al. | |
| 6,130,892 A | * | 10/2000 | Short et al. | 370/401 |
| 6,167,448 A | * | 12/2000 | Hemphill et al. | 709/224 |
| 6,173,316 B1 | * | 1/2001 | De Boor et al. | 709/218 |
| 6,185,613 B1 | | 2/2001 | Lawson et al. | |
| 6,230,307 B1 | | 5/2001 | Davis et al. | |
| 6,243,749 B1 | * | 6/2001 | Sitaraman et al. | 709/223 |
| 6,301,012 B1 | | 10/2001 | White et al. | |
| 6,304,895 B1 | | 10/2001 | Schneider et al. | |
| 6,330,597 B2 | | 12/2001 | Collin et al. | |
| 6,334,178 B1 | | 12/2001 | Cannon et al. | |
| 6,389,464 B1 | | 5/2002 | Krishnamurthy et al. | |
| 6,401,132 B1 | | 6/2002 | Bellwood et al. | |
| 6,438,744 B2 | | 8/2002 | Toutonghi et al. | |
| 6,446,123 B1 | | 9/2002 | Ballantine et al. | |
| 6,466,971 B1 | * | 10/2002 | Humpleman et al. | 709/220 |
| 6,487,167 B1 | * | 11/2002 | Shaio | 370/3.92 |
| 6,571,277 B1 | | 5/2003 | Daniels-Barnes et al. | |
| 6,587,148 B1 | | 7/2003 | Takeda et al. | |

OTHER PUBLICATIONS

Internet Eng. Task Force (Internet Draft): Simple Service Discovery Protocol/1.0, Cai, et. al., Microsoft Corporation, Apr. 1999, pp. 1–10.*

Network Working Group: Request for Comments (1048): BOOTP Vender Information Extensions, Prindeville, P., McGill University, Feb. 1988, pp. 1–7.*

Cai et al., Internet Eng. Task Force (Internet Draft): *Simple Service Discovery Protocol/1.0*, Microsoft Corporation, Apr. 1999, p. 1–17.

"An Overview of Java Technology," www.sun.com/access/articles/JavaUniverseOverview.html, Mar. 1998.

Berners–Lee, T. et al., "Uniform Resource Identifiers (URI): Generic Syntax," RFC 2396, p. 1–40, Aug. 1998.

Doraswamy, N., et al., *IPSec—The New Security Standard for the Internet, Intranets, and Virtual Private Networks*, Prentice–Hall, Inc., Chapter 4, "IPSec Architecture," pp. 57–79 (1999).

Doraswamy, N., et al., *IPSec—The New Security Standard for the Internet, Intranets, and Virtual Private Networks*, Prentice–Hall, Inc., Chapter 7, "The Internet Key Exchange (IKE)," pp. 99–128 (1999).

Harkins, D., et al., *The Internet Key Exchange (IKE)*, RFC 2409, The Internet Engineering Task Force, pp. 1–31 (Copyright © The Internet Society, 1998).

Harney, H., et al., *Group Key Management Protocol (GKMP) Specification*, RFC 2093, The Internet Engineering Task Force, pp. 1–19 (Jul. 1997).

Harney, H., et al., *Group Key Management Protocol (GKMP) Architecture*, RFC 2094, The Internet Engineering Task Force, pp. 1–17 (Jul. 1997).

Kempf et al., *Service Location Protocol for Enterprise Networks: Implementing and Deploying a Dynamic Service Finder*, Wiley & Sons, Inc., Chapter 3, "Service Location Protocol Version 1," p. 45–80 (1999), and Chapter 6, "Security," p. 157–172, (1999).

Kent, S., et al., *Security Architecture for the Internet Protocol*, RFC 2401, The Internet Engineering Task Force, pp. 1–49, (Copyright © The Internet Society, 1998).

Kohl, J., et al., *The Kerberos Network Authentication Service (V5)*, RFC 1510, The Internet Engineering Task Force, 152 pages (Sep. 1993).

Steiner, J., et al., *Kerberos: An Authentication Service for Open Network Systems*, pp. 1–15 (Undated).

Williams, A., *Securing Zeroconf Networks*, Internet–Draft, The Internet Engineering Task Force Zeroconf Group, pp. 1–14 (Nov. 2000).

Prindeville, P., Network Working Group: Request for Comments (1048): *BOOTP Vendor Information Extensions*, McGill University, Feb. 1988, p. 1–7.

Troll et al., Network Working Group: Request for Comments (2563): *DHCP Option to Disable Stateless Auto–Configuration in IPV4 Clients*, @Home Network, May 1999.

"Home Plug & Play ™: CAL–based Interoperability for Home Systems," *Home PNP™Specification, Version 1.0*, pp. 1–111, (Apr. 9, 1998).

"Home Plug & Play ™: CAL–based Interoperability for Home Systems," *Home PNP™Specification, Version 1.0*, pp. 1–111, (Apr. 9, 1998).

White Paper, "HAVi, the A/V digital network revolution," *HAVi Organization*, pp. 1–7 (1999).

"Specification of the Home Audio/Video Interoperability (HAVi) Architecture," *The HAVi Specification, Version 1.0* (Jan. 18, 2000).

Anderson, "FireWire System Architecture: Second Edition, IEEE 1394a", chapters 1–4 (1999).

Technical White Paper, "Jini Architectural Overview," *Sun Microsystems, Inc.* (1999).

"Salutation Consortium Frequently Asked Questions," *The Salutation Consortium*, pp. 1–6 (prior to filing date).

"Salutation Architecture Specification (Part–1), Version 2.0c," *The Salutation Consortium* (Jul. 1, 1999).

"How it works," *Thalia*, pp. 1–3 (prior to filing date).

"Sun Microsystems and Thalia Products Inc. to Collaborate to Co–Develop Network Software and Protocols for the Home, Results to Make Networked Appliances for the Home a Reality," *Sunbeam Corporation*, pp. 1–2 (2000).

"Sunbeam Joins Microsoft in the Universal Plug and Play Forum to Establish A 'Universal' Smart Appliance Technology Standard," *Sunbeam Corporation*, pp. 1–2 (2000).

"Time For Smart Talk Is Over, Sunbeam Trumps Small Appliance Industry with Smart Appliance Debut," *Sunbeam Corporation*, pp. 1–4 (2000).

"Lonworks Core Technology," *Echelon Corporation*, pp. 1–2 (2000).

"Underlying Protocol of Echelon's LONWORKS® Network Adopted as New ANSI Standard, Free Reference Implementation Available to Developers," *Echelon Corporation*, pp. 1–2 (2000).

Handley et al., "SIP: Session Initiation Protocol," *The Internet Society*, pp. 1–10 (Aug. 6, 2000).

Rosenberg et al., "SIP Extensions for Instant Messaging," *Internet Engineering Task Force*, pp. 1–30 (Jun. 15, 2000).

Rosenberg et al., "SIP Extensions for Presence," *Internet Engineering Task Force*, pp. 1–77 (Jun. 15, 2000).

Tsang et al., "Requirements for Networked Appliances: Wide–Area Access, Control, and Interworking," *Internet Engineering Task Force*, pp. 1–9 (Sep. 2000).

Tsang et al.; "SIP Extensions for Communicating with Networked Appliances," *Internet Engineering Task Force,* pp. 1–9 (Nov. 2000).

Moyer et al., "Framework Draft for Networked Appliances using the Session Initiation Protocol," *Internet Engineering Task Force,* pp. 1–31 (Nov. 2000).

Marples, "Naming and Accessing Network Appliances using extensions to the Session Initial Protocol," *SIP for Toaster,* Telcordia Technologies (2000).

"Networked Appliance," *AR Greenhouse,* Telcordia Technologies, pp. 1–2 (Dec. 15, 2000).

Moyer et al., "SIP for Light Bulbs, Using SIP to Support Communication with Networked Appliances," Telcordia Technologies (Aug. 2, 2000).

Bennett et al., "Integrating Presence with Multi–media Communications," *White Paper,* Dynamicsoft., pp. 1–18 (2000).

Rosenberg et al., "An Application Server Architecture for Communications Services," *White Paper,* Dynamicsoft., pp. 1–13 (2000).

"EIB Technology," EIB (2000).

Freeman et al., "JavaSpaces™ Principles, Patterns, and Practice," Addison–Wesley Longman, Inc., Reading, Massachusetts (1999, Sun Microsystems, Inc.).

Arnold et al., "The Jini™ Specification," Addison–Wesley Longman, Inc., Reading, Massachusetts (1999, Sun Microsystems, Inc.).

Edwards, "Core Jini ™, Second Edition," Prentice Hall PTR, Upper Saddle River, New Jersey (2001).

* cited by examiner-

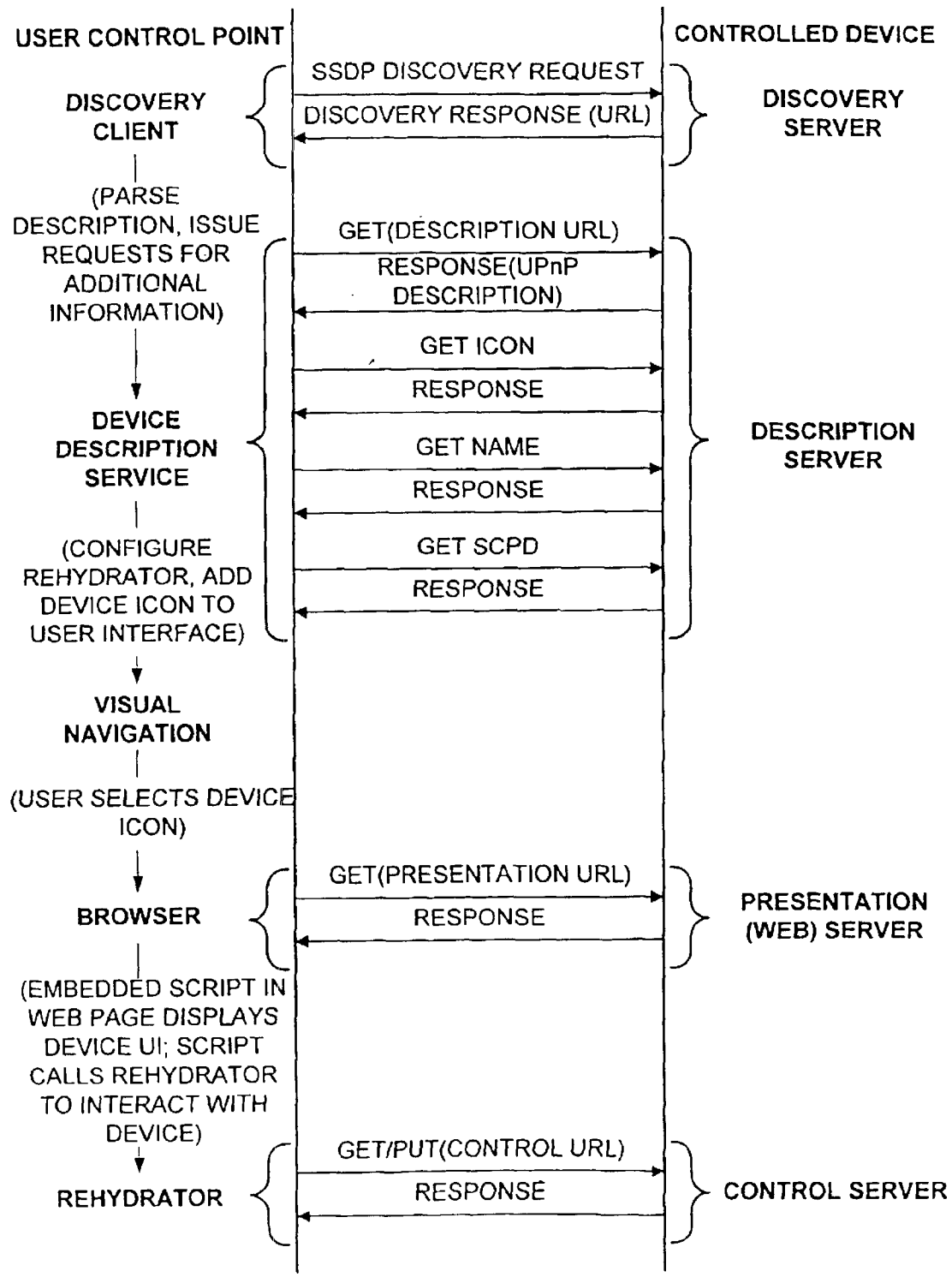

FIG. 15

```
root
    specVersionMajor
    specVersionMinor
    URLBase
    manufacturer
    manufacturerURL
    modelName
    modelNumber
    modelDescription
    modelURL
    UPC
    serialNumber
    device
        UDN
        friendlyName
    deviceType
    presentationURL
    iconList
        icon
            size
            color
            depth
            imageType
            imageURL
        icon
        icon
    service
        serviceType
        controlURL
        eventSubURL
        SCPD
    service
    service
    device
        service
        service
        device
            service
    device
    device
```

FIG. 16

```xml
<device>
  ...
  <iconList>
    <icon>
      <size>16</size>
      <color>0</color>
      <depth>8</depth>
      <imageType>PNG</imageType>
      <image>"http://device.local/iconpath/icon16bw.png"</image>
    </icon>
    <icon>
      <size>32</size>
      <color>0</color>
      <depth>8</depth>
      <imageType>PNG</imageType>
      <image>"http://device.local/iconpath/icon32bw.png"</image>
    </icon>
    <icon>
      <size>48</size>
      <color>0</color>
      <depth>8</depth>
      <imageType>PNG</imageType>
      <image>"http://device.local/iconpath/icon48bw.png"</image>
    </icon>
    <icon>
      <size>16</size>
      <color>1</color>
      <depth>8</depth>
      <imageType>PNG</imageType>
      <image>"http://device.local/iconpath/icon16c.png"</image>
    </icon><device>
    <icon>
      <size>32</size>
      <color>0</color>
      <depth>8</depth>
      <imageType>PNG</imageType>
      <image>"http://device.local/iconpath/icon32c.png"</image>
    </icon>
    <icon>
      <size>48</size>
      <color>0</color>
      <depth>8</depth>
      <imageType>PNG</imageType>
      <image>"http://device.local/iconpath/icon48c.png"</image>
    </icon>
    ...
  </iconList>
  ...
</device>
```

FIG. 17

```xml
<?xml version="1.0"?>
<scpd xmlns="x-schema:scpdl-schema.xml">
   <service StateTable>
      <stateVariable>
         <name>currentChannel</name>
         <dataType>number</dataType>
         <allowedValueRange>
            <minimum>0</minimum>
            <maximum>55</maximum>
            <step>1</step>
         </allowedValueRange>
      </stateVariable>
   </serviceStateTable>

<actionList>
      <action>
         <name>ChannelUp</name>
      </action>

<action>
         <name>ChannelDown</name>
      </action>

<action>
         <name>SetChannel</name>
         <argument>
            <name>newChannel</name>
   <relatedStateVariable>
currentChannel
   </relatedStateVariable>
         </argument>
      </action>
   </actionList>
</scpd>
```

FIG. 18

```xml
<contract>
  <protocol id="protocolDef">
    <HTTP version="1.1">
      <URL></URL>
      <M-POST>
        <MAN>http://www.microsoft.com/protocols/ext/XOAP</MAN>
      </M-POST>
      <HEADER name="Content-Type" value="text/xml" />
      <!-- Need to put in extension headers here -->
    </HTTP>

</protocol>

<RequestResponse name="queryStateVariable">
    <protocol is="protocolDef">
    <in is="queryStateVariable">
    <out is="queryStateVariableResponse">
    <error is="queryStateVariableResponse">
  </RequestResponse>

<RequestResponse name="invokeAction">
    <protocol is="protocolDef">
    <in is="SerializedStream">
    <out is="invokeActionResponse">
    <error is="invokeActionResponse">
  </RequestResponse>

<Schema name="upnp_scpdl"
    xmlns="urn:schemas-microsoft-com:xml-data"
    xmlns:dt="urn:schemas-microsoft-com:datatypes">

<!-- Common -->

<ElementType name="_return" content="textOnly" dt:type="string" />
    <ElementType name="_fault" content="textOnly" dt:type="string" />

<!-- Query State Variable Call -->

<ElementType name="variableName" content="textOnly" dt:type="string" />

<ElementType name="queryStateVariable" content="eltOnly" model="closed">
      <element type="variableName" />
    </ElementType>

<!-- Query State Variable Response -->
```

FIG. 19

```
...
    <ElementType name="queryStateVariableResponse" content="eltOnly"
model="closed">
        <group order="one">
          <element type="_return">
          <element type="_fault">
        </group>
    </ElementType>

<!-- Invoke Action Call -->

<AttributeType name="main" dt:type="idref" />
    <AttributeType name="headers" dt:type="idref" />
    <AttributeType name="id" dt:type="id" />

<ElementType name="sequenceNumber" content="textOnly" dt:type="int">
       <AttrbuteType name="dt" dt:type="string" dt:values="int" />

<attribute type="dt" />
    </ElementType>

<ElementType name="headers" content="eltOnly" model="closed"
       <attribute type="id" required="yes" />
       <element type="sequenceNumber" />
    </ElementType>

<ElementType name="actionName" content="textOnly" dt:type="string" />
    <ElementType name="actionArg" content="textOnly" dt:type="string" />

<ElementType name="invokeAction" content="eltOnly" model="closed">
       <attribute type="id" required="yes" />

<element type="actionName">
       <element type="actionArg" minOccurs="0" maxOccurs="*">
    </ElementType>
...
```

FIG. 20

```
...
    <ElementType name="SerializedStream" content="eltOnly" model="closed">
        <attribute type="main" required="yes" />
        <attribute type="headers" required="yes" />

<element type="headers">
        <element type="invokeAction">

</ElementType>

<!-- Invoke Action Response -->

<ElementType name="invokeActionResponse" content="eltOnly" model="closed">
        <group order="one">
            <element type="_return">
            <element type="_fault">
        </group>
    </ElementType>
  </Schema>
</contract>
```

FIG. 21

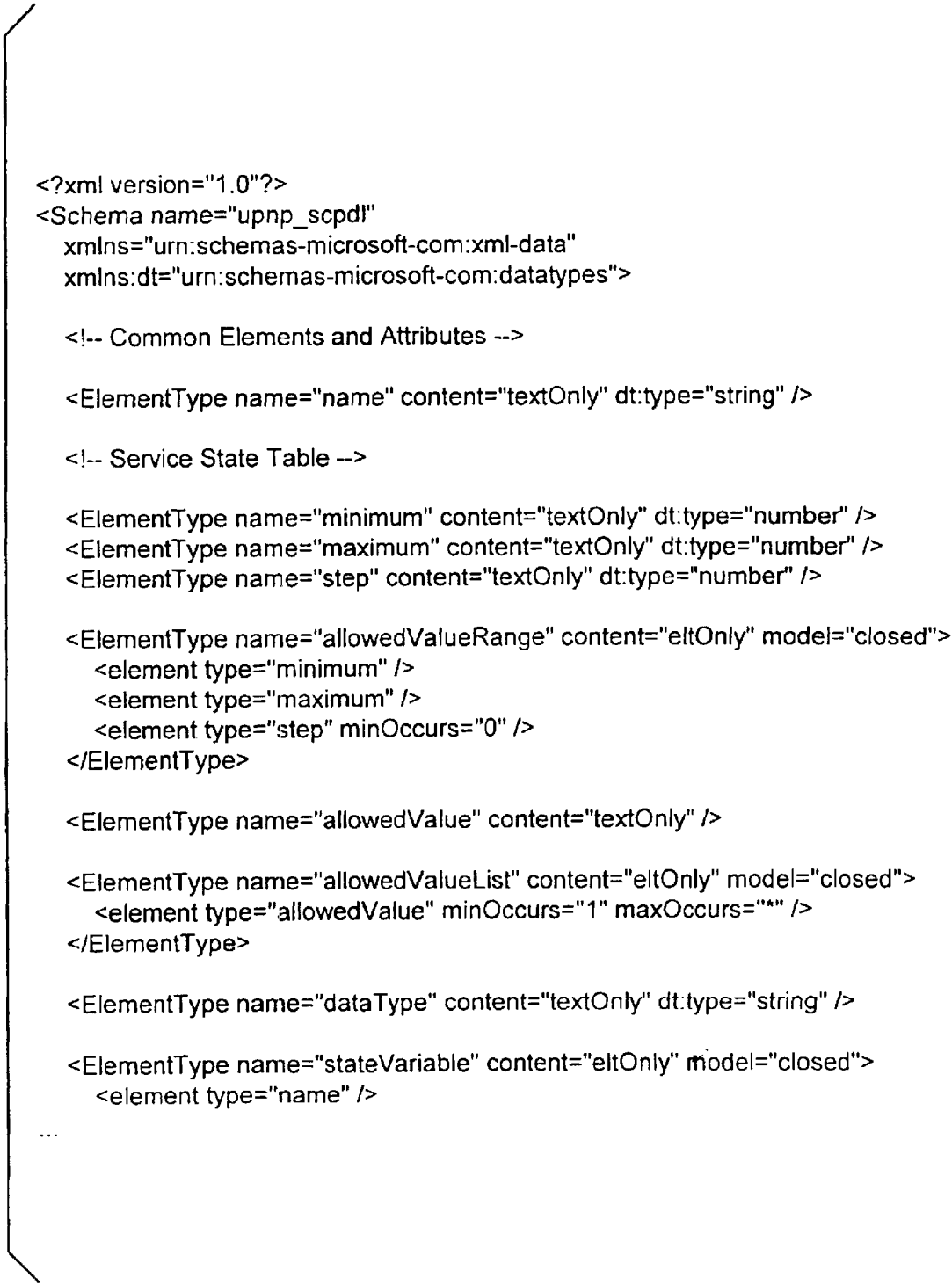

```
<?xml version="1.0"?>
<Schema name="upnp_scpdl"
    xmlns="urn:schemas-microsoft-com:xml-data"
    xmlns:dt="urn:schemas-microsoft-com:datatypes">

<!-- Common Elements and Attributes -->

<ElementType name="name" content="textOnly" dt:type="string" />

<!-- Service State Table -->

<ElementType name="minimum" content="textOnly" dt:type="number" />
<ElementType name="maximum" content="textOnly" dt:type="number" />
<ElementType name="step" content="textOnly" dt:type="number" />

<ElementType name="allowedValueRange" content="eltOnly" model="closed">
    <element type="minimum" />
    <element type="maximum" />
    <element type="step" minOccurs="0" />
</ElementType>

<ElementType name="allowedValue" content="textOnly" />

<ElementType name="allowedValueList" content="eltOnly" model="closed">
    <element type="allowedValue" minOccurs="1" maxOccurs="*" />
</ElementType>

<ElementType name="dataType" content="textOnly" dt:type="string" />

<ElementType name="stateVariable" content="eltOnly" model="closed">
    <element type="name" />
...
```

FIG. 22

```xml
...
    <element type="dataType" />

<group minOccurs="0" maxOccurs="1" order="one">
      <element type="allowedValueRange" />
      <element type="allowedValueList" />
    </group>
  </ElementType>

<ElementType name="deviceStateTable" content="eltOnly" model="closed">
    <element type="stateVariable" minOccurs="1" maxOccurs="*" />
  </ElementType>

<!-- Action List -->

<ElementType name="relatedStateVariable" content="textOnly" dt:type="string" />

<ElementType name="argument" content="eltOnly" model="closed">
    <element type="name" />
    <element type="relatedStateVariable" />
  </ElementType>

<ElementType name="action" content="eltOnly" model="closed">
    <element type="name" />
    <element type="argument" minOccurs="0" maxOccurs="*" />
  </ElementType>

<ElementType name="actionList" content="eltOnly" model="closed">
    <element type="action" minOccurs="0" maxOccurs="*" />
  </ElementType>

<!-- Root Element -->

<ElementType name="dcpd" content="eltOnly" model="closed">
    <element type="deviceStateTable" />
    <element type="actionList" />
  </ElementType>
</Schema>
```

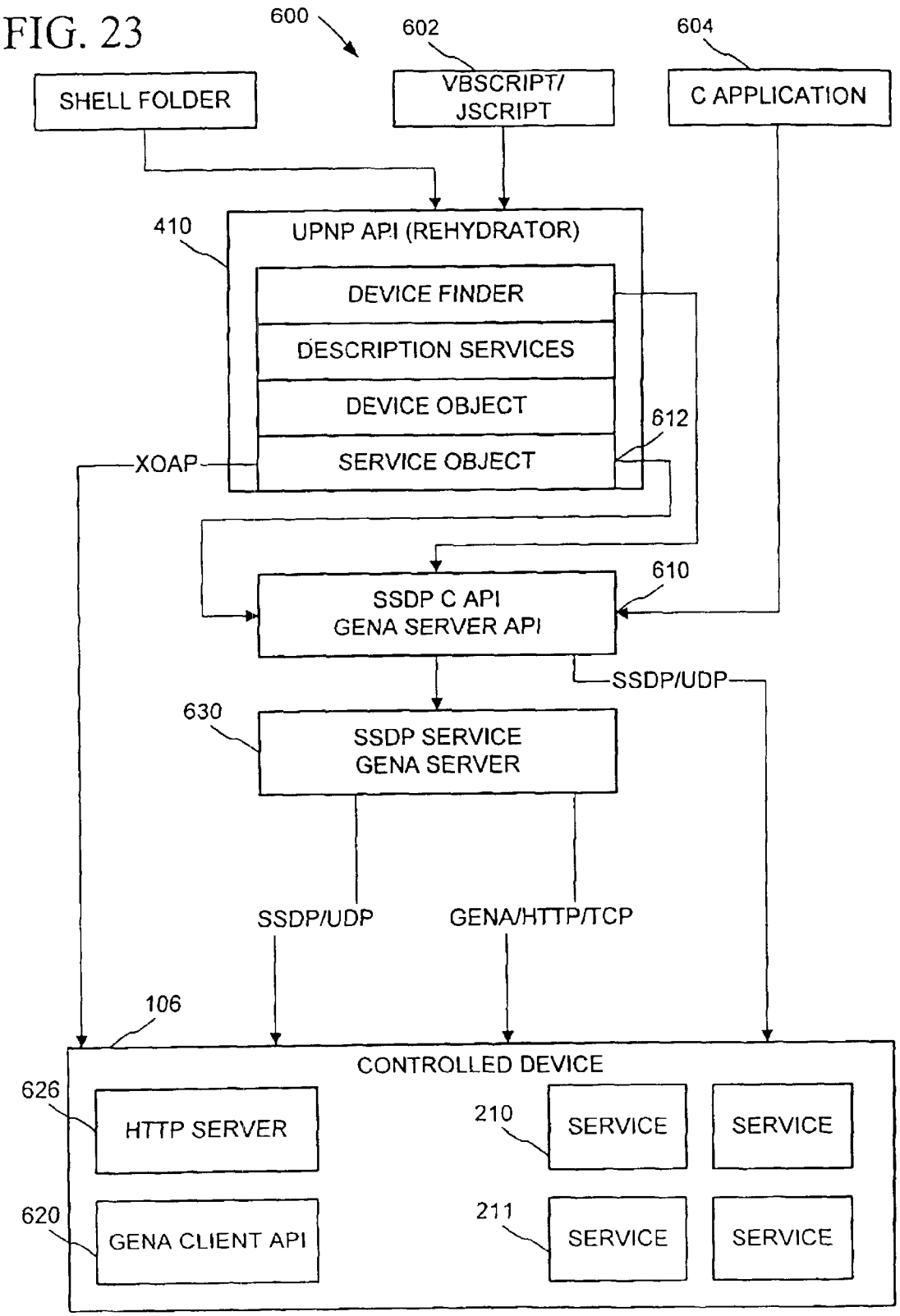

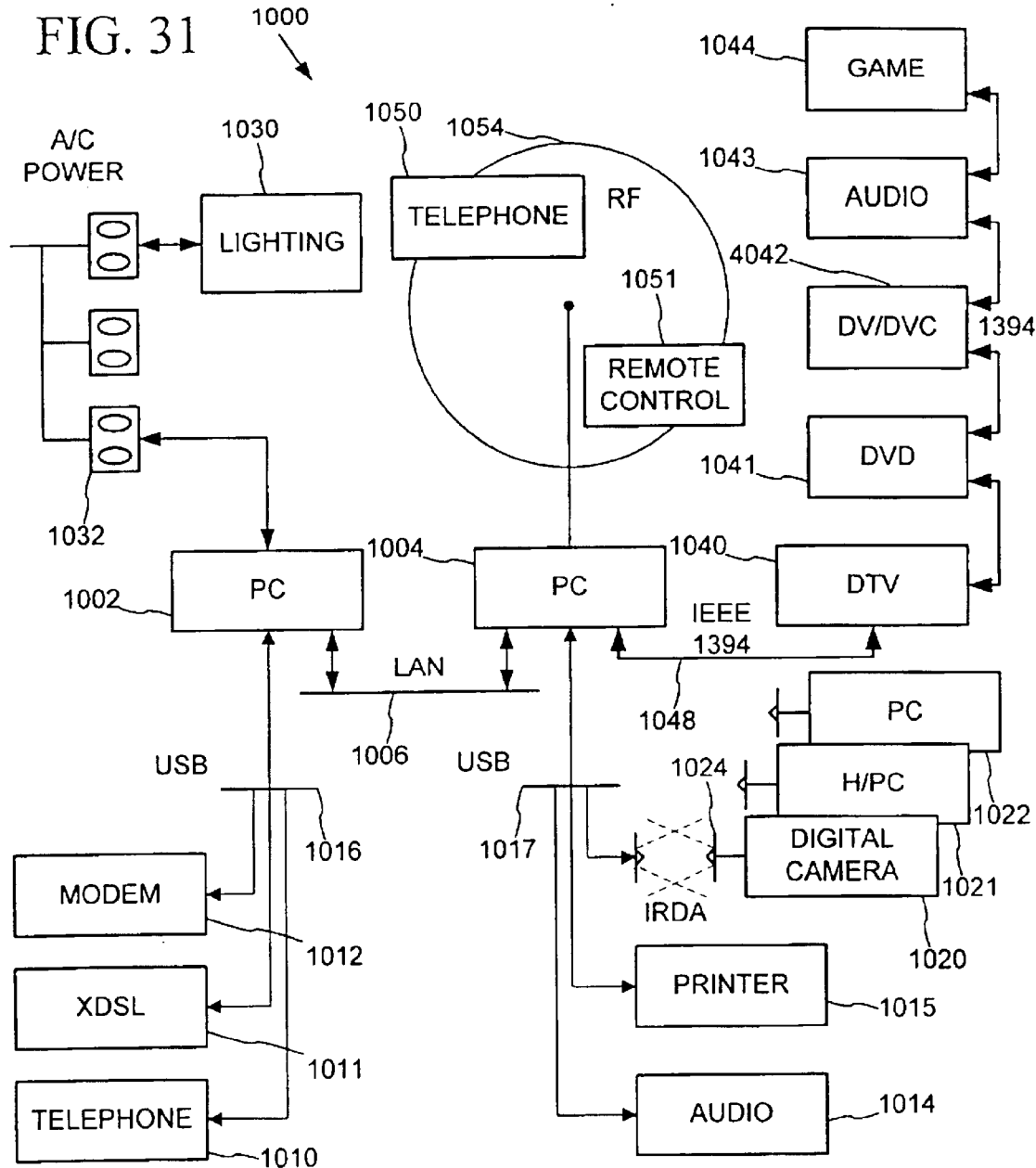

FIG. 32

```
[
object,
uuid(<foo>),
dual,
helpstring("IUPNPDevice interface"),
pointer_default(unique)
]
    interface IUPNPDevice : IDispatch
{

[propget, id(DISPID_UPNPDEVICE_DESCRIPTIONDOCUMENT),
     helpstring("returns the document from which the properties of this device are
being read")]
     HRESULT DescriptionDocument([restricted, hidden, out, retval]
IUPNPDescriptionDocument ** ppuddDocument);
        purpose: returns the document from which the properties of this device are
being read.
        parameters: ppuddDocument, A reference to the description document
object from which data about the device is being read.  This must be freed when no
longer needed.
        return values: S_OK, ppuddDocument is a refernce to the device's
description document.

[propget, id(DISPID_UPNPDEVICE_ISROOTDEVICE),
     helpstring("denotes whether the physical location information of this device can
be set")]
     HRESULT IsRootDevice([out, retval] VARIANT_BOOL * pvarb);
        parameters: pvarb, the address of a VARIANT_BOOL that will receive the
value of VARIANT_TRUE if the current device is the topmost device in the device
tree, and will receive the value of VARIANT_FALSE otherwise.
        return values: S_OK, varb is set to the appropriate value
        note: if a device is a root device, calls RootDevice() or ParentDevice() will
return NULL

[propget, id(DISPID_UPNPDEVICE_ROOT),
     helpstring("returns the top device in the device tree")]
     HRESULT RootDevice([out, retval] IUPNPDevice ** ppudDeviceRoot);
        purpose: returns the top device in the device tree
    ...
```

FIG. 33

...
    parameters: ppudDeviceRoot, On return, this refers to the "root" device of the current device tree. The root device is the topmost parent of the current device. If the current device is the root device this method will set *ppudDeviceRoot to null, and return S_FALSE.
    return values: S_OK, *ppudDeviceRoot contains a reference to the root device. S_FALSE, the current device is the root device. *ppudDeviceRoot is null.

[propget, id(DISPID_UPNPDEVICE_PARENT),
    helpstring("returns the parent of the current device")]
    HRESULT ParentDevice([out, retval] IUPNPDevice ** ppudDeviceParent);
    parameters: ppudDeviceParent, On return, if the device has a parent, this is the address of a IUPNPDevice object which can describe the parent. This must be released when no longer needed. If the device has no parent (it is a "root" device), than this value will be set to null.
    return values: S_OK, ppudDeviceParent contains a reference to the device's parent. S_FALSE, the current device is the root device, which has no parent. *ppudDeviceRoot is null.

[propget, id(DISPID_UPNPDEVICE_CHILDREN),
    helpstring("returns a collection of the children of the current device")]
    HRESULT Children([out, retval] IUPNPDevices ** ppudChildren);
    parameters: ppudChildren, On return, this is the address of a newly-created IUPNPDevices collection that can enumerate this device's children. This must be released when no longer needed. If the device has no children, this method will return a collection object with a length of zero.
    return values: S_OK, ppudChildren contains a list of the device's children.

[propget, id(DISPID_UPNPDEVICE_UDN),
    helpstring("returns the UDN of the device")]
    HRESULT UniqueDeviceName([out, retval] BSTR * pbstrUDN);
    parameters: pbstrUDN, On return, this contains the address of a newly-allocated string which contains the device's Unique Device Name (UDN). The UDN is globally unique across all devices - no two devices will ever have the same UDN. This value must be freed when no longer needed.
    return values: S_OK    pbstrUDN contains the UDN of the device

...
```
[propget, id(DISPID_UPNPDEVICE_DISPLAYNAME),
    helpstring("returns the (optional) display name of the device")]
    HRESULT DisplayName([out, retval] BSTR * pbstrDisplayName);
```
   parameters: pbstrDisplayName, On return, this contains the address of the device's display name. This value must be freed when no longer needed. If the device does not specify a display name, this parameter will be set to null.

return values: S_OK, bstrDisplayName contains the display name of the device. pbstrDisplayName must be freed. S_FALSE, the device did not specify a display name. *pbstrDisplayName is set to null.

note: it is possible for multiple devices to have the same display name. Applications should use UniqueDeviceName() to determine if two device objects refer to the same device.

```
    [propget, id(DISPID_UPNPDEVICE_CANSETDISPLAYNAME),
      helpstring("denotes whether the physical location information of this device can be set")]
      HRESULT CanSetDisplayName([out, retval] VARIANT_BOOL * pvarb);
```
   parameters: pvarb, the address of a VARIANT_BOOL. This is true (!=0) on return when the device's display name can be set (via SetDisplayName)
   return values: S_OK     varb is set to the appropriate value

```
    [id(DISPID_UPNPDEVICE_SETDISPLAYNAME),
      helpstring("sets the display name on the device")]
      HRESULT SetDisplayName([in] BSTR bstrDisplayName);
```
   parameters: bstrDisplayName, the value to set the device's display name to.
   return values: S_OK, varb is set to the appropriate value.
   note: On success, this method sets the display name used by a device. Note that this method changes the display name on the device itself, not simply on the local object. This will block while the name is being set.
Additionally, this change will be made on the device alone, and will not be reflected in the current device object. After a successful call to this method, DisplayName will continue to return the 'old' value). To read the device's current name, the caller must re-load the device's description.

[propget, id(DISPID_UPNPDEVICE_DEVICETYPE),
...

FIG. 35

...
   helpstring("returns the device type URI")]
    HRESULT Type([out, retval] BSTR * pbstrType);
       parameters: pbstrType, On return, this contains the address of a newly-allocated string containing the device's type URI. This value must be freed when no longer needed.
       return values: S_OK, bstrType contains the type URI of the device, and must be freed when no longer needed.

[propget, id(DISPID_UPNPDEVICE_SERVICES),
   helpstring("returns the collection of services exposed by the device")]
   HRESULT Services([out, retval] IUPNPServices ** ppusServices);
      parameters: ppusServices, On return, this is the address of a newly-created IUPNPServices collection that can enumerate the services exposed by the device. This must be released when no longer needed. If the device exposes no services, this method will return a collection object with a length of zero.
      return values: S_OK, pusServices contains a list of the device's children.

[propget, id(DISPID_UPNPDEVICE_SERVICEIDENTIFIER),
   helpstring("returns the (optional) service identifier of the device")]
   HRESULT ServiceIdentifier([out, retval] BSTR * pbstrServiceID );
      parameters: pbstrServiceID, On return, this contains the address of a newly-allocated string containing the contents of the device's ServiceIdentifier element, if the device specifies one. This value must be freed when no longer needed. If the device does not specify a ServiceIdentifier value, this parameter will be set to null.
      return value: S_OK, bstrServiceID contains the service identifier of the device. pbstrServiceID must be freed. S_FALSE, the device did not specify a service identifier. *pbstrServiceID is set to null.
      note having a ServiceIdentifier is mutually exclusive with having services. Any device will either have a list of services or a ServiceIdentifier, but not both.

[id(DISPID_UPNPDEVICEDESCRIPTION_LOADSMALLICON),
   helpstring("loads a small (titlebar-sized) icon representing the device, encoded in the specified format")]
   HRESULT LoadSmallIcon([in] BSTR bstrEncodingFormat,
    [out, retval] BSTR * pbstrIconURL);
      parameters:
...

bstrEncodingFormat, A string containing the mime-type representing the desired encoding format of the icon. pbstrIconURL, On return, *pbstrIconURL contains a newly-allocated string representing the URL from which the icon can be loaded. This string must be freed when no longer needed.

return values: S_OK, *pbstrIconURL contains a reference to an icon, encoded in the desired encoding format.

[id(DISPID_UPNPDEVICEDESCRIPTION_LOADICON),
  helpstring("loads a standard-sized icon representing the device, encoded in the specified format")]
    HRESULT LoadIcon([in] BSTR bstrEncodingFormat,
    [out, retval] BSTR * pbstrIconURL);

parameters: bstrEncodingFormat, A string containing the mime-type representing the desired encoding format of the icon. pbstrIconURL, On return, *pbstrIconURL contains a newly-allocated string representing the URL from which the icon can be loaded. This string must be freed when no longer needed.

return values: S_OK, *pbstrIconURL contains a reference to an icon, encoded in the desired encoding format.

[propget, id(DISPID_UPNPDEVICEDESCRIPTION_PRESENTATIONURL),
  helpstring("obtains a presentation URL to a web page that can control the device")]
    HRESULT PresentationURL([out, retval] BSTR * pbstrURL);

parameters: pbstrURL, on return, the address of a newly-allocated string containing the web-page-based control URL. If the device did not specify a presentation URL, an empy string ("") will be returned.

return values:S_OK, bstrURL contains a newly-allocated URL that must be freed when no longer needed. S_FALSE, the device does not have a presentation URL. pbstrURL is set to null.

[propget, id(DISPID_UPNPDEVICEDESCRIPTION_PHYSICALLOCATION),
  helpstring("a set of properties describing the device's physical location")]
    HRESULT PhysicalLocation([out, retval] IUPNPPropertyBag * pupl);

parameters: pupl   on return, the address of a newly-allocated UPNPPropertyBag object which contains information about the device's physical location
    return values

...
      S_OK upl contains a newly-allocated object that the caller must free when it is no longer needed.
      note: if the object does not provide any description information, an empy property bag will be returned. See SetPhysicalLocation for a listing of defined values in a physical location property bag.

[propget,
id(DISPID_UPNPDEVICEDESCRIPTION_CANSETPHYSICALLOCATION),
   helpstring("denotes whether the physical location information of this device can be set")]
     HRESULT CanSetPhysicalLocation([out, retval] VARIANT_BOOL * pvarb);
       parameters: pvarb   the address of a VARIANT_BOOL. This is true (!=0) on return when the device's physical location can be set (via SetPhysicalLocation)
       return values: S_OK     varb is set to the appropriate value

[id(DISPID_UPNPDEVICEDESCRIPTION_SETPHYSICALLOCATION),
   helpstring("writes a set of properties describing the device's physical location to the device")]
     HRESULT SetPhysicalLocation([in] IUPNPPropertyBag * pupl);
       parameters: pupl   A UPNPPropertyBag object which contains the name-value pairs representing the device's current location. the function will not free the object.
       return values: S_OK     he device has been updated with the supplied physical location information
      note: the following are standard values in the physical location property bag: country, campus, building, floor, wing, room, latitude, longitude, altitude. These values can be used programmatically to implement sorting or filtering functionality based on the device's location. Additionally the property bag supports the following value: description, which contains a user-displayable string representing a device's location which does not have programattic significance. Additionally, the physical location update will be made on the device alone, and will not be reflected in the current device object. After a successful call to this method, PhysicalLocation will continue to return the 'old' value. To read the device's current name, the caller must re-load the device's description.
  }

[propget, id(DISPID_UPNPDEVICEDESCRIPTION_PRODUCTNAME),
  helpstring("a displayable string containing the product name")]
  HRESULT ProductName([out, retval] BSTR * pbstr);
    parameters: pbstr on return, the address of a newly-allocated string containing the product name of the device.
    return values:    S_OK pbstr contains a newly-allocated string that must be freed when no longer needed.

[propget, id(DISPID_UPNPDEVICEDESCRIPTION_DESCRIPTION),
  helpstring("displayable summary of the device's function")]
  HRESULT Description([out, retval] BSTR * pbstr);
    parameters: pbstr on return, the address of a newly-allocated string containing a short description of the device meaningful to the user.
    return values:    S_OK pbstr contains a newly-allocated string that must be freed when no longer needed.

[propget, id(DISPID_UPNPDEVICEDESCRIPTION_MODELNAME),
  helpstring("displayable model name")]
  HRESULT ModelName([out, retval] BSTR * pbstr);
    parameters: pbstr on return, the address of a newly-allocated string containing the manufactuer's model name of the device.
    return values: S_OK     pbstr contains a newly-allocated string that must be freed when no longer needed.

[propget, id(DISPID_UPNPDEVICEDESCRIPTION_SERIALNUMBER),
  helpstring("displayable serial number")]
  HRESULT SerialNumber([out, retval] BSTR * pbstr);
    parameters: pbstr on return, the address of a newly-allocated string containing the manufacturer's serial number of the device.
    return values: S_OK     pbstr contains a newly-allocated string that must be freed when no longer needed.
    note: a device's serial number is not guaranteed to be globally unique. The DeviceUniqueName should always be used to distinguish devices.

[propget, id(DISPID_UPNPDEVICEDESCRIPTION_MANUFACTURERNAME),
  helpstring("displayable manufacturer name")]
  HRESULT ManufacturerName([out, retval] BSTR * pbstr);
    parameters

...
pbstr, on return, the address of a newly-allocated string containing the name of the device's manufactuer.
  return values: S_OK, pbstr contains a newly-allocated string that must be freed when no longer needed.

[propget, id(DISPID_UPNPDEVICEDESCRIPTION_MANUFACTURERURL),
    helpstring("URL to the manufacturer's website")]
  HRESULT ManufacturerURL([out, retval] BSTR * pbstr);
    parameters: pbstr, on return, the address of a newly-allocated string containing the URL of the mahufacturer's website.
    return values: S_OK, pbstr contains a newly-allocated string that must be freed when no longer needed.

[propget, id(DISPID_UPNPDEVICEDESCRIPTION_MODELNAME),
    helpstring("displayable model name")]
  HRESULT ModelName([out, retval] BSTR * pbstr);
    parameters: pbstr, on return, the address of a newly-allocated string containing the manufactuer's model name for the device.
    return values: S_OK, pbstr contains a newly-allocated string that must be freed when no longer needed.

[propget, id(DISPID_UPNPDEVICEDESCRIPTION_SUPPORTLIST),
    helpstring("technical support contact information")]
  HRESULT SupportList([out, retval] BSTR * pbstr);
    parameters: pbstr, on return, the address of a newly-allocated, multi-line string containing phone numbers and other information that can guide the user to technical support. This string must be freed when no longer needed.
    return values: S_OK, pbstr contains a newly-allocated string that must be freed when no longer needed.

[propget, id(DISPID_UPNPDEVICEDESCRIPTION_FAQLIST),
    helpstring("FAQ access display information")]
  HRESULT FAQList([out, retval] BSTR * pbstr);
    parameters: pbstr, on return, the address of a newly-allocated, multi-line string containing FAQ information that can provide the user with URLs at which device FAQs may be located.
    return values: S_OK, pbstr contains a newly-allocated string that must be freed when no longer needed.

```
...
[propget, id(DISPID_UPNPDEVICEDESCRIPTION_UPDATELIST),
    helpstring("information explaining where the user can update the device's
firmware")]
    HRESULT UpdateList([out, retval] BSTR * pbstr),
        parameters: pbstr, on return, the address of a newly-allocated, multi-line
string containing information and URLs from which the user can download updates
for the device's firmware.
        return values: S_OK, pbstr contains a newly-allocated string that must be
freed when no longer needed.
```

FIG. 41

```
[
object,
uuid(FDBC0C73-BDA3-4C66-AC4F-F2D96FDAD68C),
dual,
helpstring("IUPNPDevices Interface"),
pointer_default(unique)
]
IUPNPPropertyBag
{

[propget, id(DISPID_UPNP_PROPERTYBAG_READ),
      helpstring("reads a value from the property bag")]
    HRESULT Read([in] BSTR bstrName, [out, retval] VARIANT * pvarResult);
        parameters: bstrName, name of the property to read.  case is ignored.
pvarResultvalue of the property.  if the property doese not exist, this is of type
VT_EMPTY
        return values: S_OK, the value was found in the property bag, and returned
in pvarResult.  S_FALSE, there was no value with the given name in the property
bag.  *pvarResult is of type VT_EMPTY

[propget, id(DISPID_UPNP_PROPERTYBAG_WRITE),
      helpstring("writes a value to the property bag")]
    HRESULT Write([in] BSTR bstrName, [in] VARIANT * pvarValue);
        parameters: bstrName, name of the property to write.  case is preserved
when writing.  The supplied value will replace any other values of the same name,
even if they differ in case.  pvarValue, value of the property to write.
        return values: S_OK, the value was written to the property bag, replacing the
value currently associated with this property, if it existed.

[propget, id(DISPID_UPNP_PROPERTYBAG_DELETE),
      helpstring("removes a value from the property bag")]
    HRESULT Delete([in] BSTR bstrName);
        parameters: bstrName, name of the value to remove from the property gab.
case is ignored when finding a value to remove.
        return values: S_OK, the value has been removed from the property bag.
S_FALSE, the value was not found in the property bag.

```
[
object,
uuid(A295019C-DC65-47DD-90DC-7FE918A1AB44),
dual,
helpstring("IUPNPService Interface"),
pointer_default(unique)
]
interface IUPNPService : IDispatch
{
[id(1), helpstring("method GetProperty")]
HRESULT GetProperty(
[in] BSTR bstrPropertyName,
[out, retval] VARIANT *pValue
);

[id(2), helpstring("method InvokeAction")]
HRESULT InvokeAction(
[in] BSTR bstrActionName,
[in] VARIANT saActionArgs,
[out, retval] long *pIStatus
);

[propget, id(3), helpstring("property DCPI")]
HRESULT DCPI(
[out, retval] BSTR *pVal
);

[propget, id(4),
      helpstring("returns a manufactuer-defined extension property")]
      HRESULT VendorExtension([out, retval] VARIANT * pvarValue );
         parameters: pvarValueOn return, this variant is filled with the value of the
"extension" element. If none exists, pvarValue is set to VT_EMPTY
         return values: S_OK, varValue is set to the extension element. S_FALSE,
no vendor extension element exists. pvarValue is VT_EMPTY
```

FIG. 43

```
[
object,
uuid(FDBC0C73-BDA3-4C66-AC4F-F2D96FDAD68C),
dual,
helpstring("IUPNPDevices Interface"),
pointer_default(unique)
]
    interface IUPNPDevices : IDispatch
{
[propget, id(1), helpstring("property Count")]
HRESULT Count(
[out, retval] long *pVal
);

[propget, id(DISPID_NEWENUM), helpstring("property _NewEnum")]
HRESULT _NewEnum(
[out, retval] LPUNKNOWN *pVal
);

[propget, id(DISPID_VALUE), helpstring("property Item")]
HRESULT Item(
[in] long lIndex,
[out, retval] VARIANT *pVal
);
};
```

FIG. 44

```
[
object,
uuid(3F8C8E9E-9A7A-4DC8-BC41-FF31FA374956)
dual,
helpstring("IUPNPServices Interface"),
pointer_default(unique)
]
interface IUPNPServices : IDispatch
{
[propget, id(1), helpstring("property Count")]
HRESULT Count(
[out, retval] long *pVal
);

[propget, id(DISPID_NEWENUM), helpstring("property _NewEnum")]
HRESULT _NewEnum(
[out, retval] LPUNKNOWN *pVal
);

[propget, id(DISPID_VALUE), helpstring("property Item")]
HRESULT Item(
[in] long lIndex,
[out, retval] VARIANT *pVal
);
};
```

FIG. 45

```
<contract>

<protocol id="protocolDef">
   <HTTP version="1.1">
     <URL> http://investor.msn.com/stockquote </URL>
     <M-POST>
       <MAN> http://www.upnp.org/service-control/m-post </MAN>
     <M-POST>
       <HEADER name="Content-Type" value="text/xml" />
   </HTTP>
  </protocol>

<RequestResponse name="getQuote">
   <protocol is="protocolDef" />
   <in      is="symbol" />
   <out     is="stockQuote" />
   <error   is="error" />
  </RequestResponse>

<RequestResponse name="getQuotes">
   <protocol is="protocolDef" />
   <in      is="symbols" />
   <out     is="stockQuotes" />
   <error   is="error" />
  </RequestResponse>

<!-- // schema definition follows -->

<schema xmlns="urn:schema-microsoft-com:xml-data"
       xmlns:dt="urn:schema-microsoft-com:datatypes">

<ElementType name="symbol" dt:type="string" />

<ElementType name="symbols">
     <element type="symbol" maxOccurs="*" />
   </ElementType>

<ElementType name="stockQuote">
     <element type="company" />
     <element type="ticker" />
   ...
```

FIG. 46

```
   ...
   <element type="previousClose" />
   <element type="openingTrade" />
   <element type="lastTrade" />
   <element type="volume" />
</ElementType>

<ElementType dt:type="string" name="company" />
<ElementType dt:type="string" name="ticker" />
<ElementType dt:type="string" name="previousClose" />
<ElementType dt:type="string" name="openingTrade" />
<ElementType dt:type="string" name="lastTrade" />
<ElementType dt:type="string" name="volume" />

<ElementType name="stockQuotes">
   <element name="stockQuote" maxOccurs="*" />
</Element>

<ElementType name="error">
   <element type="reason" />
</ElementType>

<ElementType dt:type="string" name="reason" />

</schema>
```

</contract>
Request for "getQuote"

M-POST /stockquotes HTTP/1.1
Host: amarg5:8586
Content-Type: text/xml
Man: "http://www.upnp.org/service-control/m-post"; ns=01
01-MethodName: getQuotes
01-MessageType: Call
Accept-Language: en-gb, en;q=0.8
Referer: http://amarg5/uPnPService/Services/Stock/Client/ticker.htm
Content-Length: 327
User-Agent: Mozilla/4.0 (compatible; MSIE 5.01; Windows NT 5.0)
Connection: Keep-Alive

\<symbol>MSFT\</symbol>
Response for "getQuote"

HTTP/1.1 200 OK
Connection: close
Cache-Control: private
Date: Mon Aug 16 15:37:35 PDT 1999
Expires: Mon Aug 16 15:37:35 PDT 1999
Content-Type: text/xml
Content-Length: 7912
Man: "http://www.upnp.org/service-control/m-post"; ns=01
Ext:
01-MessageType: CallResponse \<stockQuote>
  \<company>Microsoft%20Corporation\</company>
  \<ticker>MSFT\</ticker>
  \<previousClose>84%2011/16\</previousClose>
  \<openingTrade>85%201/16\</openingTrade>
  \<lastTrade>84%205/16\</lastTrade>
  \<volume>28.66%20Mil\</volume>
\</stockQuote>

FIG. 48

```
<!-- XDR Schema for protocol section of contract -->

<schema name="contract"
     xmlns="urn:schema-microsoft-com:xml-data"
     xmlns:dt="urn:schema-microsoft-com:datatypes">

<ElementType name="contract"
        xmlns:protocolNS="contract-protocol"
          xmlns:msgPatternNS="contract-msgPatterns"
          xmlns:schemaNS="urn:schema-microsoft-com:xml-data">

<element type="protocolNS:protocol" />

<element type="msgPatternNS:RequestResponse" minOccurs="0" maxOccurs="*" />
   <element type="msgPatternNS:SolicitResponse" minOccurs="0" maxOccurs="*" />

<element type="schemaNS:schema"          minOccurs="0" maxOccurs="*" />

</ElementType>

</schema>
...
```

FIG. 49

```
...
Protocol
<!-- XDR Schema for protocol section of contract -->

<schema name="contract-protocol"
    xmlns="urn:schema-microsoft-com:xml-data"
    xmlns:dt="urn:schema-microsoft-com:datatypes">

<ElementType name="protocol">

<!-- ID -->
    <AttributeType name="id" dt:type="id" />
    <Attribute type="id" />

<group order="one">
      <element xmlns:http="contract-protocol-HTTP" type="http:HTTP" />
      <element xmlns:gena="contract-protocol-GENA" type="gena:GENA" />
      // other protocol definitions go here
    </group>

</ElementType>

</schema>
...
```

FIG. 50

```
...
HTTP
<!-- XDR Schema for HTTP section of contract -->

<schema name="contract-protocol-HTTP"
    xmlns="urn:schema-microsoft-com:xml-data"
    xmlns:dt="urn:schema-microsoft-com:datatypes">

<ElementType name="HTTP">

<!-- HTTP version -->
    <AttributeType name="VERSION" dt:type="string" default="1.1" />
    <Attribute type="VERSION" />

<!-- The Verb to use -->
    <group order="one">
      <element type="GET"    />
      <element type="POST"   />
      <element type="M-POST" />
    </group>

<!-- The protocol data -->
    <element type="URL"    />
    <element type="QUERY"  minOccurs="0" />
    <element type="HEADER" minOccurs="0" />

</ElementType>

<ElementType name="URL" dt:type="string" />

<ElementType name="QUERY">
    <attribute type="name"     />
    <attribute type="value"    />
    <attribute type="required" />
  </ElementType>

<ElementType name="HEADER">
 <attribute type="name" />
 <attribute type="value" required="yes" />
</ElementType>

<!-- Verb declarations -->
<ElementType name="GET"/>

<ElementType name="POST">
 <element type="PARAM" minOccurs="0" maxOccurs="*" />
</ElementType>

<ElementType name="PARAM">
 <element type="name" />
 <element type="default" />
 <element type="value" />
 <element type="required" />
</ElementType>

<AttributeType name="name"     dt:type="string" required="yes" />
<AttributeType name="default"  dt:type="string" />
<AttributeType name="value"    dt:type="string" />
<AttributeType name="required" dt:type="boolean" default="no" />

<ElementType name="M-POST">
 <element type="MAN" />
</ElementType>

<ElementType name="MAN" dt:type="string" />

</schema>
```

DYNAMIC SELF-CONFIGURATION FOR AD HOC PEER NETWORKING USING MARK-UP LANGUAGE FORMATED DESCRIPTION MESSAGES

RELATED APPLICATION DATA

This application is based on provisional application No. 60/139,137 filed Jun. 11, 1999, and provisional application No. 60/160,235 filed Oct. 18, 1999.

TECHNICAL FIELD

This invention relates generally to dynamic connectivity among distributed devices and services, and more particularly relates to providing a capability for devices to automatically self-configure to interoperate with other peer networking devices on a network, such as in a pervasive computing environment.

BACKGROUND AND SUMMARY

The cost of computing and networking technologies have fallen to the point where computing and networking capabilities can be built into the design of many electronic devices in the home, the office and public places. The combination of inexpensive and reliable shared networking media with a new class of small computing devices has created an opportunity for new functionality based mainly on the connectivity among these devices. This connectivity can be used to remotely control devices, to move digital data in the form of audio, video and still images between devices, to share information among devices and with the unconstrained World Wide Web of the Internet (hereafter "Web") and to exchange structured and secure digital data to support things like electronic commerce. The connectivity also enables many new applications for computing devices, such as proximity-based usage scenarios where devices interact based at least in part on geographical or other notions of proximity. A prevalent feature of these connectivity scenarios is to provide remote access and control of connected devices and services from another device with user interface capabilities (e.g., a universal remote controller, handheld computer or digital assistant, cell phones, and the like). These developments are occurring at the same time as more people are becoming connected to the Internet and as connectivity solutions are falling in price and increasing in speed. These trends are leading towards a world of ubiquitous and pervasive networked computing, where all types of devices are able to effortlessly and seamlessly interconnect and interact.

In the above ubiquitous and pervasive networked computing scenarios, the devices desirably can interoperate on an ad hoc peer-to-peer networking connectivity basis. Such a peer networking connectivity model enables any networked device to initiate a communication with any other networked device, without having established a prior relationship or maintaining a persistent relationship between the devices. This peer networking connectivity also allows multiple devices to establish one or more connections with a single device, and it allows for a device to be capable of both initiating and accepting connections to/from other devices.

The prevalent model for device connectivity, however, has been that of host-peripheral connectivity, typified by the personal computer and its many peripheral devices (e.g., data storage drives, user input devices, displays, printers, scanners, etc.) connected via various buses (e.g., PCI, VESA, AGP, Microchannel, ISA, EISA, USB), ports (e.g., serial, parallel), and connectors (e.g., PS/2 connector). This host-peripheral connectivity model is characterized in that the host and peripherals typically have persistent relationships and stable configurations. This persistent relationship is created, by example, through a set-up and configuration process through which appropriate driver software is installed by a user or administrator onto the host for use in controlling the peripheral, and updating the host's configuration to include peripheral device settings. Such persistent configured relationships with a user installation/configuration experience are generally inappropriate to the ubiquitous and pervasive computing environment where portable and mobile devices desirably can instantly connect and interact with other computing devices in their environment without having established prior or persistent relationships.

More specifically, two common computing networks where many of these small, network-capable computing devices are expected to be used include the home and small office. Such networks are commonly not actively managed by experienced administrators. In fact, due to the lack of networking experience of a large majority of the users of these networks, lengthy, complex and/or involved user installation and setup experiences pose a significant impediment to adoption and penetration of such networks and devices into homes and small offices.

Further, the establishment of persistent relationships with other devices in the configuration of these small, network-capable computing devices is inappropriate to many usage scenarios. For example, portable computing devices (such as a handheld computer or digital assistant, cell phones, and the like) may be used to access information (such as transportation departure/arrival times, store locations, etc.) from other devices on networks in public places (such as malls and airports). Not only would a user installation/configuration experience upon each such use pose an inconvenience, but the establishment of persistent configuration information poses configuration management issues and consumes device resources. As another example, devices (such as printers, scanners, monitors and etc.) on an office or home network may interact with many portable computing devices (such as the laptops, cameras, and other equipment of the mobile professional) that are introduced into its network. Again, in device connectivity models requiring establishing persistent device relationship configurations, such one-time and occasional relationships between these devices would results in configuration instability requiring management and maintenance of ever-changing persistent device configurations. Due to the time and cost (or lack of) active administration of these devices, any requirement to manage and maintain changing persistent device configurations on networked devices is undesirable.

Accordingly, there is a need for a device connectivity model that supports ad hoc peer networking among computing devices with preferably zero user installation or configuration experience and without persistent device configuration.

In accordance with a technology described herein, a device connectivity and control model provides an integrated set of addressing, naming, discovery and description processes (herein also termed "self-bootstrapping") that enables automatic, dynamic and ad-hoc self-setup by devices to interoperate with other devices on a network. This permits a computing device when introduced into a network to automatically configure so as to connect and interact with other computing devices available on the network, without a user installation experience and without downloading driver software or persisting a configuration setup for connecting and interacting with such other computing devices. Upon completing interaction with such other devices, the computing device automatically releases the setup for such other devices so as to avoid persistent device configurations that might create a configuration maintenance and management burden.

The illustrated self-bootstrapping includes an integrated set of techniques organized as stacked layers, including addressing, naming, discovery, and description. In basic network addressing, a computing device introduced into a network obtains a valid address. In addition, the addressing layer of the illustrated self-bootstrapping supports assigning an address to the introduced computing device by an address server on a network if such server is available, as well as automatic self-assigning an address so as to avoid conflict with existing devices' addresses on the network where no address server is available.

In the naming layer, the illustrated self-bootstrapping includes techniques for also resolving names that identify devices, such that names that are user-friendly or more amenable to human recall and use. These naming techniques can include a name server that serves to convert a device name to its address for use in establishing a connection to the device. The techniques further enable the introduced computing device to locate such a name server without a priori knowledge of the name server's address. When assigned an address by the address server, the address server also provides the name server's address to the introduced computing device, permitting the introduced computing device to access the name server for resolving device names. On the other hand, where a name server is not available on a network, the naming techniques further include support for the introduced device to broadcast a query for a named device.

In the discovery layer the illustrated self-bootstrapping includes techniques for discovering other devices on the network without first having their address or name, such as by type of device. The introduced computing device broadcasts a discovery request specifying a desired device type or capability. Other devices on the network monitor for such broadcast discovery requests, and respond to discovery requests that specify their device type. This enables the introduced computing device to find other devices on the network of a desired type or having a desired capability without a priori possessing an address or name of those devices. In addition, the introduced computing device announces its own presence to other devices on the network.

In the description layer, the illustrated self-bootstrapping includes techniques for devices to provide descriptions of their operational functions and services and protocols for invoking such operational functions and services. Using these techniques, the introduced computing device upon establishing a connection to another device through addressing, naming and/or discovery can then obtain descriptive information detailing how to interact with the other device so as to control its operational functions and services.

Additional features and advantages will be made apparent from the following detailed description of the illustrated embodiment which proceeds with reference to the accompanying drawings.

BRIEF DESCRIPTION OF THE DRAWINGS

FIG. 14 is a data flow diagram illustrating a typical browsing protocol sequence in the device control model of FIG. 3.

FIG. 15 is a listing showing a layout of a description document in the device control model of FIG. 3.

FIG. 16 is a listing of an exemplary icon list of a Description Document in the device control model of FIG. 3.

FIG. 17 is a listing of an exemplary service control protocol declaration in a Description Document in the device control model of FIG. 3.

FIGS. 18, 19, and 20 are a listing of an XML schema for a contract in the device control model of FIG. 3.

FIGS. 21 and 22 are a listing of an XML schema for a Service Control Protocol Declaration Language used in the device control model of FIG. 3.

FIG. 23 is a block diagram of an exemplary implementation of an eventing model used in the device control model of FIG. 3.

FIG. 31 is a block diagram of an exemplary home or office pervasive computing environment having a variety of computers as per FIG. 25 and embedded computing devices as per FIG. 26 interconnected per UPnP standards that may be used in the device control model of FIG. 3.

FIGS. 32 through 44 are program listings of interfaces used in the Rehydrator implementation design of FIG. 10.

FIGS. 45–47 are an XML format listing that depicts an exemplary contract for interacting with a stock quote Service.

FIGS. 48–51 are an XML format listing that depicts an XML schema for defining Contracts.

DETAILED DESCRIPTION

Figure 1:
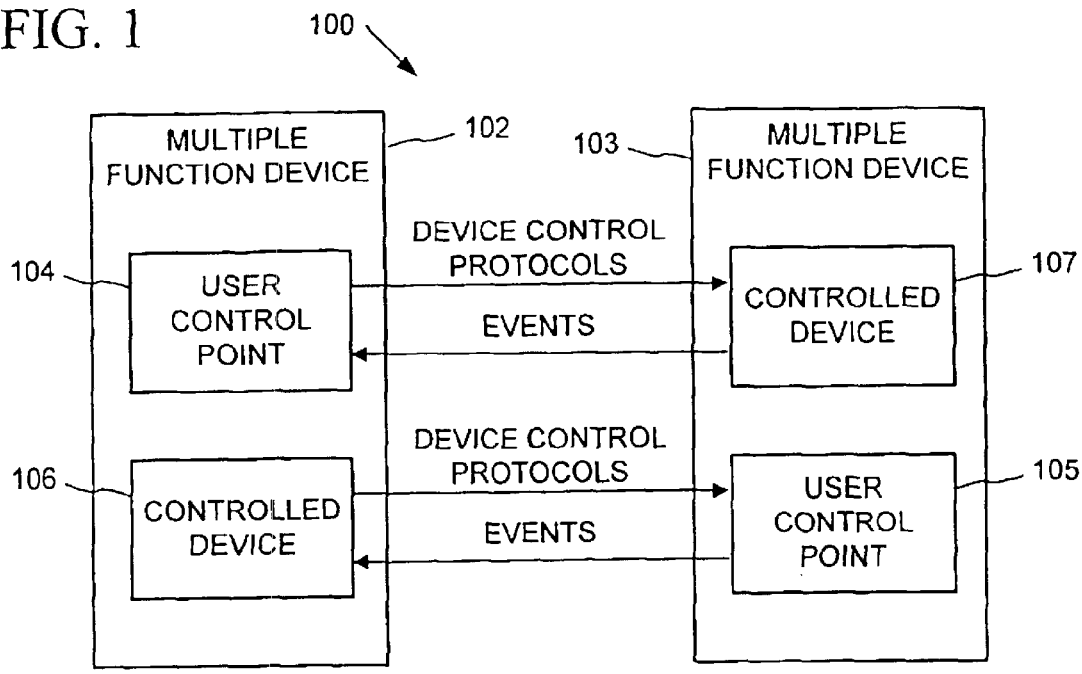
FIGS. 1 and 2 are block diagrams of a device architecture per Universal Plug and Play using user control points, controlled devices and bridges for connectivity between devices.

The following detailed description is directed toward self-bootstrapping or automatic dynamic self-configuring of devices for ad hoc peer networking with other devices on a computing network that avoid user installation experience, persistent relationship configurations, and software driver downloads. In one described implementation, this self-bootstrapping is used in a device architecture 100 (FIG. 1), connectivity model, and device control protocol proposed by Microsoft Corporation, called Universal Plug and Play ("UPnP").

Universal Plug and Play

Universal Plug and Play (UPnP) is an open network architecture that is designed to enable simple, ad hoc communication among distributed devices and services from many vendors. UPnP leverages Internet technology and can be thought of as an extension of the Web model of mobile Web browsers talking to fixed Web servers to the world of peer-to-peer connectivity among mobile and fixed devices. UPnP embraces the zero configuration mantra of Plug and Play (PnP) but is not a simple extension of the PnP host/peripheral model.

The cost, size and battery consumption of computing technology—including processing, storage and displays—continues to fall. This trend is enabling the evolution of stand-alone, single or limited function computing devices such as digital cameras, audio playback devices, smart mobile phones and handheld computers. Concurrent with this, the economical storage and transmission of digital audio, video and still images is enabling highly flexible models for managing entertainment content.

While many of these devices are capable of useful stand-alone operation, seamless connectivity with the PC can enhance the value to the customer of both stand-alone devices and the PC. Good examples of this synergy are digital image capture combined with PC image manipulation, storage and email transfer/Web publishing and information synchronization between a PC and a handheld computer or smart mobile phone.

Since many of these devices, and the PC itself, are mobile, a suitable communication architecture must enable a highly dynamic connectivity model and must enable peer-to-peer operating among arbitrary combinations of devices.

The Internet has created a widespread awareness of the value of simple, universal communication that is independent of the underlying transmission technology and independent of technology from any single vendor.

UPnP makes it possible to initiate and control the transfer of bulk data (e.g. files) or A/V data streams from any device on the network, to any device on the network, under the control of any device on the network. UPnP enables the ad hoc addition or removal of devices on the network, and it enables multiple controlling devices to remain in sync with each other.

UPnP reuses existing protocols and technology whenever possible. The transition to this highly connected (and connectable) world will not occur overnight. UPnP builds on existing Internet protocols, but accommodates devices that cannot run the complete UPnP protocol suite. UPnP provides an architecture that enables legacy devices to communicate with UPnP devices.

IP internetworking has been chosen as a UPnP baseline due to its proven ability to span different physical media, to enable real world multiple vendor interoperation and to achieve synergy with the Internet and home and office intranets. Internet synergy enables applications such as IP telephony, multiple player games, remote control of home automation and security, Internet based electronic commerce, in addition to simple email and Web browsing. UPnP's scope includes remote control of devices and bulk data transfer, and can be easily extended to specify A/V streaming.

UPnP's media independence enables a great deal of flexibility in the packaging of products. UPnP enables an A/V system to be controlled through an A/C power communications technology, while the transmission of A/V streams among the components is analog or digital. One of the controllers of this system could be on the television, while another is on a PC, and yet another connected via radio or infrared.

Unlike Plug and Play, Universal Plug and Play is built on top of networking and enables ad hoc peer-to-peer connectivity. Networking, in this context, describes a style of connectivity that enables any networked device to initiate a communication with any other networked device, without having established a prior relationship or maintaining a persistent relationship between the devices. Networking also allows multiple devices to establish one or more connections with a single device, and it allows for a device to be capable of both initiating and accepting connections to/from other devices. The PnP, or host/peripheral, model is suitable whenever there is a natural persistent relationship between two devices (e.g. a keyboard, mouse and display maintain a persistent relationship with a host computer). Even though networking does not mandate low level persistent relationships, it provides the needed anchors (addresses) for applications to choose to maintain associations as a convenience for the customer (e.g. remembering commonly used networked printers).

In order to achieve multiple vendor peer-to-peer interoperation among devices, vendors desirably agree on common technology and standards up to the highest level of desired functional interoperation.

UPnP leverages formal protocol contracts to enable peer-to-peer interoperation. Protocols contracts enable real-world multiple-vendor interoperation.

UPnP provides a device-driven auto-configuration capability that preserves the experience that customers have on the Web. Today, it is possible to navigate around the Web without loading programs beyond the browser itself. UPnP enables the browser to be extended to control devices. Because UPnP devices are controlled with explicit protocols, the browser must somehow learn how to talk to UPnP devices. This learning process is driven entirely from the device itself and is accomplishing entirely by uploading an XML document that describes the capabilities of the device. The architectural component that enables device-driven auto-configuration is called the Rehydrator. The job of the Rehydrator is to convert between APIs and protocols.

There are some scenarios where the Web UI model is not sufficient for a rich customer experience. It would not be convenient to have a separate Web interface for each light switch in a house. To support a rich user interface and to enable the aggregation of devices into a single UI, UPnP enables application control in addition to browser control of devices. This is achieved simply by enabling applications to call the same Rehydrator APIs that the browser does. Applications can also directly generate and consume the raw UPnP control protocols, provided they are not interested in the device-driven auto-configuration enabled by the Rehydrator.

UPnP assumes that there will be more than one device with UI that wants to control other devices in any given network, and it provides a simple mechanism that enables these control points to remain in sync. This mechanism can easily support device front panels and wireless remotes that do not run UPnP protocols. The UPnP control model is third-party control; any device can transfer bulk data (e.g. files) or A/V data streams from any device on the network, to any device on the network, under the control of any device on the network.

Terminology

The detailed description that follows uses the terminology defined below.

Module. A component of a device, software program, or system that implements some "functionality", which can be embodied as software, hardware, firmware, electronic circuitry, or etc.

User Control Point. The set of modules that enable communication with a UPnP Controlled Device. User Control Points initiate discovery and communication with Controlled Devices, and receive Events from Controlled Devices. User Control Points are typically implemented on devices that have a user interface. This user interface is used to interact with Controlled Devices over the network. The modules minimally include a Discovery Client, a Description Client, a Rehydrator, an Event Subscription Client and an Event Sink. User Control Points may also include Visual Navigation, a Web browser and an application execution environment. User Control Points can add value to the network by aggregating the control of multiple Controlled Devices (the universal remote) or they can implement a function as simple as initiating the transfer of data to or from a Controlled Device. Examples of devices that could be User Control Points are the personal computer (PC), digital television (DTV), set-top box (STB), handheld computer and smart mobile phone, and the like. Nothing prevents a single device from implementing the functionality of a User Control Point and one or more Controlled Devices at the same time.

Controlled Device. The set of modules that perform certain tasks (e.g., printing) and communicate with a User Control Point. Controlled Devices respond to discovery requests, accept incoming communications from User Control Points and may send Events to User Control Points. Devices that support Controlled Device functionality may also support local user interfaces such as front panel displays or wireless remotes. The modules minimally include a Discovery Server, a Description Server, a Control Server, an Event Subscription Server and an Event Source. Controlled Devices may also include a Presentation (e.g., Web) Server. Examples of devices that could be Controlled Devices are the VCR, DVD player or recorder, heating/ventilation/air-conditioning equipment (HVAC), lighting controller, audio/video/imaging playback device, handheld computer, smart mobile phone and the PC, and the like. Nothing prevents a single device from implementing the functionality of a User Control Point and one or more Controlled Devices at the same time.

Bridge. A set of modules that enables Bridged and Legacy Devices to interact with native UPnP devices. The bridge itself exposes a collection of UPnP Controlled Devices to User Control Points. The Bridge maps between native UPnP Device Control Protocols and the underlying protocols or other control methods exposed by the Bridged and Legacy Devices. Optionally, such a device could expose UPnP Controlled Devices to Legacy Devices in the manner required by the Legacy Devices. Nothing prevents a single device from implementing the functionality of a User Control Point, one or more Controlled Devices and a Bridge at the same time.

Service Provider. A module used by a UPnP Bridge that translates between UPnP protocols and the protocols used by Bridged and Legacy Devices. No Service Providers are required for communication among native UPnP devices.

Bridged Device. A device that cannot participate in UPnP at the native protocol level, either because the device does not have sufficient resources or because the underlying media is unsuitable to run TCP and HTTP. Examples of devices that could be Bridged Devices are power line-controlled A/V equipment, light switches, thermostats, wristwatches and inexpensive toys. Bridged Devices are UPnP complaint and are exposed to other UPnP devices through a UPnP Bridge.

Legacy Device. Any non-UPnP compliant device that must be exposed to other UPnP devices through a UPnP Bridge.

Device Model. The UPnP model of Controlled Devices. The Device Model includes the addressing schemes, Description Document, Devices and Services hierarchy and the functional description of Services.

Device Control Protocol (DCP). A complete set of UPnP protocols and schemas used to interact with a UPnP Controlled Device.

Device Definition. The formal definition of a Device Type. A Device Definition includes a Device Type Identifier, the fixed elements in the Description Document, the required set of Service Definitions in the Root) Device, and the hierarchy of required Devices and Service Definitions.

Service Definition. The formal definition of a Service Type. A Service Definition includes a Service Type Identifier, definition of the Service State Table (SST), definition of the Service Command Set, the Service Control Protocol (SCP) and Service Control Protocol Declaration (SCPD).

Device. In the context of the Device Model, a container for Services. A Device generally models a physical entity such as a VCR, but can also represent a logical entity. A PC emulating the traditional functions of a VCR would be an example of a logical device. Devices can contain other Devices. An example would be a TV/VCR packaged into a single physical unit. UPnP enables the association of user interface (display icon and root Web page) with every Device, including Root Device.

Root Device. The topmost Device in a hierarchy of nested Devices. A Device with no nested Devices is always a Root Device.

Device Type. A relatively high level classification of Devices with common functionality. Device Type is intended to enable Devices to be simply and automatically grouped for search and/or presentation. An example of a Device Type is "VCR". Device Types are formally defined in terms of a required set of Service Definitions of minimum version that a compliant Device must support. UPnP supports searches for all Devices of a specified Device Type.

Device Type Identifier. A unique identifier that identifies a Device Definition. This identifier adheres to the format of a Uniform Resource Identifier (URI). See, T. Berners-Lee, R. Fielding, L. Masinter, "Uniform Resource Identifiers (URI): Generic Syntax", which can be found at http://www.ietf.org/rfc/rfc2396.txt.

Device Friendly Name. A human readable string that is usually initialized by vendors at the time of manufacturer of a Device. Every Device, including Root Devices, has a Device Friendly Name. A typical Device Friendly Name will contain manufacturer and model information, and especially when interpreted by humans, can be used to enable a more precise identification of a UPnP Device from the set of discovered Devices. Once identified, the Unique Device Name (UDN) can be used to unambiguously identify the same Device in the future. UPnP enables Device Friendly Names to be changed by User Control Points. The Device Friendly Name should not be used as device identifier.

Unique Device Name (UDN). The fundamental identifier of a Device. Every Device, including Root Devices, has exactly one UDN. The UDN is globally unique and permanent, even across power cycles and physical location changes. The UDN is the only UPnP device identifier guaranteed never to change. UPnP enables searches for devices by UDN.

Description Document. A structured unit of data that is used by a User Control Point or UPnP Bridge to learn the capabilities of a Controlled Device. Description Documents are retrieved from the Description Server on a UPnP Controlled Device. There is one Description Document for every Root Device that describes the Root Device and all non-Root Devices. Description Documents adhere to XML grammar. To support localization, multiple Description Documents can exist. A User Control Point requests the preferred localized Description Document by using the standard HTTP "accept-language" header.

Service. The fundamental UPnP controllable entity (but not the finest level of control). An example of a Service is "Clock". Services are defined with a mandatory common base set of functionality. Vendors can extend the base set with proprietary extensions provided the base functionality is implemented. Service Definitions are versioned and later versions are constrained to be supersets of previous versions. UPnP enables searches for all Devices that contain a specified Service of a minimum version. This search would find all clocks, regardless of their packaging. A search for Device Type "Clock" would be used to find only stand-alone clocks.

Service Type. A classification of Services by their function.

Service Type Identifier. A unique identifier that identifies a Service Definition. This identifier adheres to the format of a Uniform Resource Identifier (URI). See, T. Berners-Lee, R. Fielding, L. Masinter, "Uniform Resource Identifiers (URI): Generic Syntax", which can be found at http://www.ietf.org/rfc/rfc2396.txt.

Service State Table (SST). A logical table consisting of rows of [Variable, Type, Legal Values, Default Value, Current Value] that represents the current electrical, mechanical and/or logical state of a Service. SST instances are stored on the Controlled Device itself and are the ultimate authority of the state of the Service. All local user interface, such as front panels or wireless remotes are required to update the SST on UPnP compliant devices.

SST Definition:

Service Command Set. A set of Commands that can be invoked on a Service. Commands generally result in changes in the Current Value field of one or more rows of a SST. Commands are logically represented in the format Command (Variable=New Value, Variable=New Value, . . . ). Services must accept or reject the complete set of changes to a SST. There is a mandatory standard Query Command that is used to retrieve the Current Value of any row of a SST.

Service Command Set Definition:

Service Control Protocol (SCP). The protocol used to invoke Commands against a Service and to return results. There is exactly one SCP per Service Definition. SCPs adhere to the grammar of SCP XML schema. SCPs can be generated by an automated tool that accepts a SST Definition and a Command Set Definition as input.

Service Control Protocol Declaration (SCPD). A formal representation of the schema of a Service. The SCPD declares the rows of a Service's SST and the associated Command Set. SCPDs are uploaded from Controlling Devices in their Description Documents and enable User Control Points or Bridges to invoke Commands on the Service without any prior or persistent knowledge of the capabilities (or schema) of the Service. There is exactly one SCPD per Service Definition. SCPDs adhere to XML grammar. SCPDs can be generated by an automated tool that accepts a SST Definition and a Command Set Definition as input.

Event. An unsolicited message generated by a Controlled Device and delivered to one or more User Control Points. Events are used to maintain a consistent view of the state of Service across all interested User Control Points. UPnP leverages the GENA event architecture (see "Generic Event Notification") to transport event messages. All events are delivered using TCP/IP for reliability.

Generic Event Notification Architecture (GENA). An event transport protocol. GENA leverages TCP/HTTP as a transport. GENA has been submitted as an Internet Draft to the IETF. See, J. Cohen, S. Aggarwal, Y. Goland, "General Event Notification Architecture Base: Client to Arbiter", which can be found at http://www.ietf.org/internet-drafts/draft-cohen-gena-client-00.txt.

Simple Service Discovery Protocol (SSDP). A simple network device discovery protocol. UPnP uses SSDP to allow User Control Points to find Controlled Devices and Services. SSDP operates in a default, completely automatic multicast UDP/IP based mode in addition to a server-based mode that uses TCP/IP for registrations and query. Transitions between the default dynamic mode and server-based mode are automatic and transparent to upper level software. SSDP enables every Controlled Device to control the lifetime that its Description URL is cached in all User Control Points. This enables a Controlled Device to remain visible to User Control Points for a relatively long time (through power cycles), in addition to enabling a Controlled Device to appear and disappear very quickly, all under the control of the Controlled Device. SSDP and related Multicast and Unicast UDP HTTP Messages specifications have been submitted as Internet Drafts to the IETF. See, Y. Goland, "Multicast and Unicast UDP HTTP Messages", which can be found at http://www.ietf.org/internet-drafts/draft-goland-http-udp-00.txt; and Y. Goland, T. Cai, P. Leach., Y. Gu, S. Albright, "Simple Service Discovery Protocol/1.0", which can be found at http://www.ietf.org/internet-drafts/draft-cai-ssdp-v1-02.txt.

Client. In the context of UPnP, Client refers to a module that initiates a TCP/HTTP connection to a peer HTTP server.

Server. In the context of UPnP, Server refers to an HTTP server. This is a module that accepts incoming TCP/HTTP connections and either returns a Web page or forwards the payload data to another module. Client and Server describe only the direction of initiation of TCP/HTTP connections. There is no relationship between the low level concepts of Client and Server and the high level concepts of User Control Point and Controlled Devices. Logically, User Control Points always discover and initiate communication with Controlled Devices, but this communication requires Client and Server functionality on both sides.

Hostname. A Hostname is the Domain Name System (DNS) or NetBIOS Name Service (NBNS) that, when resolved to an IP address, represents a network interface that can be used to establish TCP/IP level connectivity to User Control Points, Controlled Devices or Bridges. Hostnames can be used to provide persistent network level addressing on a network where IP addresses are dynamically assigned and of unknown lifespan or to integrate with an existing managed network. UPnP provides an algorithm for seeding a device's hostname from its UDN at manufacturing time.

Uniform Resource Locator (URL). A format for expressing Web addresses. URLs minimally contain an identification of the protocol family that the URL is valid for, a Hostname, and a path. UPnP uses URLs as addresses whenever the module accepting the incoming connection is an HTTP server.

Description URL. The URL returned from a Controlled Device or Bridge in response to any UPnP SSDP query. This URL always points to a Description Server on the Controlled Device. An HTTP GET can be issued on this URL to retrieve the Description Document. This URL is valid as an address for the lifetime of the Hostname embedded in the URL.

Discovery Server. The module that runs in a Controlled Device or Bridge that responds to SSDP queries. This Server is unique in that it must support UDP/HTTP in addition to TCP/HTTP.

Discovery Client. The module that runs in a User Control Point that initiates SSDP queries.

Description Server. The module that runs in a Controlled Device or Bridge that responds to HTTP GETs and returns Description Documents. This service consists of a TCP/HTTP server than can retrieve and return a Description Document from persistent storage (like a filesystem).

Visual Navigation. User Control Point functionality that displays the icons of discovered Devices and enables the transfer of control to a browser or application to interact with the Controlled Device. In Windows, Visual Navigation could be implemented as a folder of icons.

Presentation URL. A URL that can be used by a User Control Point to navigate to the Presentation Server of a Controlled Device. This URL is returned in the Description Document and is valid as an address for the lifetime of the Hostname embedded in the URL. All Devices, including non-Root Devices, can have an associated Presentation URL.

Presentation Server. A Web Server in most common cases. The module that runs in a Controlled Device that responds to HTTP GETs or Presentation URLs and returns user interface using Web technologies (JavaScript, Jscript®, ECMAScript, VBScript, ActiveX®, Java Applet, etc.).

Browser. A Presentation Client. A Web browser extended with a Rehydrator.

Control URL. A URL that can be used by a User Control Point to navigate to the Control Server of a Controlled Device or Bridge. This URL is returned in the Description Document and is valid as an address for the lifetime of the Hostname embedded in the URL. All Services have an associated Control URL.

Control Server. The module that runs in a Controlled Device or Bridge that responds to Commands invoked on a Service by a User Control Point. Commands are encoded and sent using the SCP specified in the Service Definition. This service consists of a TCP/HTTP server that passes control to the native control logic of a Service, updates the SST and generates an event if the SST changes.

Rehydrator. In UPnP, a Control Client. A User Control Point module that translates between native operating system APIs and SCPs and events. The Rehydrator uploads SCPDs from Controlled Devices and Bridges and generates appropriate SCPs in response to application API requests to invoke Commands.

Event Subscription URL. A URL that can be used by a User Control Point to navigate to the Event Subscription Server of a Controlled Device or Bridge. This URL is returned in the Description Document and is valid as an address for the lifetime of the Hostname embedded in the URL. All Services have an associated Event Subscription URL.

Event Subscription Server. The module that runs in a Controlled Device or Bridge that responds to GENA SUBSCRIBE requests from User Control Points. A SUBSCRIBE informs the Controlled Device or Bridge of the User Control Point's desire to receive future events. This service consists of a TCP/HTTP server that adds the User Control Point's Event Sink URL to the list of destinations to be NOTIFY'd whenever the SST associated with the Service changes.

Event Subscription Client. The module that runs in a User Control Point that sends GENA SUBSCIBE messages to the Event Subscription Server.

Event Sink URL. A URL, supplied by a User Control Point, that is used as an address to send event NOTIFYs to. This URL is valid as an address for the lifetime of the Hostname embedded in the URL. There is no explicit relationship between Event Sink URLs and Subscription Identifiers.

Subscription Identifier (SID). A header in the GENA NOTIFY message that identifies the source of an event. In UPnP, the SID can be considered as an alias for the Event Source instance.

Event Sink. The module that runs in a User Control Point that accepts incoming GENA event NOTIFYs. This service consists of a TCP/HTTP server that passes the event information to interested applications running on the User Control Point.

Event Source. The module that runs in a Controlled Device or Bridge that sends GENA NOTIFYs to the Event Sink Servers of SUBSCRIBES User Control Points.

Domain Name System (DNS). A distributed system of servers that locates the IP addresses of other computers on a network based on their hierarchical names.

NetBIOS Name Server (NBNS). A server that locates the IP addresses of other computers on a network based on their flat NetBIOS computer names.

Multicast DNS (MDNS). A peer-to-peer translation scheme that does not require involvement of DNS servers.

UPnP Technologies Overview

An overview of technologies utilized in UPnP follows.

Device Discovery: Simple Service Discovery Protocol (SSDP)

TCP/IP provides the ability to initiate a connection with a specified application running on a specific device, provided both the network address of the device (IP address) and the application address (port) are known. Generally, application addresses (ports) are standardized and widely known, but the problem of learning the IP address of a device remains.

Simple Service Discovery Protocol (SSDP) is a protocol that enables devices to learn of the existence of potential peer devices and the required information (an IP address) needed to establish TCP/IP connections to them. The successful result of an SSDP search is a Uniform Resource Locator (URL). The Hostname embedded in the URL can be resolved to an IP address that can be used to make a connection to the discovered device. The name to address resolution is outside of the functionality of SSDP.

SSDP specifies a default, completely automatic, best-effort multicast UDP-based operating mode, in addition to a server mode that uses TCP for registration and query. Fall-forward to server mode and fallback to the default dynamic mode can occur automatically and transparently as a server is added or removed from a network. Server mode can be used to reduce network traffic, to implement searches based on location or policy and to integrate with a directory system.

SSDP requires that all devices specify a maximum lifetime that SSDP level knowledge of the device will remain cached in other network devices. If a device does not refresh the cache of other network devices before this interval expires, the device will be assumed to have disappeared from the network. This interval can be chosen to be larger than a typical power down cycle to enable device visibility to persist for a relatively long time, or a smaller interval can be chosen to enable more dynamic visibility control. In all cases, devices that are abruptly removed from the network will eventually disappear from all networked devices.

In response to an SSDP search, UPnP devices return a Description URL in the SSDP Location and optionally the Alternate Location (AL) SSDP headers.

An example location header is a follows:

Location: http://device.local/description/path/description.xml

In this example, the device.local is the Hostname of the Controlled Device, and the "description/path/description.xml" element of the URL is the path and name of the Description Document on the device.

Eventing: Generic Eventing Notification (GENA)

Eventing, in the context of UPnP, is the ability for a device to initiate a connection at any time to one or more devices that have expressed a desire to receive events from the source device. Events are used to enable synchronization among multiple devices organized into a many to one relationship. UPnP events are mainly used for asynchronous notifications of state changes.

TCP/IP provides the fundamental support for the connections that carry event information reliably. Generic Event Notification (GENA) adds conventions for establishing relationships between interested devices and an addressing scheme to enable the unambiguous delivery of events. GENA leverages HTTP addressing and encapsulation.

User Control Points, Controlled Devices and Bridges

Figure 2:
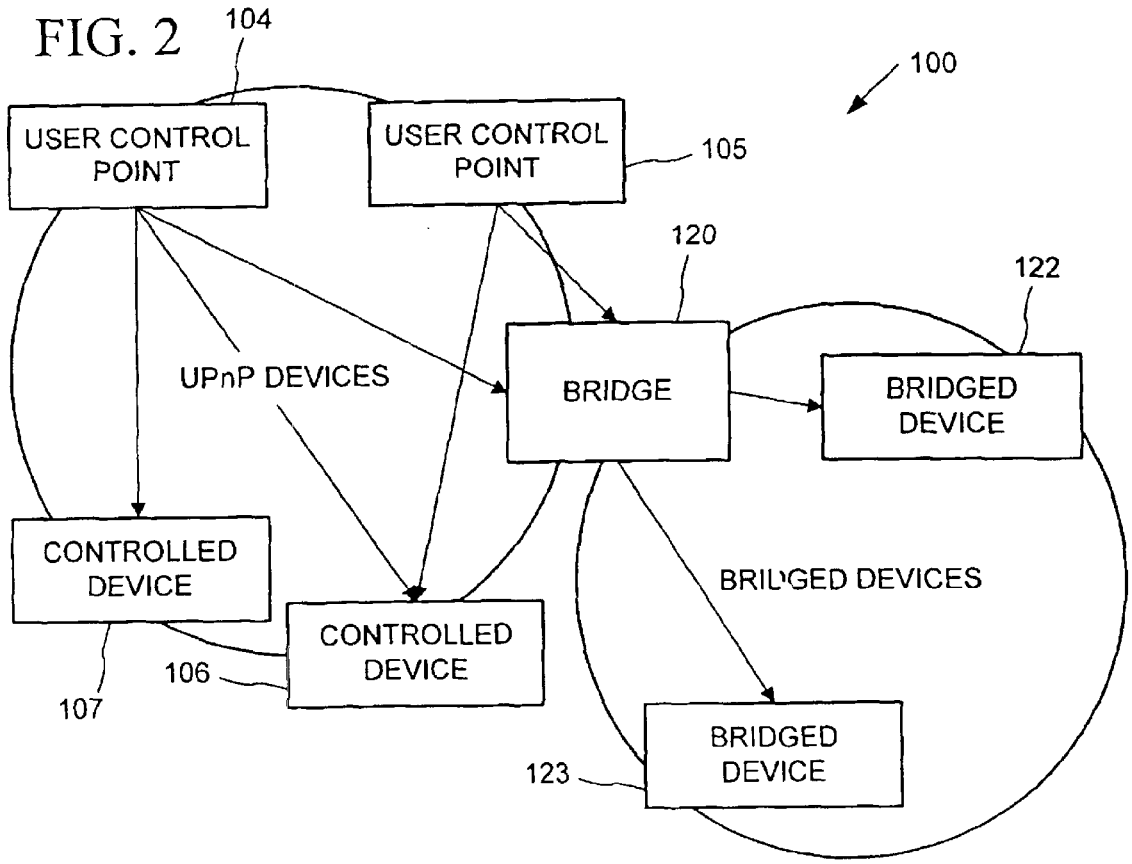

With reference now to FIGS. 1 and 2, UPnP is an application-level distributed network architecture where the logical nodes on the network are User Control Points 104–105, Controlled Devices 106–107 and Bridges 120. These classifications refer to functionality rather than physical entities. The functionality of UPnP User Control Points 104–105, Controlled Devices 106–107 and Bridges 120 can be packaged into physical entities (e.g., multiple function devices 102–103) in any combination.

The primary distinction between a User Control Point 104–105 and a Controlled Device 106–107 is that the User Control Point is always the communication initiator. After the initial communication, User Control Points can receive events from Controlled Devices.

Controlled Devices 106–107 are responsible for storing and updating the state of Services. User Control Points are required to synchronize to the state on Controlled Devices and to share state directly among themselves.

User Control Points typically have user interface that is used to access one or more Controlled Devices on the network. Controlled Devices typically only have local user interfaces.

Bridges 120 (FIG. 2) expose devices that do not expose native UPnP protocols as native UPnP Controlled Devices. The Bridge itself looks to other UPnP User Control Points like a set of Controlled Devices.

The following table lists the modules in the User Control Points 104–105 and Controlled Devices 106–107, along with their functions.

| User Control Point | | Controlled Device | |
|---|---|---|---|
| Function | Module | Function | Module |
| Initiate discovery of Controlled Devices. | Discovery Client | Respond to discovery requests. | Discovery Server |
| Retrieve Description Documents. | Description Client | Provide Description Documents. | Description Server |
| Display a folder of icons per discovered Device and allow transfer of control to a selected device. | Visual Navigation | | |
| View user interface exposed by a Controlled Device. | Web Browser | Provide user inteface for remote User Control Points. | Presentation (Web) Server |
| Execute applications. | Application Execution Environment | | |
| Invoke Commands on a Controlled Device by sending Service Control Protocols in response to local API calls. | Rehydrator | Accept incoming Commands in SCPs and execute them. | Control Server plus native control logic |
| Inform a Controlled Device of a desire to receive Events. | Event Subscription Client | Accept requests for Events and remember them. | Event Subscription Server |
| Receive an Event. | Event Sink | Send an Event. | Event Source |

Device Model

Figure 3:
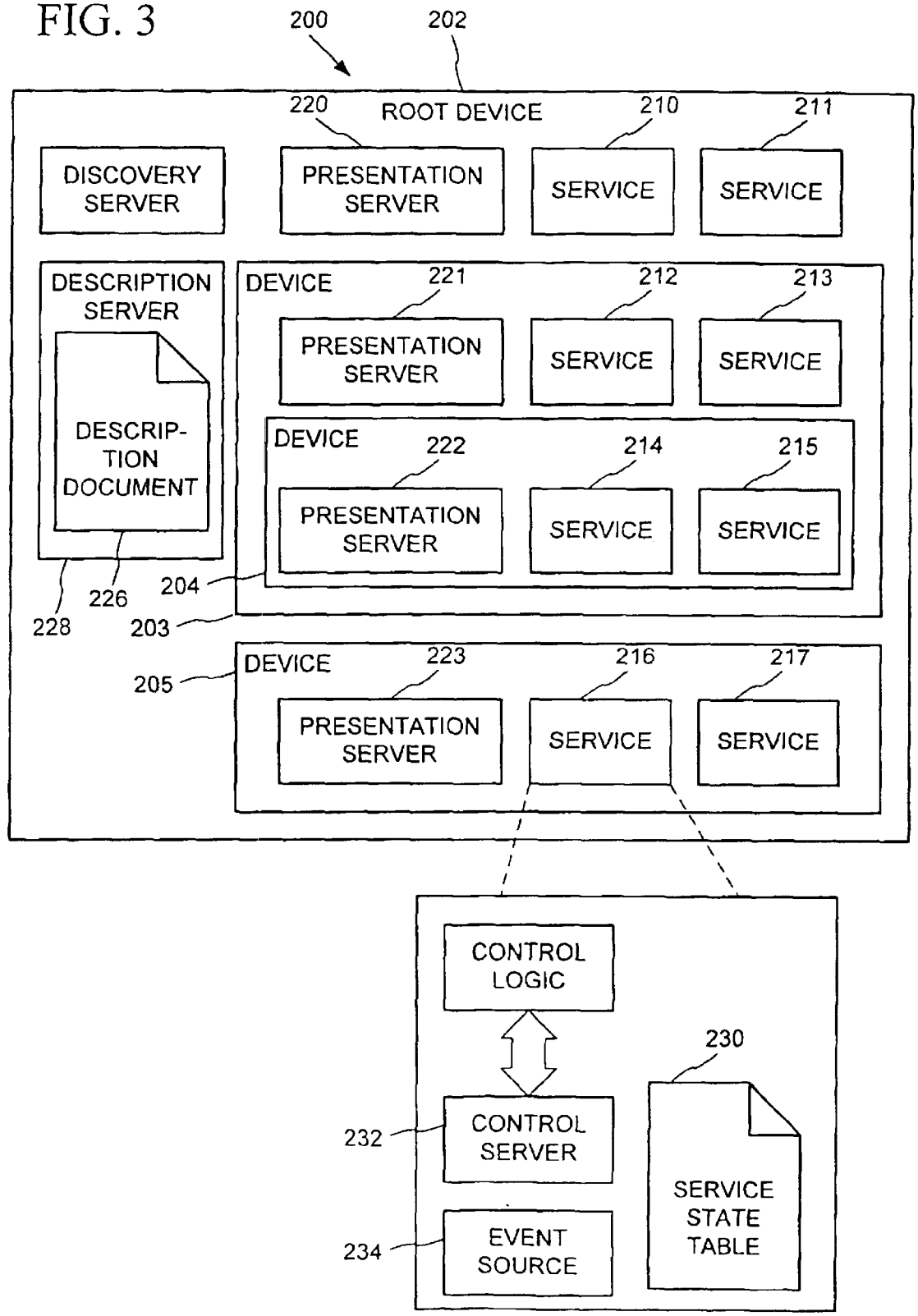
FIG. 3 is a block diagram of a device model per Universal Plug and Play.

The UPnP Device Model 200 shown in FIG. 3 is the model of a UPnP Controlled Device or Bridge that is emulating native Controlled Devices. The Device Model includes the addressing scheme, eventing scheme, Description Document schema, Devices and Services schema and hierarchy, and the functional description of modules. The UPnP Device Model extends beyond simple API or a command and control protocol definitions to enable multiple User Control Points to have a consistent view of Controlled Devices. This requires that the state of running services be formally modeled and that all state changes be visible to User Control Points. Central to the distributed UPnP architecture is the rule that Controlled Devices are the ultimate authority for the state of Services running on them.

Service

The fundamental controllable entity in UPnP is a Service 210–217. Every running instance of a Service includes:

A Service State Table (SST) 230, which represents the current state of the Service.

The SST 230 can be used to represent the operational mode of device or to act as an information source or sink for structured data or simple files. The SST of a VCR 254 (FIG. 4) could represent the current transport mode, tuner channel selection, input and output switch selections, audio and video decoding format and current timer program. The SST of clock 251 (FIG. 4) would likely represent the current time. The SST of an image rendering device could implement a video frame-buffer that can accept raw pixel information or formatted JPG files. The SST of an audio or video playback device could implement a transfer buffer or queue of material to be played. The SST of PDA could implement a collection of formatted data that has changed and needed to be synchronized with another device, in addition to a transfer buffer for accepting incoming formatted data.

The logical structure of a SST published in the Service Definition, but the actual storage format of an instance of a SST is entirely up the device. The only interaction with a SST is through a formal application level network protocol.

A Control Server 232, which accepts incoming Commands expressed in the Service's Service Control Protocol (SCP). The Control Server passes the command to the Service's native command processing logic and waits for command completion. When the command is completed successfully, the SST is updated, an event is generated, and a successful response is returned to the User Control Point. In the event of an illegal command or unsuccessful command, no changes are made to the SST and a failure response is returned. The Command and response sequence is payload to a TCP/HTTP request/response.

An Event Subscription Server and Event Source 234. The Event Subscription Server accepts incoming GENA SUBSCRIBE messages from User Control Points and adds them to a list of User Control Points interested in SST change events from the Service. The Event Source initiates a TCP/HTTP connection to each interested User Control Point and sends a GENA NOTIFY each time the Service's DST changes. The NOTIFY payload includes the changed contents of the DST.

A Control URL that identifies the Control Server.

An Event URL that identifies the Event Subscription Server.

The formal definition of a Service (Service Definition) includes:

The definition of the SST. SST layouts are logically specified in terms of rows of [Variable, Type, Legal Values, Default Value]. The actual instance of a SST would also include a Current Value field in every row.

The definition of the Service Command Set that can be invoked against the Service's SST. Commands are logically specified in terms of Command ( Variable= New Value, Variable=New Value, . . . ). If a Command results in more than a single Variable change, the updates are atomic and the Command will fail if it is illegal to make the specified change to any one Variable.

The definition of a structured unit of data called a Service Control Protocol Declaration (SCPD). SCPD is used to advertise the layout (schema) of the SST and Command Set of the Service to a User Control Point or Bridge. The SCPD enables the User Control Point to invoke Commands (through the Rehydrator) on the Controlled Device without any prior or persistent knowledge of the capabilities of the device. The SCPD is uploaded from the Controlling Device as part of the Description Document. Generation of the SCPD for a Service based on its SST definition and Command Set definition can be fully automated.

The definition of a network protocol used to invoke Commands against the SST associated with a Service and to return results. The SCP can be generated from the SCPD. The Rehydrator's job is to convert SCPDs into SCPs. The reason for a formal SCP specification is to enable the implementation of the Control Server itself and to enable simple peer-to-peer device interoperation using only published protocols.

An identifier, called the Service Type Identifier, that identifies a unique Service Definition. Service Definitions are versioned in controlled manner. Every later version of a Service must be proper superset of the previous version.

Device

According to the device model 200 shown in FIG. 3, a UPnP Device 202–205 (e.g., multiple function devices 102–103 of FIG. 1 and bridged devices 122–123 of FIG. 2) is a logical container of one or more Services 210–217. Generally a Device represents a physical entity such as a VCR. Typical Services in the VCR Device example might be "TRANSPORT", "TUNER", "TIMER" and "CLOCK". While Devices are often physical entities, a PC emulating the traditional functions of a VCR could also be modeled in the same way as the stand-alone VCR. Devices can contain other Devices. An example would be a TV/VCR 250 (FIG. 4) packaged into a single physical unit. A Device (e.g., devices 202–203) may also be a logical container of other Devices. The top-most Device in a hierarchy of nested Devices 203–205 is called the Root Device 202. A Device with no nested Devices is always a Root Device.

The UPnP Device Model was designed to be general and flexible. It should be possible to model an entire Nuclear Power Plant as a single Service or as a deeply nested hierarchy of Devices and Services. In general, a Service 210–217 is cohesive set of functions that enables flexible packaging into a variety of Devices. Services can be versioned independently of Devices.

Figure 4:
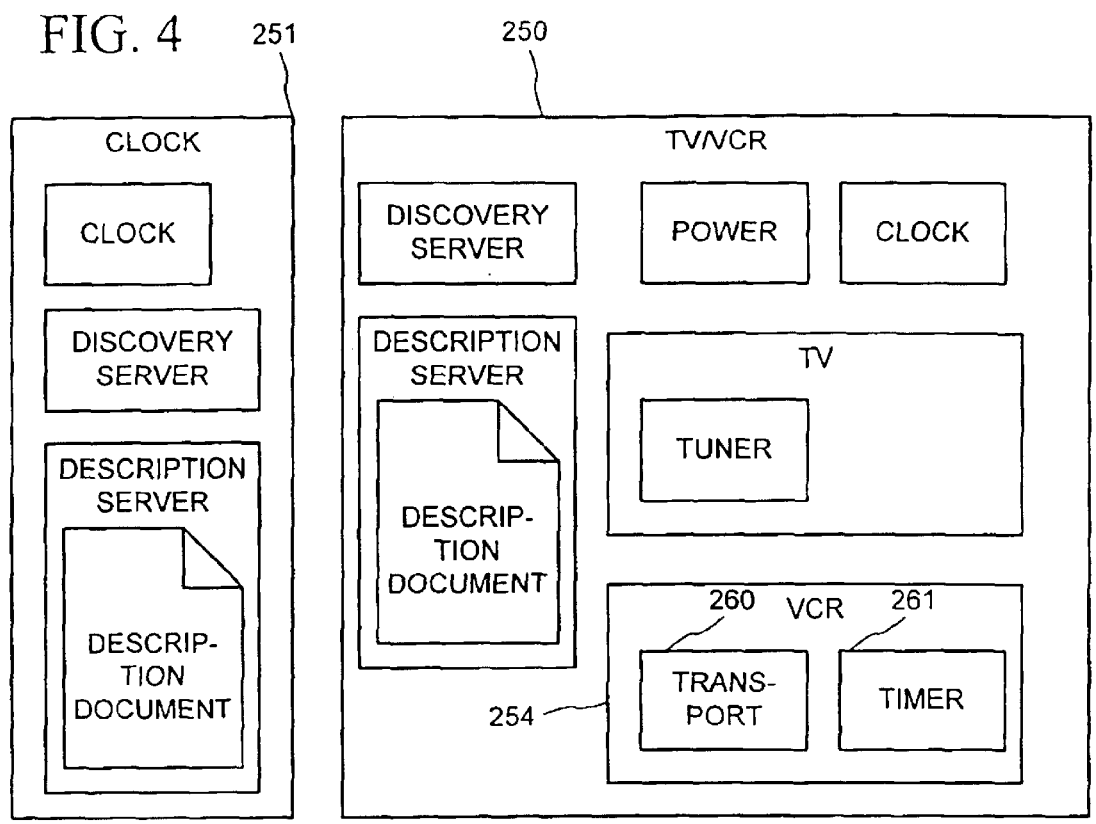
FIG. 4 is a block diagram illustrating example devices conforming to the device model of FIG. 3.

All Devices, including Root Devices belong to one or more Device Types. Device Types are intended to enable instances of Devices to be simply and automatically grouped for presentation. An example of a Device Type is "VCR" 254 (FIG. 4). Device Types are formally defined in terms of a minimal set of versioned Services that a Device of Device Type must support. Device Types are not formally versioned. Device Type is a relatively high level grouping. A Device of Device Type only ensures that minimal set of Services of a minimal version is present. There can be other Services, higher versioned Services and Services with vendor extensions present on such a Device.

UPnP enables SSDP level searches for a unique instance of a Device (by UDN), all Devices of type Device Type and all Devices that contain at least one Service Type of minimum version. The result of an SSDP search is always a URL that points to the Description Document contained in the Root Device. In the event that matching Device is not the Root Device, the Description Document has a tree of nested Devices that can be traversed to find the matching Device.

Every Device includes:

One or more Device Types.

One or more Services.

Optionally, one or more Devices.

Optionally, a Presentation (Web) Server 220–223 that can be used to expose Device user interface. Every Presentation Server has an associated Presentation URL.

A globally unique identifier called the Unique Device Name (UDN). The UDN is the fundamental identifier of an instance of a Device. Every Device, including Root Devices, has exactly one UDN.

Every Root Device 202 also includes the Description Document 226 and Description Server 228 for all Devices under and including itself.

The formal definition of a Device (Device Definition 226) includes:

The fixed elements of the Description Document that describe the Device.

The required hierarchy of Devices and Service Definitions.

There can be many Device Definitions that belong to a single Device Type.

Device Types

The formal definition of a Device Type includes:

A Device Type Identifier.

The required hierarchy of Devices and Service Definitions of minimum versions.

Service State Table

A Service State Table (SST) logically consists of rows of:

Variable, Type, Legal Values, Default Value, Current Value Although entries of the Service State Table in UPnP consist of these five items, the state table alternatively can contain fewer or additional items. Generally, each entry will minimally consist of a Variable name or identifier, and its current value.

The following table lists various Types available in UPnP.

| Type | Description | Example |
| --- | --- | --- |
| String | A sequence of UNICODE characters. | |
| Number | A number, with no limit on digits; may potentially have a leading sign, fractional digits, and optionally an exponent. Punctuation as in US English. | 15, 3.14, −123.456E+10 |
| Boolean | TRUE or FALSE. | |
| DateTime | A date in 1SO8601 format, with optional time and optional zone. Fractional seconds may be as precise as nanoseconds. See, "Data elements and interchange formats - Information interchange - Representation of dates and times", which can be found at http://www.iso.ch/markete/8601.pdf. | 19941105T08:15:5+03 |
| ByteBlock | An unstructured sequence of bytes. | |

The ByteBlock is essentially a data buffer. In one use, a variable of this type can be used to effect transfer of a file from the Controlled Device to the User Control Point. The file to be transferred is kept in the Service State Table as the current value of this variable. On a change in the file, the file is transferred to any subscribing User Control Point in an event notification.

The reason for representing Services this way is to ensure that the state of a Service is easily available in a common way to multiple User Control Points.

An SST can be used to represent to current operational mode of device, act as an information source or sink and/or simply be a repository for commands. The SST of a VCR Service could represent the current transport mode, tuner channel selection, input and output switch selections, audio and video decoding format and current timer program. Alternatively, the VCR 254 could be represented as a Transport Service 260, Tuner Service, I/O Switch Service, A/V Decoding Configuration Service and Programmable Timer Service 261.

The SST of a clock 251 would likely represent the current time. Additionally an alarm clock could include Service Variables to configure the clock.

The SST of an image rendering device could implement a video frame-buffer that can accept raw pixel information or formatted JPG files. The SST of an audio or video playback device could implement a transfer buffer or queue of material to be played. The SST of PDA could implement a collection of formatted data that has changed and needed to be synchronized with another device, in addition to a transfer buffer for accepting incoming formatted data.

User Control Point Synchronization

Figure 5:
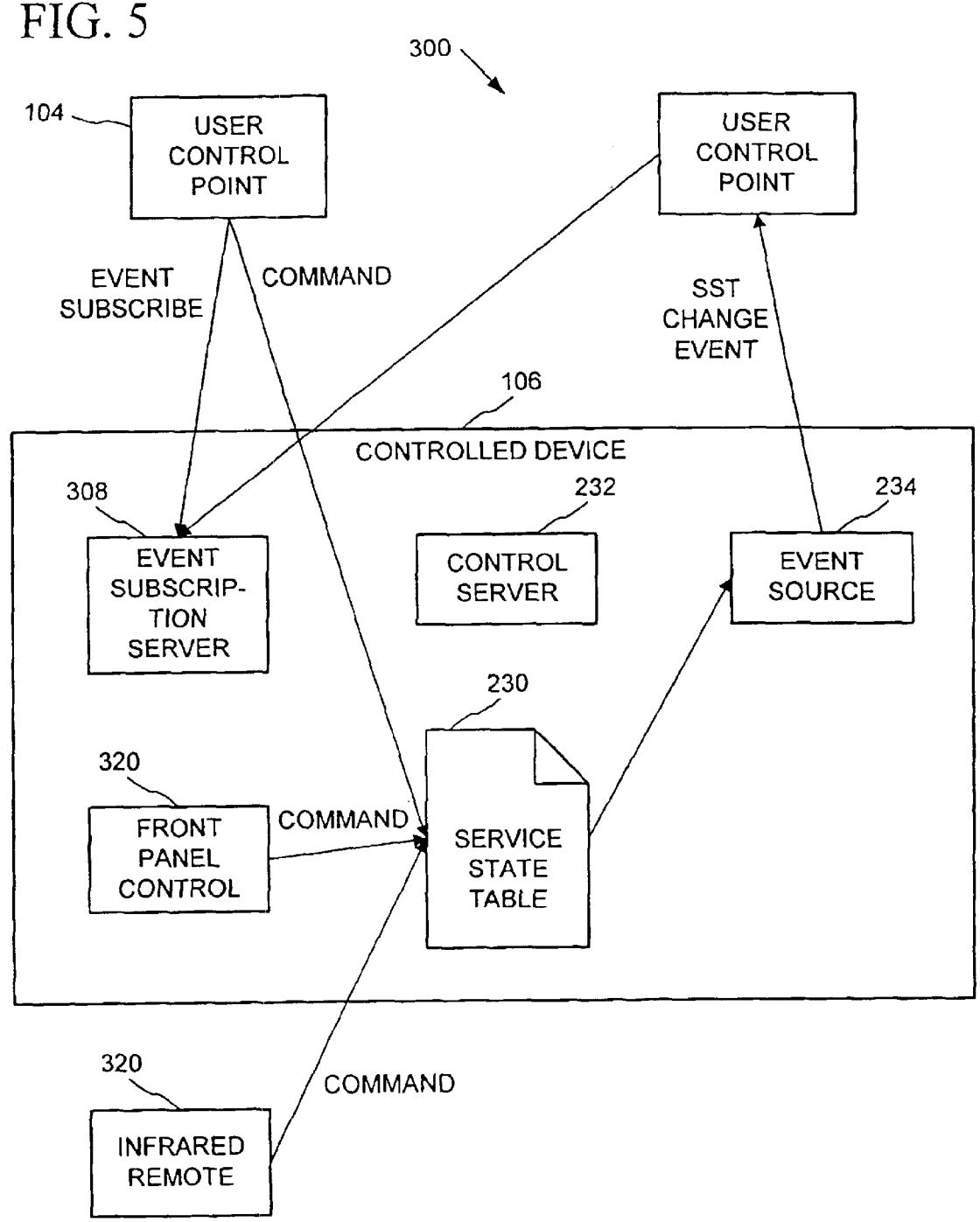
FIG. 5 is a block diagram illustrating device state synchronization using a state table and eventing.

In accordance with an device state and eventing model illustrated in FIG. 5, UPnP rules require that every change to an SST generate a corresponding event to announce the change to the all interested User Control Points.

UPnP Self-Bootstrapping

Figure 6:
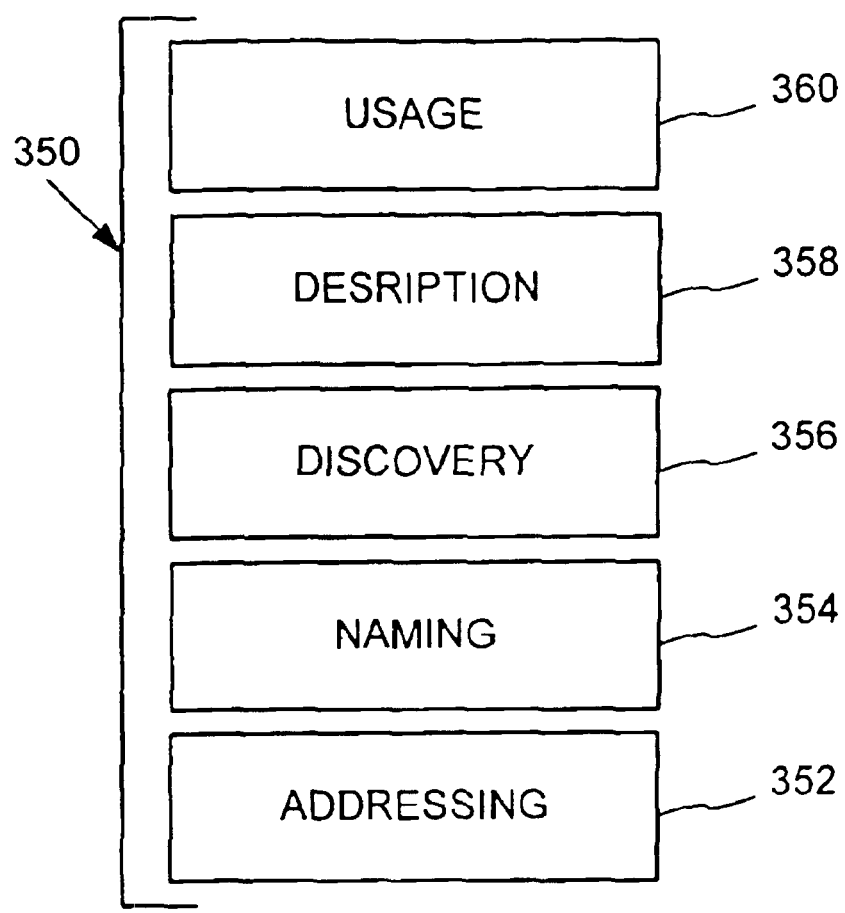
FIG. 6 is a block diagram of layers in a self-bootstrapping process including addressing, naming, discovery and description layers per the device control model of FIG. 3.

With reference to FIG. 6, UPnP self-bootstrapping 350 is an integrated set of technologies organized as layers of a stack that include addressing 352, naming 354, discovery 356, and description 358 layers. The technologies in these layers is discussed in detail below. At the addressing layer 352, UPnP utilizes the Dynamic Host Configuration Protocol (DHCP) and AutoIP protocol for device addressing described below, which operate to dynamically assign an address to a UPnP device when introduced on a network. At the naming layer 354, UPnP utilizes the Domain Name System (DNS) and multicast DNS protocols and/or the NetBIOS Name Service (NBNS) protocol to provide services to refer to devices using names according to a naming convention. At the discovery layer 356, UPnP utilizes the Simple Service Discovery Protocol (SSDP) protocol by which a UPnP device can discover other devices present on the network. At the description layer 358, UPnP utilizes XML-based schema to describe device structures and operational functions exposed by a UPnP Controlled Device and XML message-based protocols for their invocation. The UPnP user control points can use this XML-based schema description to invoke and thereby control the UPnP Controlled Device at a usage layer 360.

Device Addressing

Figure 7:
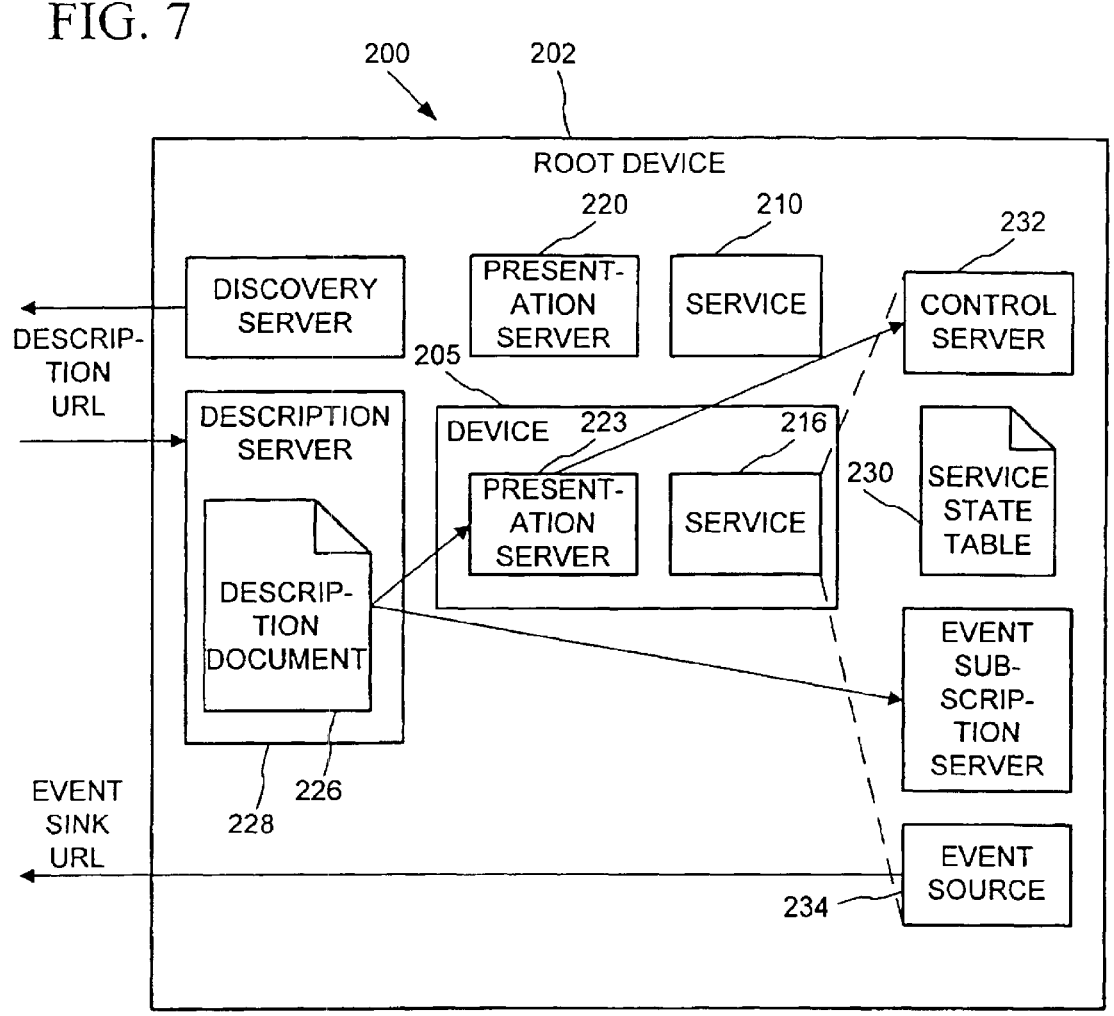
FIG. 7 is a block diagram illustrating device addressing.

With reference now to FIG. 7, UPnP is built on top of HTTP and leverages the native address format of the Web, Uniform Resource Locators (URLs), beyond the basic network addressing. URLs minimally contain an identification of the application protocol family ("http") that the URL is valid for, a Hostname and a path. In the context of UPnP, the path part of a URL can represent either a filesystem path or simply an identifier of the local system module and context that can process incoming messages.

While UPnP modules are described as HTTP servers, there is no requirement that implementations be based on actual Web servers. In most cases, the job of the HTTP server is simply to accept the incoming connection, look at the local destination part of the address (the path) and forward the payload to another module. UPnP enables, but does not require, that all HTTP Servers be based on a common software implementation or runtime instance. Controlled Devices and Bridges can include a TCP port specification as part of a URL to override the default value of 80.

The successful result of a SSDP level search in UPnP is always one or more Description URLs. These URLs can be used to navigate to the Description Document of a Controlled Device or Bridge. A User Control Point uploads the Description Document and extracts the URLs of the Servers running on the Controlled Device or Bridge.

All URLs returned in the Description Document have a lifetime equal to the lifetime of the Hostname embedded in them. User Control Points can store these URLs as addresses without going through a search sequence first. Once they have been advertised in a Description Document, Controlled Device and Bridges cannot arbitrarily change Server URLs.

Whenever a Hostname changes, all URLs associated with all Devices addressed by that Hostname are invalidated. The UDN is the only UPnP identifier guaranteed never to change. Any persistent associations maintained by applications should at least store the UDN to able to unambiguously identify the target Device.

The lifetime of a Description URL is determined by Controlled Device or Bridge that advertises it. If a Controlled Device or Bridge allows an SSDP advertisement of a Description URL to expire, the URL is invalidated.

User Control Points use the Event Subscription URL returned by the Controlled Device or Bridge to connect to the Event Subscription Server. This server does the housekeeping of remembering all User Control Points that are interested in receiving Events on a Service. The Event Subscription Server needs an address to send the events back to. This address is called the Event Sink URL, and is supplied to the Controlled Device or Bridge in the GENA SUBSCRIBE message. The lifetime of an event subscription, and the Event Sink URL, is determined by the timeout on the SUBSCRIBE message.

Further details of UPnP addressing are listed in the following table.

UPnP Addresses

| URL | Function |
| --- | --- |
| Description URL | Points to the Description Server and Document path on a Root Device. This URL is returned by the Description Server as part of the discovery process. |
| Presentation URL | Points to a Presentation (Web) Server on a Controlled Device. There is one Presentation URL per Device, including Root Devices. This URL can be entered into the address bar of a Web browser to navigate to the root Web page of a Device. This URL is returned in the Description Document. |
| Control URL | Points to the Control Server implementing a Service on a Controlled Device. There is one Control URL per instance of a Service. This URL is returned in the Description Document. |
| Event Subscription URL | Points to an Event Subscription Server on a Controlled Device. This URL is returned in the Description Document. |
| Event Sink URL | Points to an Event Sink (an HTTP Server) on a User Control Point. This URL is specified by the User Control Point in the GENA SUBSCIBE message. |

Device Discovery and Identification

UPnP enables SSDP searches for a unique Root or non-Root Device by UDN, devices of a specified Device Type and devices containing a Service of a specified Service Type.

UPnP SSDP Level Searches and Results

| Search for | Returns |
| --- | --- |
| A unique Root Device (by UDN) | A single Description URL pointing to the Description Server and Document path on the Root Device. |
| A unique non-Root Device (by UDN) | A single Description URL pointing to the Description Server and Document path on the Root Device that contains the non-Root Device. |
| Type of Device | A set of Description URLs pointing to the Description Servers/Document paths of all Root Devices that match the Device Type, or contain a non-Root Device that matches the Device Type. |
| Type of Service | A set of Description URLs pointing to the Description Servers/Document paths of all Root Devices that contain a matching Service, or contain a non-Root Device that contains a matching Service. |

SSDP specifies Service Type (ST), Notification type (NT), and Unique Service Name (USN) header fields for queries and for announcements. UPnP uses the ST or NT header to carry one of the UPnP defined identifiers. A unique USN is required for each unique SSDP announcement.

Multiple instances of the same Service Type within a Controlled Device 106–107 or Bridge 120 are not independently announced.

UPnP search identifiers are used during the discovery process. The result of a successful discovery is one or more Description URLs. The format for search identifiers is:

```
upnp:searchtype: [ allformat | UDNformat | srvformat
 | devformat ]
searchtype           = [ UDN | SrvType | DevType | all ]
allformat            = all
UDNformat = UDN:namespace: uniqueid
namespace = [ GUID | IEEEMAC | 1394]
srvformat = SrvType: servicetype: version
devformat = DevType:devicetype
```

UPnP Search Identifiers

| | Format | Example |
| --- | --- | --- |
| all | upnp:all | upnp:all |
| Unique Device Name (UDN) | upnp:UDN:namespace: uniqueid | upnp:UDN:IEEEMAC:0C0099123456 |
| Device Type | upnp:DevType:devicetype | upnp:DevType:ver |
| Service Type | upnp:SrvType:servicetype:ver | upnp:SrvType:clock:1 |

SSDP specifies that SSDP announcements must be made for all SSDP searchable values. The SSDP announcements with "all" as the notification header value must carry the Root Device UDN as the USN header value. SSDP announcements for Device Types must carry the UDN of the Root Device concatenated with the Device Type URI as the USN header value. SSDP announcements for a Service Type will carry the UDN of the Root Device concatenated with the Service Type URI value as the USN header value. SSDP announcements of UDNs will repeat the UDN value as the USN header.

UPnP SSDP Announcements

| Announcement | UPnP Notification Type | SSDP USN |
| --- | --- | --- |
| | "all" | Root Device UDN |
| Unique Root Device | Root Device UDN | Root Device UDN |
| Unique non-Root Device | Non-Root Device UDN | Non-Root Device UDN |
| Device Type | Device Type Identifier | Root Device UDN + Device Type Identifier |
| Service Type | Service Type Identifier | Root Device UDN + Service Type Identifier |

UPnP Bridges 120 (FIG. 2) announce Bridged Devices 122–123 and associated Services using SSDP. The identifiers associated with the Bridged Devices are unique for the device, and they do not duplicate identifiers for Controlled Devices and Services directly available on the Bridge itself. This means that a Bridge that is also a Controlled Device must announce Bridged Devices and local Controlled Devices independently, with appropriate unique identifiers, Description Documents and associated URLs.

Description

The UPnP Description Document 226 (FIG. 3) provides the information necessary to identify, describe, connect and control a UPnP Controlled Device 106–107 or Bridge 120 from a User Control Point 104–105.

The Description Document is an XML document. UPnP defines the use of HTTP and XML for the Description Document and wire protocols. UPnP adheres to the schema declaration rules of XML-Data and processing rules of Y. Goland, "Flexible XML Processing Profile."

The top level XML elements are separated into three categories: per Device, per Service and shared.

Rehydrator

Figure 8:
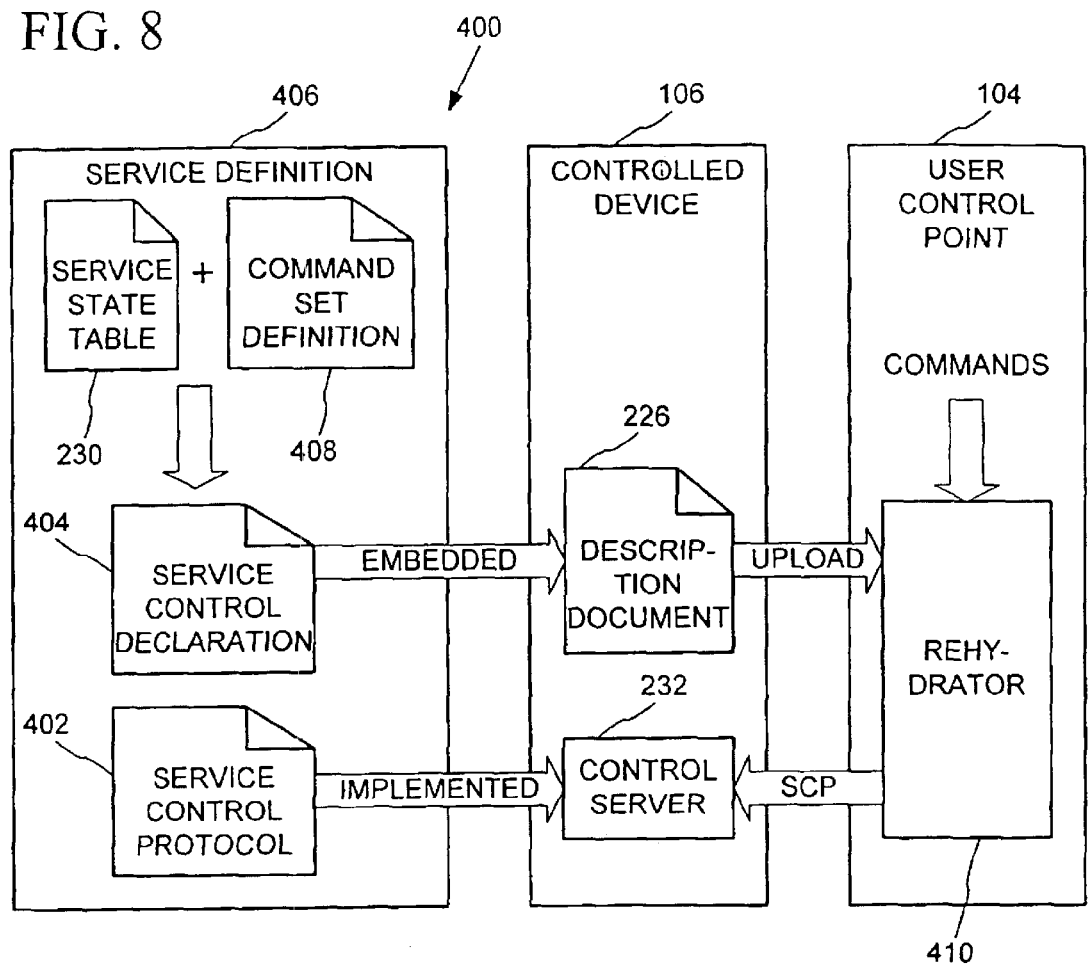
FIG. 8 is a block diagram of a programmatic interface-to-network messaging adapter or Rehydrator in the device control model of FIG. 3.

With reference now to FIG. 8, all (UPnP) Controlled Devices 106–107 (FIG. 1) or Bridges 120 (FIG. 2) expose one or more Services 210–217 (FIG. 3) that can be controlled remotely. Controlling such Services involves a message exchange between a User Control Point 104 and the device 106. This message exchange happens according to a specific Service Control Protocol (SCP) 402, which specifies the content and sequence of the messages exchanged.

User Control Points 104 are not required to have any prior knowledge of the SCPs 402 required to control the Services on the various devices. Therefore, a Controlled Device or Bridge must be able to describe to a User Control Point the protocols required to control its Services, such that the User Control Point will be able to implement these protocols dynamically. This requires a standard way of declaring Service Control Protocols in a concise and unambiguous fashion. UPnP introduces a technique for declaring Service Control Protocols using a series of XML documents.

A Rehydrator 410 is a module that exposes a suitable API to applications and either invokes Commands on a Service or queries the state of that Service, or receives and responds to events. The primary job of the Rehydrator is to map between API calls and the Service Control Protocol sequence that invokes the Command.

As part of the Service Definition 406, a Service State Table 230 and Command Set 408 are defined. These things can be combined in a deterministic way defined by UPnP to produce a Service Control Protocol Definition (SCPD) 406, which includes a Service Control Declaration 404 and a Service Control Protocol 402. The SCPD 406 is a representation of the schema of a Service. It is possible to reconstruct the SST, Command Set and SCP from the SCPD.

The SCPD is directly embedded into the Description Document 226 of a Controlled Device. When the Description Document is uploaded into the User Control Point 104, the Rehydrator 410 can extract the SCPD from it. At this point, the Rehydrator has enough information to issue Service specific SCPs 402.

General Operation of the Rehydrator

Figure 9:
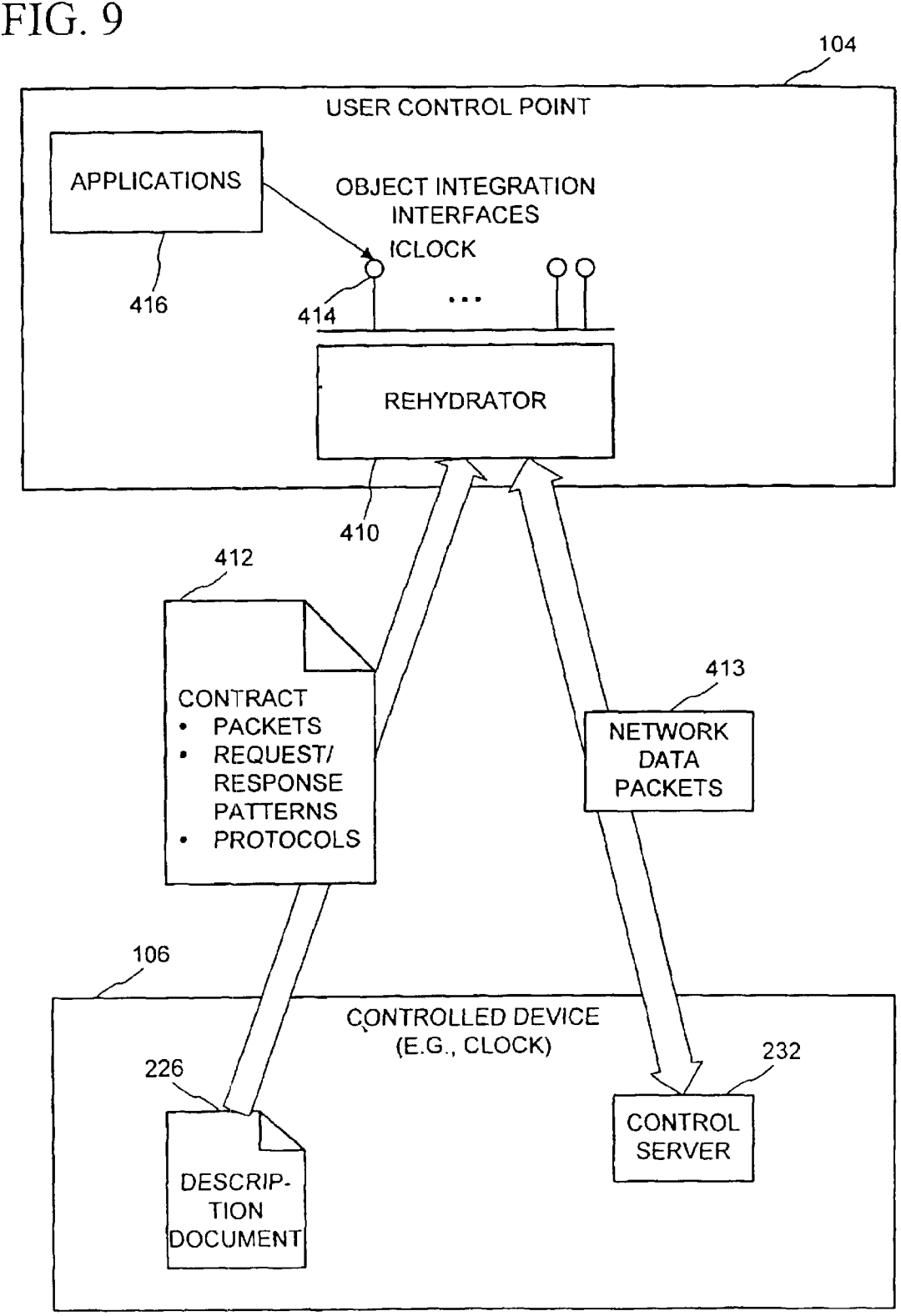
FIG. 9 is a general data flow diagram of the Rehydrator of FIG. 8 in the device control model of FIG. 3.

More generally with reference to FIG. 9, the Rehydrator 410 operates as a universal adapter to provide a programmatic interface to any service-specific protocol of a remote computing device. The Rehydrator 410 simply obtains a data description or declaration of the methods, properties and events of the remote service, as well as a definition of the protocol of network data messages through which the Rehydrator invokes the methods, queries or sets the properties, and receives event notifications. In UPnP, this data description takes the form of the Description Document 226, which contains a Contract 412. The Contract defines network data packets 413 (e.g., XML data), request/response patterns, and protocol (e.g., GENA, HTTP, SSDP) via which the packets are exchanged. This information is sufficient for the Rehydrator to exchange the appropriate network data packets to interact with the Controlled Device Service, including to invoke commands, query and set properties, and receive and respond to events, without download of any executable code to the User Control Point 104 device and with a zero installation or configuration experience.

The Description Document 226 also includes a declaration of the methods, properties and events for the Service. Based on this declaration, the Rehydrator produces a corresponding programmatic interface for use by applications at the User Control Point. The programmatic interface is an application programming interface that can be in the form of an object integration interface of an object-oriented programming model, such as Microsoft COM, CORBA, Java classes, and scripting engine name extensions. In the example illustrated in FIG. 9, the Rehydrator 410 exposes a COM object integration interface ("IClock" interface 414), with methods getTime( ) and setTime( ), for a Controlled Device having a "Clock" Service with GetTime and SetTime commands. The Rehydrator 410 converts calls of an application program 416 to the IClock interface 414 into the network data messages specified in the Contract to invoke the corresponding commands of the Clock Service. The Rehydrator 410 likewise creates suitable further programmatic interfaces for other Services (e.g., Services 210–217 of FIG. 3) based on the Description Document of their respective Controlled Devices.

Accordingly, the Rehydrator operates as a universal proxy object with data-driven conversion of programmatic interfaces to network data messages. Further, the Rehydrator produces the programmatic interface at the User Control Point based solely on an XML data description. This operation allows the Rehydrator to produce just-in-time transient interfaces to remote device Services without the complexity of code downloads and installation or configuration. Upon a later release of the interface by the application, the Rehydrator destroys the interface without need to de-install or clean up persistent configuration data in a registry or configuration file of the operating system or object execution run-time.

Rehydrator Implementation

Figure 10:
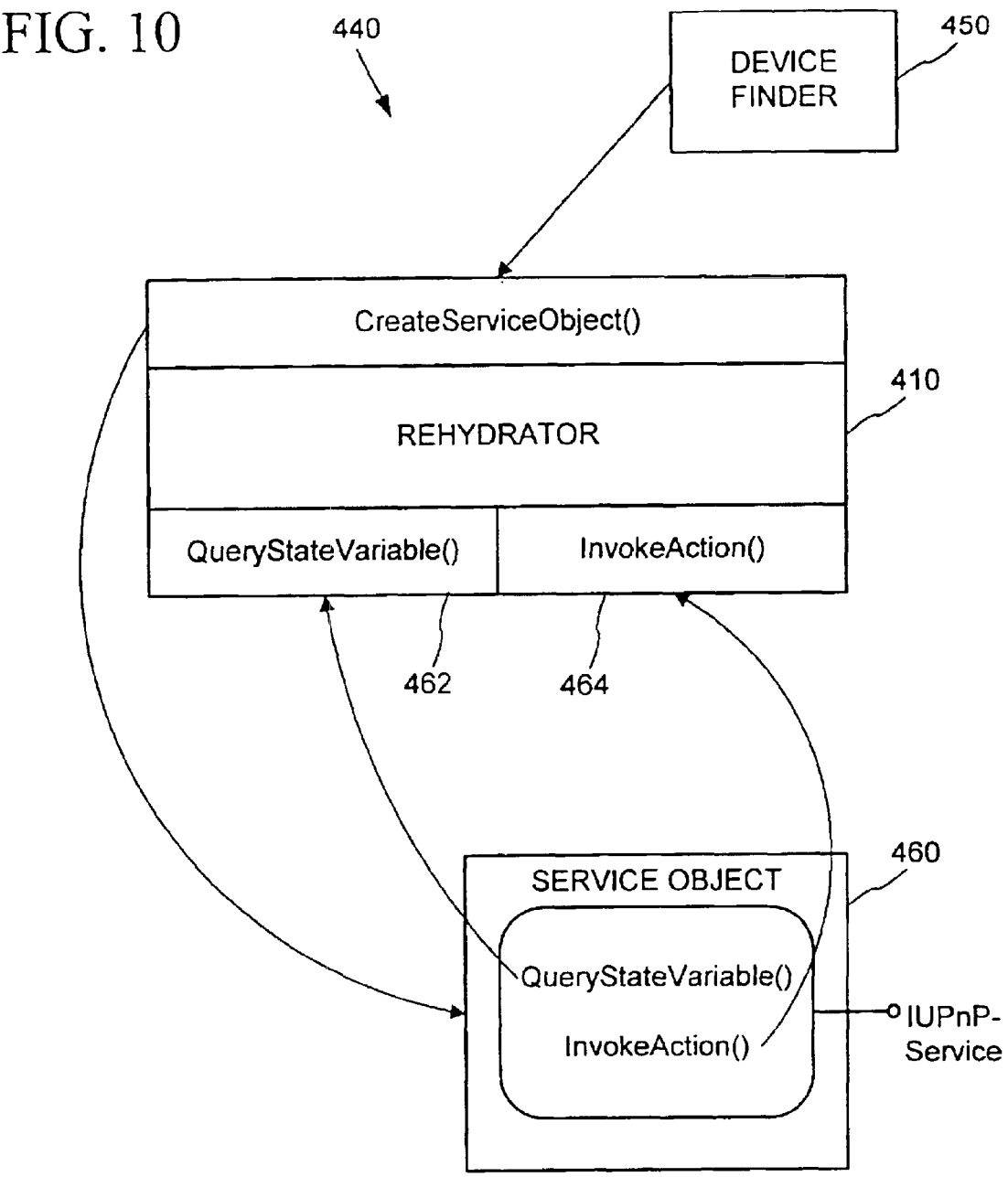
FIG. 10 is a block diagram of an implementation design of the Rehydrator of FIG. 8.
Figure 11:
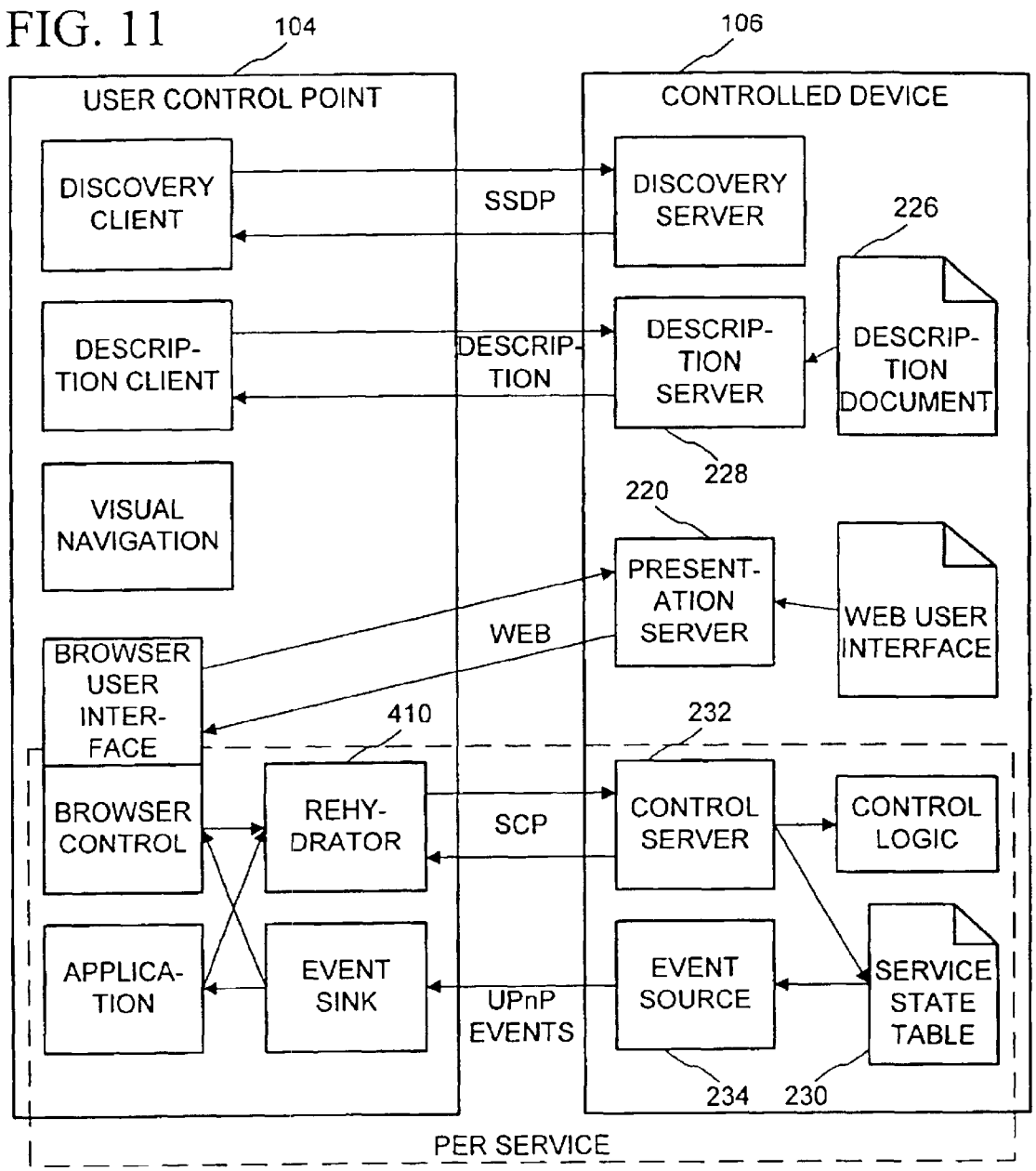
FIGS. 11 and 12 are block diagrams illustrating an internal software architecture of the user control point and controlled device in the device control model of FIG. 3.
Figure 12:
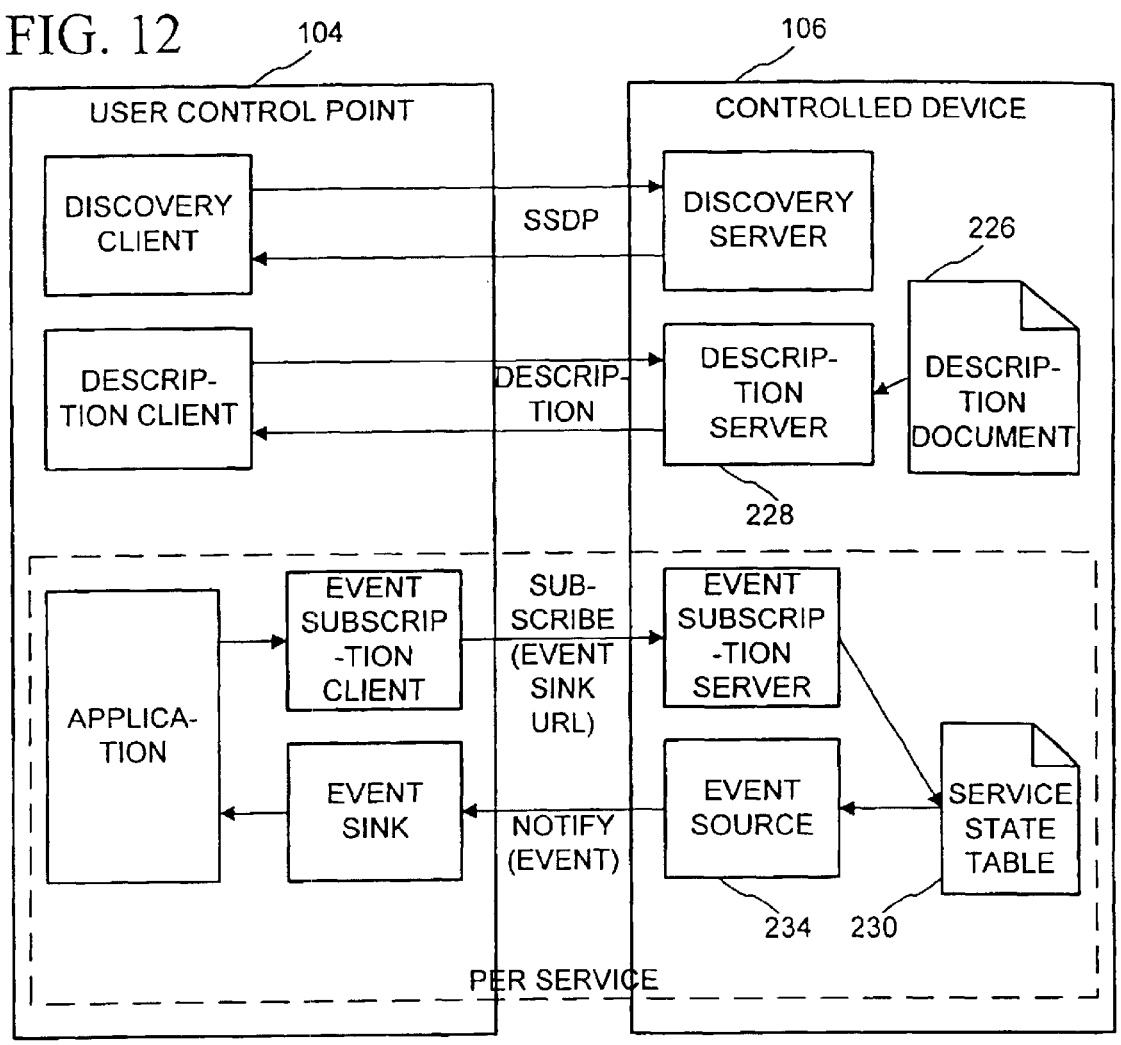
Figure 13:
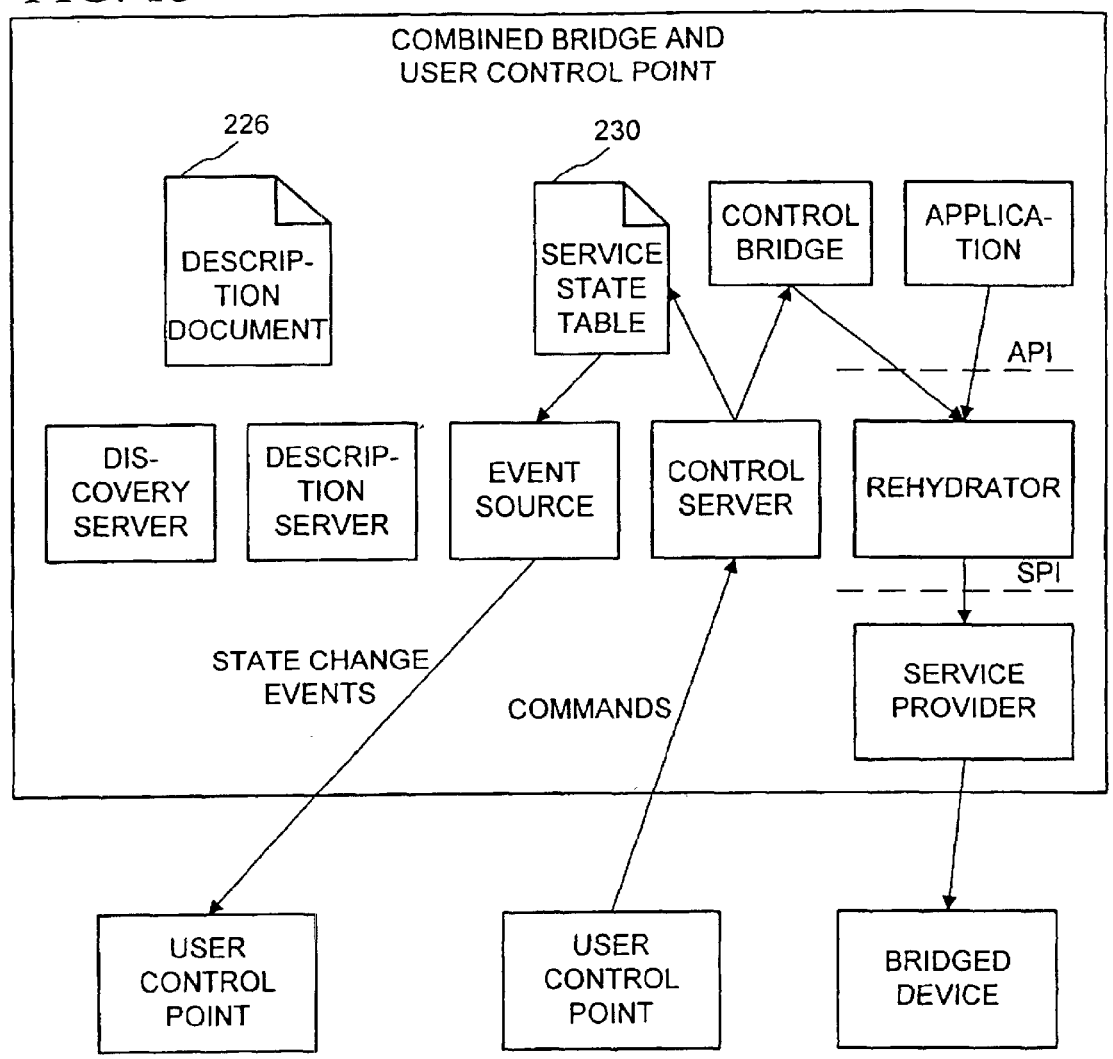
FIG. 13 is a block diagram illustrating an internal software architecture of a combined bridge and user control point in the device control model of FIG. 3.

Summary. With reference to FIG. 10, a preferred implementation 440 of the Rehydrator 410 is as an internal Microsoft Windows component that routes service control requests from the UPnP API to devices. Applications wishing to control a service on a UPnP device obtain a Service object through the UPnP API and use the methods of this object to query the state variables of the service and invoke its actions. Those methods use the Rehydrator API to turn the service control requests into network messages that travel to the UPnP device. In this sense, the Rehydrator performs a mapping between API calls and network protocols.

Basic Functionality. The preferred implementation of the Rehydrator is able to translate a service control call to the UPnP API into the appropriate network messages defined by the Service Control Protocol.

Asynchronous Event Notification. The preferred implementation of the Rehydrator is able to notify UPnP API clients of any asynchronous events generated by the devices they are controlling. Event notification is done by means of the event interfaces defined below.

Error Reporting. For a variety of reasons, state variable queries and action invocations may fail. The preferred implementation of the Rehydrator is able to provide a way to communicate the success or failure status of such operations to the parties initiating them.

Rehydrator Implementation Design. As illustrated in FIG. 10, the preferred implementation of the Rehydrator is used in two ways. First, the Device Finder 450 uses it to create Service objects 460. Then, these Service objects use it to carry out service control operations (querying state variables and invoking actions).

Creating Service Objects. When the Device Finder 450 creates a Device object, it invokes the Rehydrator 410 to create Service objects 460 for each of the service instances on that device. Each service instance supports a particular Service Control Protocol and the Rehydrator needs a description of this protocol in order to create a properly hydrated Service object.

The Service Control Protocol is declared in two separate XML documents: the DCPD and the Contract. The Rehydrator needs the information in both documents. These two documents are passed to the Rehydrator as IXMLDOM-Document interface pointers in the RehydratorCreateServiceObject( ) API call.

```
HRESULT
RehydratorCreateServiceObject(
IN      IXMLDOMDocument *pDCPD,
    IN      IXMLDOMDocument    *pContractDocument,
    OUT     IUPnPService       **pNewServiceObject);
```

This API returns a pointer to an IUPnPService interface on a newly created Service object. In addition to the creating the Service object, the Rehydrator sets up its internal data structures so that it can properly handle requests to control the service. Specifically, it creates a list of the properties and actions exported by the service. Since all service instances of the same service type export the same properties and the same actions, this information is kept only once for each service type and is indexed by Service Type Identifier.

The Rehydrator stores the information that is specific to a particular service instance as private data within the Service object itself. This includes the control URL and information about the control server 232 (such as the HTTP verbs it supports). The Service Type Identifier is the link between the Service object that represents one instance of a service type and the Rehydrator internal data structures that contain information common to all instances of that service type. The Service Type Identifier is stored as a private data member in the Service object.

Querying Service Properties. Applications can query the values of service properties by invoking the IUPnPService::GetProperty( ) method on a Service object. Internally, this method makes a call to the RehydratorQueryState Variable( ) function.

```
HRESULT
RehydratorQueryStateVariable(
    IN      LPCTSTR        lpcszVerb,
    IN      LPCTSTR        lpcszControlURL,
    IN      LPCTSTR        lpcszSTI,
    IN      LPCTSTR        lpcszVarName,
    OUT     VARIANT        *pValue) ;
```

The first two in parameters to this function supply the service instance specific information: the HTTP verb to use and the control URL to which the network messages will be targeted. The third parameter is the Service Type Identifier that will be used to locate the Service Control Protocol information in the Rehydrator's internal data structures. The fourth parameter is the name of the variable that is being queried (the Rehydrator will validate this against is internal list of state variables exported by the service) and the final parameter is the address of a VARIANT structure in which the Rehydrator will place the variable's value.

This function will generate an HTTP request to the control server on the device. The body of this request will be an XML fragment containing a XOAP-encoded request for the variable's value. The following is an example of such a request (the exact header and payload format of this message is defined in the service contract):

```
M-POST /clockService HTTP/1.1
Host: spather-xeon:8586
Content-Type: text/xml
Man: "http://www.microsoft.com/protocols/ext/XOAP"; ns=01
01-MethodName: queryStateVariable
01-MessageType: Call
Accept-Language: en-gb, en;q=0.8
Referer: http://myhouse/VCR1Presentation
Content-Length: 84
User-Agent: Mozilla/4.0 (compatible; MSIE 5.01; Windows NT 5.0)
Connection: Keep-Alive
<queryStateVariable>
    <variableName>currentTime</variableName>
</queryStateVariable>
```

The control server will respond to this message with another XML fragment: the XOAP-encoded method response. The following is an example of such a response:

```
HTTP/1.1 200 OK
Connection: Close
Cache-Control: private
Date: Mon Oct 11 12:13:38 PDT 1999
```

Expires: Mon Oct 11 12:13:38 PDT 1999
Content-Type: text/xml
Content-Length: 62
Man: "http://www.microsoft.com/protocols/ext/XOAP"; ns=01
01-MessageType: CallResponse
<queryStateVariableResponse>
   <_return>12:13:28</_return>
</queryStateVariableResponse>

The rehydrator will extract the return value from this XML fragment, place it in the VARIANT structure whose address was passed as the last parameter to RehydratorGetServiceProperty( ) and then return.

Invoking Service Actions. The process of invoking a service action is very similar to querying a state variable. An application calls IUPnPService::InvokeAction( ) on a Service object, passing it the name of an action to invoke, and an array of arguments to the action. Internally, IUPnPService::InvokeAction( ) calls RehydratorInvokeServiceAction( ), declared as shown below.

```
HRESULT
RehydratorInvokeServiceAction(
    IN      LPCTSTR     lpcszverb,
    IN      LPCTSTR     lpcszControlURL,
    IN      LPCTSTR     lpcszSTI,
    IN      LPCTSTR     lpcszActionName,
    IN      SAFEARRAY   saActionArgs,
    OUT     LONG        *pStatus) ;
```

As was the case for querying state variables, the service instance specific information is passed in the first two parameters, followed by the Service Type Identifier in the third. The action name and an array of arguments are passed as the next two parameters, and the final parameter is the address of a variable in which to store the status of the operation.

RehydratorInvokeServiceAction( ) will send an HTTP request to the control server identified by the second parameter. As before, the body of this message will be an XML fragment containing a XOAP-encoded method call. An example HTTP request to invoke an action is shown below.

```
M-POST /clockService HTTP/1.1
Host: spather-xeon:8586
Content-Type: text/xml
Man: "http://www.microsoft.com/protocols/ext/XOAP"; ns=01
01-MethodName: invokeAction
01-MessageType: Call
Accept-Language: en-gb, en;q=0.8
Referer: http://myhouse/VCR1Presentation
Content-Length: 119
User-Agent: Mozilla/4.0 (compatible; MSIE 5.01; Windows NT 5.0)
Connection: Keep-Alive
<SerializedStream main="invokeAction">
    <invokeAction id="invokeAction">
        <actionName>setCurrentTime</actionName>
        <actionArg>15:41:29</actionArg>
    </invokeAction>
</SerializedStream>
```

The encoding of the body of this message is again specified in the service contract. The Rehydrator will wait for the HTTP response to this request, which would look something like the example below.

HTTP/1.1 200 OK
Connection: Close
Cache-Control: private
Date: Mon Oct 11 15:22:38 PDT 1999
Expires: Mon Oct 11 15:22:38 PDT 1999
Content-Type: text/xml
Content-Length: 50
Man: "http://www.microsoft.com/protocols/ext/XOAP"; ns=01
01-MessageType: CallResponse
<invokeActionResponse>
   <_return>0</_return>
</invokeActionResponse>

After receiving a response such as this, the Rehydrator will extract the return value, place it in the out parameter it was passed, and then return.

FIGS. 32 through 44 are program listings defining various interfaces used in the preferred implementation of the Rehydrator, including an IUPNPDevice Interface, an IUPNPPropertyBag Interface, an IUPNPService Interface, an IUPNPDevices Interface, and an IUPNPServices Interface.

Description Document

With reference to FIG. 14, User Control Points 104 can retrieve a Description Document 226 by issuing an HTTP GET on a Description URL. This URL is returned in the location header of either an SSDP announcement or an SSDP query response.

The HTTP GET must include an accept-language header that is used to request the preferred language of the response. If the requested language is not supported, a Description Document in the default language supported by the Controlled Device or Bridge may be returned.

An HTTP GET is used to retrieve sub elements of a Description Document that are expressed as URLs.

URL Handling

URLs embedded in Description Documents 226 take one of 3 forms: a fully qualified URL or a relative URL.

Fully qualified URLs take the form:

http://devicename/pathname

The devicename part of the URL is a Hostname or IP address and the pathname is a filesystem path or equivalent. A fully qualified URL is used "as is" to establish an HTTP connection to a device.

A relative URL does not contain the ";" character and is of the form:

pathname

/pathname

Relative URLS are a compact representation of the location of a resource relative to an absolute base URL. All relative URLs in a Description Document are appended to the value of the Description Document element <URLbase> to form fully qualified URLs.

Binary Data

Some elements of a Description Document are binary. XML does not directly support the embedding of binary data. In order to include binary data directly in a Description Document, one must convert the data to text using the Base 64 encoding scheme. This tends to increase the size of the data by 25% on the average. Much of this overhead can be eliminated if the binary data is passed by reference instead of by value. To reference binary data, a URL to the data is provided in a Description Document. The binary data can be retrieved by doing a HTTP GET with that URL.

As an example, consider the <image> element in the following Description Document:

```
<iconList>
    <icon>
        <size>16</size>
        <imageType>PNG</imageType>
        <color>1</color>
        <depth>8</depth>
        <image>
"http://device.local/iconpath/icon.png"/>
    </icon>
</iconList>
```

The icon would be retrieved with an HTTP GET of the following format:

GET iconpath/icon.png HTTP 1.1

Host: device.local

The HTTP response would look like:

HTTP/1.1 200 OK

Content-Type: image/png

Content-length: ###

<binary color icon data in the PNG format>

Description Document Layout

The basic layout of the Description Document 226 is shown in FIG. 15.

The following table lists Description Document elements that are sub-elements to the root element.

| | |
|---|---|
| Root | The XML root element of a UPnP Description Document. |
| specVersionMajor | The major version of the UPnP Architectural Reference that this Description Document was created against. This value must be 1. |
| specVersionMajor | The minor version of the UPnP Architectural Reference that this Description Document was created against. This value must be 0. |
| URLBase | An optional element used to construct fully qualified URLs. Relative URLS are appended to the value of <URLBase> to create fully qualified URLs. If this element is present, it must agree with the HTTP Base header. |
| manufacturer | A required element that contains a textual manufacturer name. |
| manufacturerURL | An optional element containing a URL that points to the Web page of the manufacturer. |
| modelName | A required element containing a textual product name. |
| modelDescription | A required element containing a textual product description. |
| modelNumber | An optional element containing a textual product model number. |
| modelURL | An optional element containing a URL that points to the Web page of the product. |
| UPC | An optional element containing the product Universal Product Code (UPC). |
| serialNumber | An optional element containing a textual item serial number. |

The Description Document elements listed in the following table are associated with devices.

| | |
|---|---|
| rootDevice | A required sub element of the root. This element is a container for one or more service elements and the elements that describe the rootDevice. |
| device | An optional sub element of the root or another device element. This element contains the same kinds of elements as a rootDevice element. |
| UDN | A required sub element of every rootDevice or device element containing the Unique Device Name. |
| friendlyName | A required sub element of every rootDevice or device element containing a textual friendly name. This element can be updated remotely. |
| deviceType | A required sub element of every rootDevice or device element containing a standardized Device Type Identifier. |
| presentationURL | An optional sub element of a rootDevice or device element containing a Presentation URL. |
| iconList | A required sub element of every rootDevice or device element. This element is a container for one or more icon elements. UPnP requires a base set of six icons that must exist in the iconList. All devices must support PNG icon image formats of three sizes, 16 by 16, 32 by 32 and 48 by 48 pixels in both color and black and white at 8 bit depth. Additional formats and sizes, including JPEG, GIF, BMP, ICON and VML, may be supported by adding them to the list. |
| icon | A required sub element of every iconList element. This element is a container for the elements that define an icon. |
| size | A required sub element of every icon element. There must be icon elements with associated size elements with the values 16, 32 and 48. Other icons may specify other sizes. |
| color | A required sub element of every icon element with value 0 or 1. Each icon of size 16, 32 or 48 must exist in color and black and white. |
| depth | A required sub element of every icon element. All required icons must exist with a value of 8. |
| imageType | A required sub element of every icon element that identifies the format of the binary icon: png, jpeg, vml, gif, bmp, or ico. |
| image | A required sub element of every icon element that references a binary icon. |

The following elements of the Description Document are associated with Services.

| | |
|---|---|
| service | An optional sub element of the rootDevice or another device element. This element is a container for the Service Definition. |
| serviceType | A required sub element of every service element containing a standardized Service Type Identifier. |
| controlURL | A required sub element of every service containing a Control URL. |
| eventSubURL | A required sub element of every service containing an Event Subscription URL. |
| SCPD | A required sub element of every service. The SCPD is a container for the standardized Service Control Protocol Declaration associated the Service. |

FIG. 16 shows an exemplary icon list in a Description Document 226.

Service Control Protocol and SCP Declaration

As part of the Service Definition 406 shown in FIG. 8, a Service State Table 230 and Command Set 408 are defined. The SCPD 406 is a representation of the schema of a Service. It is possible to reconstruct the SST 230, Command Set 408 and SCP 402 from the SCPD deterministically.

The declaration of such a protocol must specify the list of Variables that can be queried, the set of Commands that can be invoked, as well as the wire protocol (the content and sequence of network messages) required to carry out these operations. SCPD is specified in two XML documents. The first or Service Control Definition document 404, written in a language called Service Control Protocol Declaration Language (SCPDL), declares the list of state Variables and Commands associated with the Service Type to be controlled by the protocol. The second or Service Control Protocol document 402 is written in Contract Definition Language (CDL) and declares the wire protocol that will be used to query the values of the state variables and invoke the actions associated with the service.

Declaring the Service State Table and Command Set

A SCPDL document 404 is used to specify the list of state Variables that a SCP can query and the set of Commands that it can invoke. SCPDL is an XML schema, a set of rules for writing XML documents (Service Control Protocol Declarations).

FIG. 17 shows an exemplary SCPDL document. This XML document consists of a root <scpd> element containing two sub-elements, <serviceStateTable> and <actionList>. Within the <serviceStateTable> element is a <stateVariable> element for each state variable associated with the service. The Service in this example is a TV tuner with has only one state variable, currentChannel. The elements within the <stateVariable> element specify the name, data type and allowed values for the state variable. Had the Service more state variables, they would be represented by additional <state Variable> elements within the <deviceStateTable> element.

The <actionList> element contains an <action> element for every action associated with the Service. The elements within an <action> element specify the name of the action and any arguments the action may take. In this case, the service supports two actions that do not take arguments, ChannelUp and ChannelDown, and another, SetChannel, that takes a new channel number as an argument. The <argument> element and the elements nested within it define the argument. The <relatedStateVariable> element within <argument> specifies the name of one of the state variables to which the argument is related. In the UPnP Device Model, all arguments to actions must correspond directly to some state variable.

Declaring the Contract

The Contract is a specification of the wire protocol that will be used to query state Variables, invoke Commands and carry notifications or events. This contract specifies the type of protocol used, the network endpoint to which messages are sent, the contents of those messages, the contents of the expected responses and the contents of events. Contracts are written in Contract Definition Language (CDL).

All UPnP SCPs will use essentially the same contract. A specific contract applies to a single Service instance (since it specifies the network endpoint to which messages are sent and network endpoints are specific to service instances). However, other than the network endpoint definition, all contracts for all Service instances should be the same.

FIGS. 18–20 show an exemplary Contract. This Contract defines two methods: queryStateVariable and invokeAction. These methods are invoked by exchanging XML messages with a Control Server on a UPnP Controlled Device or Bridge. The Contract completely defines the header and payload of each message. By passing the appropriate arguments to these methods, any of the state Variables declared in the SCPDL declaration can be queried and any of the actions invoked.

FIGS. 21 and 22 show an XML schema for the SCPDL.

Basic UPnP Eventing Architecture

With reference to FIG. 23, the UPnP architecture 200 (FIG. 3) requires that clients of the UPnP API be enabled to receive notifications reliably from UPnP services 210–217 as their states change. Since state changes are relatively common, the eventing subsystem is efficiency and performance is a major consideration in this design. FIG. 23 and the following discussion describe the Basic UPnP Eventing Architecture 600, which encompasses both the controlled device (CD) 106 and user control point (UCP) 104 sides of the eventing service. It also includes the support APIs for both a low-level service interaction and a higher level COM-based wrapper of those APIs. The latter enables automation controllers like Visual Basic and JScript 602 to receive event notifications.

What is an Event?

Property change events are defined as any change in the value of a row of the Device State Table (DST) 230 (FIG. 3) for a service 210–217. This change will be reflected as a property change notification. For example, if a "VCR" device has a "VCR Transport" service, one row in that service's DST may be TapeState and the value could be TapePresent. If the tape is ejected, the new value would be TapeAbsent. This state change would be reflected as a notification sent to all subscribers.

What is a Notification?

A UPnP event notification is an XML message sent over HTTP/TCP to each and every subscriber to a particular UPnP service. The content of the XML is defined below. The important contents of this message are the unique identifier for the subscription, the property name, new value, and property type.

Notification Processing

In UPnP, the listener to Notifications is the SSDP service itself. SSDP already listens on another multicast address for "alive" and "byebye" messages sent by UPnP devices. The same listener will listen on a TCP port for notifications sent. All subscriptions sent from that UCP contain the same callback URL and so all notifications will be directed to that URL. When a notification arrives the SSDP service will examine the NT header of the message and determine if it is an event notification. If so, the message is parsed further to determine if it should be forwarded on to subscribers (which must exist). GENA defines the format of the HTTP message, what headers can be used, and what they can be used for.

GENA

GENA is the protocol of communication that, in a preferred embodiment, UPnP devices use to send event notifications. Therefore, UPnP devices that wish to notify UCPs of state changes are recommended to use GENA. Notification subscribers will never be required to interact with a UPnP device directly and so they are not required to use GENA. The eventing API will encapsulate this complexity. Other appropriate event transport protocols may be used, such as publish/subscribe systems.

Receiving Notifications

Applications written in C (C Application 604) will be able to utilize the SSDP C API 610 to receive callbacks when notifications are processed by the SSDP service. This is analogous to SSDP clients registering for notifications that services have become available. When a UCP registers for a notification, it passes as a parameter the URL of the service for which it is interested in receiving notifications. This URL is obtained from the description document for that service. (When a service is registered on a UPnP device, it uses this same URL to listen for subscription requests).

When a notification message is received by the SSDP service listener, the SID header is checked against the list of subscribers it maintains. If a subscriber is found, the callback function for that subscriber is invoked, with one of the parameters being the contents of the notification message. The notification client that implements the callback function can process this message in any appropriate way.

Notifications in the UPnP API The UPnP API 410 is a consumer of the basic C interface provided by the SSDP C API 610 component. In order to integrate seamlessly, the registration of notifications is handled by the Service Object 612 inside the UPnP Object Model. Service objects will register for notifications when they are created. This ensures that the DST is maintained by the UPnP API and is kept up to date. They will implement the callback function required by the registration function. If this callback function is invoked, it will pass on that notification to UCPs. The UCPs can be written in C, C++, VB, or script code, so the mechanism for passing on notifications can be different.

Script Support

A feature of the illustrated eventing system is that it supports script languages such as VBScript and JavaScript 602. For VBScript, this is made possible by providing a property on the Service object that, when set, contains the IDispatch pointer for a VBScript function or subroutine that will be the event handler. When the Service object's notification callback is invoked, it checks to see if this IDispatch pointer was set, and if so, it calls IDispatch::Invoke on DISPID 0 of that interface to call the VBScript subroutine. An equivalent mechanism is implemented for JScript.

Eventing Subsystem Terminology

UCP—User control point. Any piece of software that searches for devices and controls them.

CD—controlled device. A hardware or software device that announces its availability thru SSDP and allows control by UCPs.

Subscriber—A UCP who wishes to be notified of event changes.

Notifying Resource (or simply "Resource")—For the purposes of this document, this will always be a service contained within a UPnP CD 106.

Event Source—a service that provides events. UPnP services are event sources. All notifying resources are event sources and vice versa.

Event—message generated when a change in a resource's state occurs.

Property—a single entry in the service's state table whose DefaultValue can change. Properties and events always have a one to one correspondence.

Subscribing to Resources

Integrating With The UPnP API

The UPnP API 410 exposes several interfaces with which a consumer can find and enumerate devices, control services, and get properties on devices and services. To allow the integration of events into this model, we add a new property to the IUPnPService interface called EventHandler. When this property is set, it tells the Service object 612 that its client is interested in receiving notifications for that service. The SSDP API RegisterNotification( ) API is called when the Service object is created so that it can maintain a local copy of the DST for that service. The Service object knows the URL of the service and therefore it can provide this as a parameter to RegisterNotification( ). RegisterNotification( ) is also provided a callback function which is a static member of the Service object class. This function will be invoked for each and every notification sent by that particular UPnP service.

The Notification Callback

The Service object 612 includes a static member function called EventNotifyCallback( ) which is invoked for each notification sent by the UPnP service. The callback is passed the entire HTTP message contents in a structure which is a parameter to the function. The prototype looks like this:

static VOID
  CUPnPService::EventNotifyCallback(SSDP_CALLBACK_TYP
  E ssdpType,
  SSDP_MESSAGE *pssdpMsg,
    LPVOID pcontext);

The ssdpType parameter should always be SSDP_PROPCHANGE. The pssdpMsg parameter contains the relevant information about the event. The key piece of information is the body of the XML message. The body contains information about what property changed, what its new value is and what type it is, among other information. The pContext parameter will always be the this pointer of the Service object. This allows the code to call a method to fire the event to the UCP. The callback will parse the XML body using the XML DOM services. Property changes are iterated and the local DST is updated to reflect these changes. After this processing is done, an event notification may be fired for each property that was changed to the owner of the subscription if one exists. Depending on what environment the owner is written in (C++ or script, etc. . . . ), a different mechanism for firing the event may be employed.

A special case for this process is the very first notification received after a subscription is established. This notification contains the entire set of properties and their values and is used to locally sync up the DST. Events will not be fired to clients of the UPnP API in this case.

Firing Notifications

When the EventNotifyCallback( ) function is called, the local copy of the DST for the service is updated. After this, an event needs to be fired if a subscriber exists. A subscriber exists if the put_EventHandler( )method was called, either from VBScript, C++ code, or another source. To abstract away this complexity, a new interface called IUPnPEvents is needed.

This interface currently has one method called NotifyEvent( ) which takes several parameters. When put_EventHandler( ) function is called, its argument is an IUnknown. This pointer is QueryInterface'd( ) for IDispatch first, and if it succeeds, then IDispatch::Invoke( ) is called with DISPID 0 to invoke the default method. This allows VBScript 602 to be called. If that fails, however, it is Queried for IUPnPEvents, and if that succeeds, the NotifyEvent( ) method is called with the same parameters as for Invoke( ). The handles C++ UCPs effectively.

Subscribing with C++

To subscribe to a UPnP service from C++, a UCP instantiates a UPnP service object, issues QueryInterface( ) to it for IUPnPEvents, and calls the IUpnPEvents::SetEventCallback( ) function. This function takes 2 parameters, a callback function pointer and a context pointer.

Subscribing with VBScript

To subscribe to a UPnP service's events, all that needs to be done by a script 602 is to create a function or subroutine as a handler function and set the pointer of that function to the EventHandler property of the Service object. Now, anytime an event is fired, this VBScript function or subroutine will be called. In VBScript, this is written as the following:

---

Dim UPnPAPI
Set UPnPAPI = CreateObject("UPnPAPI.1")
Devices = UPnPAPI.FindDevices( . . . )
For each device in Devices
  For each service In devices.services
    If service.dcpi = "clock.vl"
      Service.EventRandler =
  GetRef("clock_PropertyChanged")
    End if -continued

```
    Next service
    Next device
    Sub clock_PropertyChanged(prop, value)
        MsgBox "The time has changed. It is now " &
value & "."
    End Sub
```

In this example, the script enumerates all devices, looking for any device that supports the "Clock" interface. When it finds a device that supports that interface, it enumerates that device's services looking for the one that has the "clock.v1" interface. Once it finds that service, it sets that service's EventHandler property to the VBScript subroutine called "clock_PropertyChanged". This name is arbitrary.

Sending and Receiving Notifications

GENA Client API

GENA clients are actually UPnP services. A GENA client creates a new event source when it is initialized. The GENA client API 620 facilitates this. It also provides a way for GENA clients to send their notification messages. It is also important to note that the HTTP server that lives on the UPnP device is also a client of this API. The GENA client API consists of the following functions:

RegisterUpnpEventSource( )

The RegisterUpnpEventSource( ) API gives a GENA client the ability to register itself as an event source. The prototype is as follows:

```
BOOL RegisterUpnpEventSource( LPTSTR
    szRequestUri,
DWORD cProps,
UPNP_PROPERTY *rgProps
```

Parameters: szRequestUri [in] an arbitrary Request-Uri that SUBSCRIBE requests will be sent to. When a SUBSCRIBE request arrives at the given URI, it is acknowledged and the subscriber is added to the list of notification recipients. Note that this URI should match the URI provided in the description for this service. CProps [in] the number of properties that this event source provides. RgProps [in] Array of UPNP_PROPERTY structures which contain information about each property. The property information is derived from the DST for the event source.

Return Value: The function returns a TRUE if successful. If the given URL has already been registered as an event source, the return value is FALSE and GetLastError( ) returns ERROR_ALREADY_EXISTS.

Notes: The initial state of the event source needs to be given to the API so that it can effectively maintain the up-to-date state of the event source.

DeRegisterUpnpEventSource( )

The DeRegisterUpnpEventSource( ) API gives a GENA client the ability to deregister itself as an event source. The prototype is as follows:

```
VOID DeRegisterUpnpEventSource(
    LPCTSTR szRequestUri
);
```

Parameters: szRequestUri [in] an arbitrary Request-Uri that SUBSCRIBE requests will be sent to. When a SUBSCRIBE request arrives at the given URI, it is acknowledged and the subscriber is added to the list of notification recipients. Note that this URI should match the URI provided in the description for this service.

UPNP PROPERTY

```
typedef struct _UPNP_PROPERTY {
    LPTSTR szName;
    LPTSTR szValue;
    LPTSTR szType;
} UPNP_PROPERTY;
```

Where szName is the name of the property, szValue is the current value of property, and szType is the type of property (string, integer, etc. . . . ).

SubmitUpnpPropertyEvent( )

The SubmitUpnpPropertyEvent( ) API allows the GENA client to submit a UPnP property change event to be sent to subscribers as a notification. The prototype is as follows:

```
BOOL SubmitUpnpPropertyEvent(
    LPCTSTR szRequestUri,
    DWORD dwFlags,
        DWORD cProps,
        UPNP_PROPERTY *rgProps
);
```

Parameters: "szRequestUri [in]" identifies the event source to which this event belongs. This is the same Request-Uri passed to RegisterUpnpEventSource( ). "DwFlags [in]" is unused. "CProps [in]" is the number of events that are being submitted. "RgProps [in]" is an array of UPNP_PROPERTY structures which contain information about each event.

Return Value: If the function fails, the return value is FALSE. The get extended error information, call the GetLastError( ) function.

Notes: When a series of properties is submitted for event notification, the local version of the property state for the given event source is updated with the list of properties passed in. SubmitUpnpPropertyEvent( ) calls SubmitEvent( ) after it has generated an XML body.

SubmitEvent( )

The SubmitEvent( ) API allows the GENA client to submit an unstructured event to be sent to subscribers as a notification. The prototype is as follows:

```
BOOL SubmitEvent(
    LPCTSTR szRequestUri,
    DWORD dwFlags,
        LPCTSTR szHeaders,
        LPCTSTR szEventBody
);
```

Parameters: SzRequestUri [in] identifies the event source to which this event belongs. This is the same Request-Uri passed to RegisterUpnpEventSource( ). DwFlags [in] Unused. SzHeaders [in] null-terminated text string containing the headers for the event, each separated by CRLF. SzEventBody [in] null-terminated text string containing the body of the event message Return Value: If the function fails, the return value is FALSE. The get extended error information, call the GetLastError( ) function.

Notes: If no subscribers exist, the function does nothing. If one or more subscribers exist, a message is sent to each subscriber. SubmitEvent( ) will always send to all subscribers.

UPnP Controlled Device Event Architecture

In UPnP, every UPnP service 210–211 that supports property change event notifications is to be a GENA client. Therefore, when the service is initialized, it must register itself as a GENA event source. It will do this with the RegisterUpnpEventSource( ) API. This returns a handle which can be used in subsequent APIs.

RegisterUpnpEventSource( ) takes a URL and an array of properties as parameters. Inside the API, an entry in an array of structures is initialized and the index is returned as the handle. The structure contains the source URL as one of the members. A second member of the structure, an array of destination URLs, is left uninitialized. This is filled in each time as subscriber is added for that event source. Another member of the structure is the list of properties that this event source provides. This is effectively a cached copy of the DST for the event source. As events are submitted, the local properties are updated.

When SubmitUpnpPropertyEvent( ) is called, each property submitted replaces the corresponding property already maintained by the API. If no subscribers exist, the request to submit an event is ignored. If one or more subscribers exist, their callback URLs are looked up in the list of subscribers for the given event source and a NOTIFY message is constructed and sent to each URL, one at a time, in order of subscription.

If an event is submitted and no response is received (or a CD-side error occurs), the CD continues to attempt to send to the UCP. If the subscription timeout expires, then the subscription is removed. If the UCP becomes available again, it will re-subscribe because it will notice the sequence numbers are not contiguous.

When an HTTP server 626 receives a SUBSCRIBE message, it passes it along to a function which parses the message for the necessary information. The Request-URI identifies the service that is to be subscribed to. The callback URL is obtained from the "Callback" header. Since the Callback header can contain multiple URLs, it picks the first "http://" URL it finds. It then adds the subscriber to the list of subscribers for this event source. A unique subscription identifier is constructed which it will send back to the subscriber in the HTTP response to the SUBSCRIBE request.

If no event source matches the Request-URI from the subscription message, the HTTP server should return "404 Not Found".

When a subscription is added, the local copy of the DST is sent as a NOTIFY message. This special NOTIFY message contains sequence number 0 which informs the UCP that this is an initial state population event and not a notification where every event has changed.

When a CD receives an UNSUBSCRIBE message, it checks the "SID" header to obtain the subscription identifier. It looks up the subscriber ID in the list of subscribers for that event source and removes the destination URL entry associated with it.

GENA Server API

GENA servers 630 are generally going to be UPnP UCPs. A GENA server is anything that receives and processes NOTIFY messages to handle notifications from resources and sends SUBSCRIBE and UNSUBSCRIBE messages to receive notifications from resources. These APIs leverage the already existing SSDP APIs. The following are the changes to the APIs:

RegisterNotification( )

The RegisterNotification( ) allows a UPnP UCP to request notification when an event occurs for a given UPnP service. The prototype is as follows:

```
HANDLE RegisterNotification(
    NOTIFY_TYPE nt,              // SSDP_ALIVE | SSDP_PROP-
                                 CHANGE
    | ??
    LPTSTR szResourceType,       // based on NOTIFY_TYPE, unused
    if
    // SSDP_PROPCHANGE is used.
    LPTSTR szEventUrl,
    ServiceCallbackFunc fnCallback,
    void *pContext
);
```

Parameters: Nt [in] An enumeration that determines the type of notification requested. The values are: SSDP_ALIVE—a service has become available, and SSDP_PROPCHANGE—a property has changed on the service. SzResourceType [in] A null-terminated string specifying the resource type desired. For SSDP_ALIVE, this is the service type, for SSDP_PROPCHANGE this is unused. SzEventUrl [in] A null-terminated string specifying the URL that a subscription request should be sent to. FnCallback [in] A pointer to a function that will be called each time a notification is received. The function pointer is defined in the SSDP spec. PContext [in] This parameter is included as a parameter when invoking the client-supplied callback function.

Return Value: If the function succeeds, the return value is a handle used in a subsequent call to the DeregisterEventNotification( ) function. If the function fails, the return value is INVALID_HANDLE_VALUE error code. To get extended error information, call GetLastError.

ServiceCallbackFunc

```
typedef enum _SSDP_CALLBACK_TYPE {
    SSDP_FOUND = 0,
    SSDP_ALIVE = 1,
    SSDP_BYEBYE = 2,
    SSDP_DONE = 3,
    SSDP_PROPCHANGE = 4,
} SSDP_CALLBACK_TYPE, * PSSDP_CALLBACK TYPE;
```

UPnP UCP Architecture

When a UPnP UCP wishes to subscribe to notifications for a particular UPnP service, it calls the RegisterNotification( ) API. It passes to this API a notification type that identifies the type of notification being requested, a URL to which a subscription should be sent, and a callback function and context for use when the notification is received.

RegisterNotification( ) will compose a SUBSCRIBE message, using the data passed in, and send that to the URL specified by the caller. The Callback header of the SUBSCRIBE message will be composed on the fly, as an arbitrary URL for notifications to be sent to for this subscription. This callback URL will likely be a constant since the server API will always know how to handle requests sent to this URL. It will then send the SUBSCRIBE message and await a response.

RegisterNotification( ) in the SSDP API does not currently send HTTP requests, but it can be modified to do so. It also needs to await a response which it will also be modified to do so.

When the response is received, the Subscription-ID header contains a SID which is associated with the callback function specified by the caller.

Immediately after the response is received, the UCP should expect an initial NOTIFY message that contains the complete set of properties maintained by the CD. This becomes the local cached DST on the UCP side. From this point on, all modifications to the table are made via NOTIFY messages. This initial NOTIFY message will have sequence number 0 that indicates it is an initial property set and not an update. The UCP can use this information in any way it sees fit. This ensures the UCP's state table is always in sync with the one on the CD.

When a message is received by the HTTP server on the UPnP UCP, it is passed to a function which determines the method name and Request-URI. If this is a NOTIFY message, the headers are parsed and packaged up into a structure. The callback function that was specified to RegisterNotification( ) is called with that structure as one of the parameters. UCPs who implement the callback function can find the headers and body of the NOTIFY message and do additional processing based on the notification type.

This all requires that the SSDP HTTP server listen on a TCP socket in addition to the UDP multicast port it already listens to. However, once a NOTIFY message is received, it is processed in the same way regardless of from which connection it originated.

Handling Failures

The following are subscription/notification failures that can occur and their solutions:

Leaked Subscriptions

To protect against subscriptions that exist on the controlled device, but no longer on the UCP, we institute the timeout feature of GENA subscriptions. The scenario is this: A UCP subscribes to a CD, then the UCP reboots. Meanwhile, the CD is still trying to send notifications to that UCP. If the UCP never comes back, the subscription would be leaked because the UCP never told the CD that it was going away. So to correct this, each subscription request includes an arbitrary timeout value which indicates to the CD that the UCP will be re-subscribing every n seconds indicated in the timeout header of the subscription request. If the timeout expires on the CD, the subscription is removed. The UCP is required to re-subscribe before the timeout period has elapsed. If it fails to do so, the subscription will be terminated by the CD.

Some time before the timeout expires on the UCP, a re-subscribe message should be sent. The re-subscribe message is similar to the subscribe message, but it does not contain an NT or Callback header. If the UCP is unable to re-subscribe within the timeout period, the subscription will be terminated by the CD. If the UCP sends a re-subscribe after the CD has terminated the subscription, the CD will return "412 Precondition Failed".

Reboot of a Controlled Device

If a controlled device reboots, information about all of its subscribers would be lost. To prevent this, the subscriber information will be persisted across reboots of the device. Because the subscription info contains a timeout member, the absolute expiration time will be used when the subscription information is persisted. That way, when the device comes back up, it can check the timeout for each subscriber and if that time has passed, the subscription will be removed.

Network Error Sending Event Notifications

If a controlled device receives an error sending an event notification to a subscriber, it will NOT cease to send notifications. It will continue to send notifications and receive errors until the subscription expires. The problem for the UCP is that it will have missed a number of event notifications and so its state table will be out of sync. To correct this, each event notification message will contain a 32-bit sequence number that starts at 0 and increments for each message sent to a subscriber. If a subscriber receives a notification with a sequence number that is not exactly one more than the previous notification, it will know that it has lost events and will ignore all future notifications until it receives one with sequence number 0 again. Events with sequence number 0 indicate that the event is an "initial state" event.

Once it realizes that is has lost one or more events, the UCP will send an UNSUBSCRIBE message, followed by a SUBSCRIBE message. This is not the same as a re-subscription because re-subscriptions do not cause the CD to start the sequence over at 0. In this case, the active unsubscribe/subscribe will cause the CD to restart the sequence at 0 and send the entire state table with the first notification message.

The SUBSCRIBE Message

When a UPnP UCP wishes to subscribe to event notifications for a UPnP service 210–211, it will form a SUBSCRIBE message of the following format:

SUBSCRIBE service1 HTTP/1.1

Host: vcr.local:200

NT: upnp:event

Callback: <http://remote1.local:923/upnp>

Timeout: Second-600

The response is as follows::

HTTP/1.1 200 O.K.

SID: uuid:kj9d4fae-7dec-11d0-a765-00a0c91e6bf6

Timeout: Second-600

This example of a GENA SUBSCRIBE request and response demonstrates a subscription to event notifications for "service1." The host is "vcr.local." All notifications for this service will be sent to the callback URL http://remote1.local:923/upnp. In the response, the "Subscription-ID" header provides the subscriber with an identifier to use when it wants to unsubscribe to this resource. The "Timeout" header indicates that the subscriber will send a re-subscription request before 10 minutes have elapsed. If the device does not receive this request within that period of time, it will remove the subscription.

The Re-SUBSCRIBE Message

When a UPnP UCP wishes to re-subscribe to event notifications for a UPnP service, it will form a SUBSCRIBE message of the following format:

SUBSCRIBE service1 HTTP/1.1

Host: vcr.local:200

SID: uuid:kj9d4fae-7dec-11d0-a765-00a0c91e6bf6

Timeout: Second-600

The response would be as follows::

HTTP/1.1 200 O.K.

SID: uuid:kj9d4fae-7dec-11d0-a765-00a0c91e6bf6

Timeout: Second-600

Note that the NT and Callback headers are absent, but the SID header exists. This tells the CD 106 which subscription is being renewed and restarts the timeout. When the CD receives this message, it will persist the subscriptions to disk (or other persistent data storage medium), updating the absolute timeout based on the current time and a new timeout sent by the UCP (if it was different).

The NOTIFY Message

When a resource wishes to send an event notification, it will form a NOTIFY message of the following format:

NOTIFY upnp HTTP/1.1

Host: remote1.local:923

NT: upnp:event

NTS: upnp:propertychanged
SID: uuid:kj9d4fae-7dec-11d0-a765-00a0c91e6bf6
Seq: 123
Content-Length: xxx
Content-Type: text/xml
<event XML schema>
The response is as follows::
HTTP/1.1 200 O.K.

This example of a GENA NOTIFY request and response demonstrates that a "upnp:propertychanged" event is being sent to http://remote1.local:923/upnp. The USN header identifies "vcr.service1" as the event source. The XML contains the property name, value, and type. The "Seq" header indicates the sequence number of the notification. Sequence number 0 indicates the initial state update for the subscriber.

Property Change Event XML Schema

A UPnP property change event will be of the following form:

```
<U:propertyset xmlns:U="upnp">
    <U:propcount>2</U:propcount>
    <U:property>
    <U:foo>
        <U:type>string</U:type>
        goodbye
    </U:foo>
    <U/:property>
    <U/:property>
    (U:bar>
        <U:type>integer</U:type>
        27
    </U:bar>
    </U:property>
</U:propertyset>
```

Here, a property named "foo" is of type "string" and has a value of "goodbye" and a property named "bar" has a type of "integer" and has a value of 27. The XML will be contains a list of multiple properties that have changed, along with a count to make it easy to determine this.

The UNSUBSCRIBE Message

When a UPnP UCP wishes to unsubscribe to event notifications for a UPnP service, it will form an UNSUBSCRIBE message of the following format:

UNSUBSCRIBE service1 HTTP/1.1
Host: vcr.local:200
SID: uuid:kj9d4fae-7dec-11d0-a765-00a0c91e6bf6
The response would be as follows::
HTTP/1.1 200 O.k.

This example of a GENA UNSUBSCRIBE request and response demonstrates that the UCP is no longer interested in receiving event notifications from http://vcr.local/service1:200.

Step By Step: UCP to CD & Back

Figure 24:
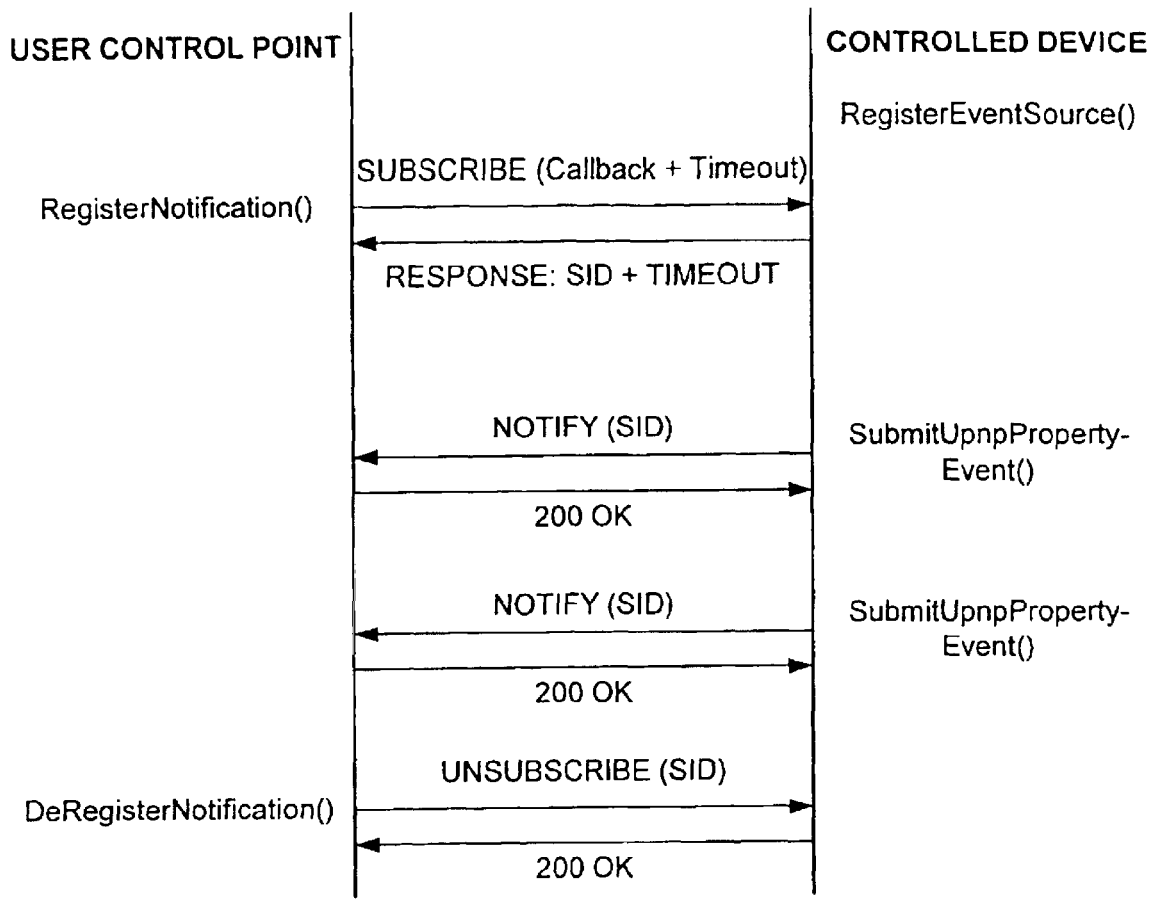
FIG. 24 is a data flow diagram illustrating subscription, notification and unsubscription in the eventing model of FIG. 23.

This section will take a step by step approach to what happens on both sides (UCP & CD) of an event notification. The description starts at the initialization of a UPnP device. FIG. 24 illustrates the subscription, notification, and unsubscription process.

1. A UPnP device called "vcr" initializes.
   a. It sets itself up to be an HTTP server by doing the following:
      i. It binds to a TCP socket using its IP address and an arbitrary port number. This address/port pair will be referenced by all incoming URL requests.
      ii. It listens for incoming connection requests on that socket and sets itself up to accept any incoming connections.
   b. It sets itself up to be an HTTP client by doing the following:
      i. Calls InternetOpen( ) to get a handle to the internet session
   c. For each service it exposes, it does the following:
      i. It calls the SSDP API RegisterUpnpEventSource( ) to let the SSDP server know that it will be accepting subscriptions and sending event notifications. At this point, it has no subscribers. Note that this is called before the service has announced itself so that it can be ready to accept subscriptions immediately. RegisterUpnpEventSource( ) sends no network traffic on the wire. It is a local initialization only. RegisterUpnpEventSource( ) does the following:
         1. Adds a structure to the list of event sources containing the following:
            a. A URL to which subscribers will send subscription requests
            b. A list of destination URLs. A notification message will be sent to each destination URL.
            c. The state table for the event source. This structure contains the property name, value, and type for each property supported by the service.
      ii. It calls the SSDP API RegisterService( ) to let the world know that it has become available. RegisterService( ) will send out an SSDP "alive" message on the multicast channel that will be heard by any device running the SSDP service.
   d. It starts sending events immediately, even without subscribers. Each event submission updates the local state table. This submission needs to be atomic with regard to adding subscribers, so between the time the SubmitEvent( ) API is called, and the time the local state table is updated, no subscriptions can be added or removed.
2. Meanwhile, a UPnP UCP initializes.
   a. It initializes its HTTP server, passively listening on a TCP port.
   b. If the UCP started up before the UPnP device initialized, it won't see any services become available. When the device finally starts, the UCP will be notified.
   c. Once the UPnP services have been announced the UCP will be able to access one or more of them.
   d. The UCP drives the UPnP API to instantiate a UPnP Service Object.
   e. The UPnP Service Object does the following when it is instantiated:
      i. It obtains the event subscription URL from the description for that service.
      ii. It calls the SSDP API RegisterNotification( ) specifying SSDP_PROPCHANGE as the event type, the event subscription URL, a callback function pointer (which is a static member function of the class), and a context pointer (which is the "this" pointer of the class). RegisterNotification( ) does the following:
         1. It makes an LRPC call to the SSDP service. The rest happens on the service side.
         2. If this is the first time it is called for SSDP_PROPCHANGE notifications, RegisterNotification( ) will call InternetOpen( ) to get a handle to an internet session. This handle is shared among all local UPnP UCPs.
         3. It calls InternetConnect( ) passing the server name given in the URL it was passed.

4. It calls HttpOpenRequest( ) passing in the rest of the URL it was passed.
5. The handles returned by these functions are saved with the structure that maintains the subscription.
6. It composes a SUBSCRIBE message, using the data passed in, by calling HttpAddRequestHeaders( ). It adds the "NT", "Callback", and "Timeout" headers. The Callback header of the SUBSCRIBE message will be composed on the fly, as an arbitrary URL for notifications to be sent to for this subscription. The server name is the local IP address, and the port is the same one referred to by step 2a above.
7. It calls HttpSendRequest( ) to send the request to the CD. This is a synchronous function that will return when the request has been responded to by the CD.
8. It calls HttpQueryinfo( . . . , HTTP_QUERY_CUSTOM, . . . ) to get the "Subscription-Id" header. The resulting SID will be stored with the subscription structure.
9. It calls HttpQueryinfo( . . . HTTP_QUERY_CUSTOM, . . . ) to get the "Timeout" header. The resulting timeout value will be stored with the subscription structure.
10. A timer is started for re-subscription based on the timeout value returned in the response. When the timer goes off, the re-subscription will be sent.
11. The SID, callback function pointer, and timeout values are stored in a structure that maintains the list of local subscriptions.

3. Back on the UPnP CD, the subscription request is received by the HTTP server. The following occurs:
a. The request is parsed into URI, NT, Callback, and Timeout fields.
b. The NT field must match "upnp:event". If it doesn't, the CD responds with "412 Precondition Failed."
c. The URI identifies the event source. The URI is converted into a URL and matched with the list of event sources registered on the CD. If no match is found, the CD responds with "404 Not Found".
d. If a match is found, the following occurs:
  i. The Callback URL is added to a list of subscriber URLs.
  ii. The Timeout value is processed and an absolute time is stored with the event source data. If this time expires and a re-subscribe message has not been received, the subscription is removed.
  iii. A new SID is created, and stored with the subscriber in the event source.
  iv. A sequence number is initialized to 0.
  v. A subscription response is composed, including an echo of the Timeout header and the SID just created.
  vi. The response is sent.
  vii. If the response is sent successfully, the list of event sources is persisted to disk for recovery purposes.
  viii. A timer is started using the same timeout value as the header echoed to the UCP. When this timer elapses, the subscription is removed. If the CD receives a re-subscribe request, this timer will be reset. In an ideal world, the timer will never elapse.
  ix. An initial event notification is sent to initialize the UCP's state table. The following describes that process:
    1. InternetOpen( ) is called if an existing internet session handle does not exist.
    2. InternetConnect( ) is called, passing the server name specified in the callback URL for this subscription.
    3. HttpOpenRequest( ) is called, passing in the rest of the callback URL.
    4. A NOTIFY message is composed, using the data passed in, by calling HttpAddRequestHeaders( ). It adds the "NT", "NTS", "SID", "Seq", "Content-Length", and "Content-Type" headers.
      a. The NT header will always be "upnp:event". The NTS header will always be "UPnP:property-change".
      b. The SID header contains the SID stored in the event source structure
      c. The Seq header will always be 0.
      d. The Content-Length header will be the number of bytes in the XML body.
      e. The Content-Type header will always be "text/xml".
      f. The body of the message is composed from the list of properties stored within the event source structure:
        i. Write the <propertyset> opening tag.
        ii. Write the <propcount> n</propcount> tag. Where n is the number of total properties.
        iii. For each property:
          1. Write the <property> opening tag.
          2. Write the <prop> opening tag, where prop is the name of the property.
          3. Write the <type>type</type> tag, where type is the stringized type name of the property type.
          4. Write the property value.
          5. Write the </prop> closing tag.
          6. Write the </property> closing tag
        iv. Write the </propertyset> closing tag
    5. It calls HttpSendRequestEx( ), then InternetWriteFile( ), then HttpEndRequest( ) to send the request to the CD.
    6. The response is ignored except for debugging purposes.
4. The UPnP CD now is ready to send an event notification. It does this by calling the SubmitUpnpPropertyEvent( ) API. The following occurs inside that API:
a. The event source handle is converted to an event source structure.
b. The properties that have changed as a result of the event are passed into the function and updated in the local list of properties stored with the event source.
c. For each subscriber, the following occurs:
  i. InternetConnect( ) is called, passing the server name specified in the callback URL for this subscription.
  ii. HttpOpenRequest( ) is called, passing in the rest of the callback URL.
  iii. A NOTIFY message is composed, using the data passed in, by calling HttpAddRequestHeaders( ). It adds the "NT", "NTS", "SID", "Seq", "Content-Length", and "Content-Type" headers.
    1. The NT header will always be "upnp:event". The NTS header will always be "UPnP:propertychange".
    2. The SID header contains the SID stored in the event source structure
    3. The sequence number for the event source is incremented and the Seq header is created with this value.
    4. The Content-Length header will be the number of bytes in the XML body.
    5. The Content-Type header will always be "text/xml".
    6. The body of the message is composed from the list of properties stored within the event source structure:
      a. Write the <propertyset> opening tag.
      b. Write the <propcount>n</propcount> tag. Where n is the number of total properties.

c. For each property that has been submitted:
   i. Write the <property> opening tag.
   ii. Write the <prop> opening tag, where prop is the name of the property.
   iii. Write the <type>type</type> tag, where type is the stringized type name of the property type.
   iv. Write the property value.
   v. Write the </prop> closing tag.
   vi. Write the </property> closing tag
d. Write the </propertyset> closing tag
iv. SubmitEvent( ) is called, passing the event source handle, the handle to the headers created by 4c(i) thru 4c(iii) above, and the body created in step 4c(iii)6. SubmitEvent( ) does the following:
   1. It calls HttpSendRequestEx( ), then InternetWriteFile( ) on the body, then HttpEndRequest( ) to send the request to the CD.
   2. The response is ignored except for debugging purposes.

5. The UPnP UCP receives the notification message. The message is processed as follows:
a. The HTTP server receives a NOTIFY message with a Request-URI and several other headers.
b. The NOTIFY message is parsed, looking at the "NT" header first. If this header contains "upnp:event", then the message is further processed for event notifications as follows:
   i. The message is parsed for the NTS header. If that contains "upnp:propertychanged", then the message is parsed further as follows:
      1. The message is parsed for the SID header. The SID indicates to the UPnP control point which subscription this message applies to.
      2. The message is parsed for the "Seq" header. If this header contains a value of 0, the UCP knows this is an initial state populate request. If the local sequence number is exactly one less than the Seq header, the local sequence number is updated (incremented), and the message is processed further.
      3. The Request-URI can be ignored, since the HTTP server knows all NOTIFY messages with an NT header of "upnp:event" are sent to the same Request-URI.
      4. If the Seq header contains a number that is not exactly one more than the local sequence number, the UCP knows it has missed an event. In this state, it needs to unsubscribe and re-subscribe to the event source in order to re-sync its state.
      5. The SID is matched against the list of subscriptions maintained on the UCP. When the SID is matched, its associated callback function is invoked.
      6. The callback function is passed an SSDP_MESSAGE structure which contains all the relevant headers and the body of the XML message received.
      7. The callback function is implemented by the UPnP API, as a static member of the Service object. When this function is called, the following occurs:
         a. The body of the message is parsed using the XML DOM services.
         b. As properties are enumerated, their values are stored in the local state table for the service.
         c. An event is fired to all high-level clients of the UPnP API. This event contains the list of properties that have changed and their new values.

6. The re-subscription timer for one of the UCPs subscriptions expires. The following occurs:
   a. A re-subscribe message is composed. This message is very similar to a subscribe message except in doesn't include an NT or Callback header, but it does have a SID header.
   b. The request is sent to the CD.
   c. The response contains the new timeout value.
   d. The timer is reset with this timeout.

UCP State Synchronization Models
   CD-Initiated NeedsSync method
   This method begins with the CD sending its initial state to the subscriber the first time an event is submitted by the service. UCPs will subscribe to the service first, then receive notifications for events as they occur. The first event will happen to be the initial state of the service. The UCP state table will always be in sync with this method.
   When the CD sends a notification to a subscriber and receives an error. In this case, it marks the subscriber as "NeedsSync" and the next time an event is submitted, all events are sent to the subscriber. The problem with this is that the API needs to keep track of which subscribers need syncing and which ones don't. The client of this API (the UPnP service) would need to send separate messages to each subscriber and know which ones needed all events and which ones just wanted the ones that changed.
   UCP-Initiated Sync
   This method states that the UCP should subscribe to event notifications, then call a function that obtained the state from the service. This means that any events that were received in the meantime would need to be matched against the incoming set of events and replaced if they were older. This method leads to synchronization issues where the UCP may receive events that are newer but when it queries for the state, it gets an older view of the table. This requires using sequence numbers to determine which information is newer. If the view of the table received by the query is too old, it has to be discarded. Alternatively, the properties that were not received by event notification would not be overwritten, but all other properties would be. Using sequence numbers make this more complicated.
   CD-Initiated Sync
   This preferred method takes a simpler approach. Any time the UCP subscribes to a service, the service will immediately afterwards, send the entire contents of the state table with the first notification. This precludes the UCP from making a query for the state table. Subsequent events update the local state table on the UCP. If the connection is lost, the UCP will lose its subscription. If the UCP realizes it has not received an event after a certain amount of time has elapsed, it will re-subscribe. At that point, the CD will re-send the entire state table again, and the UCP is ensured to be up to date.

Figure 25:
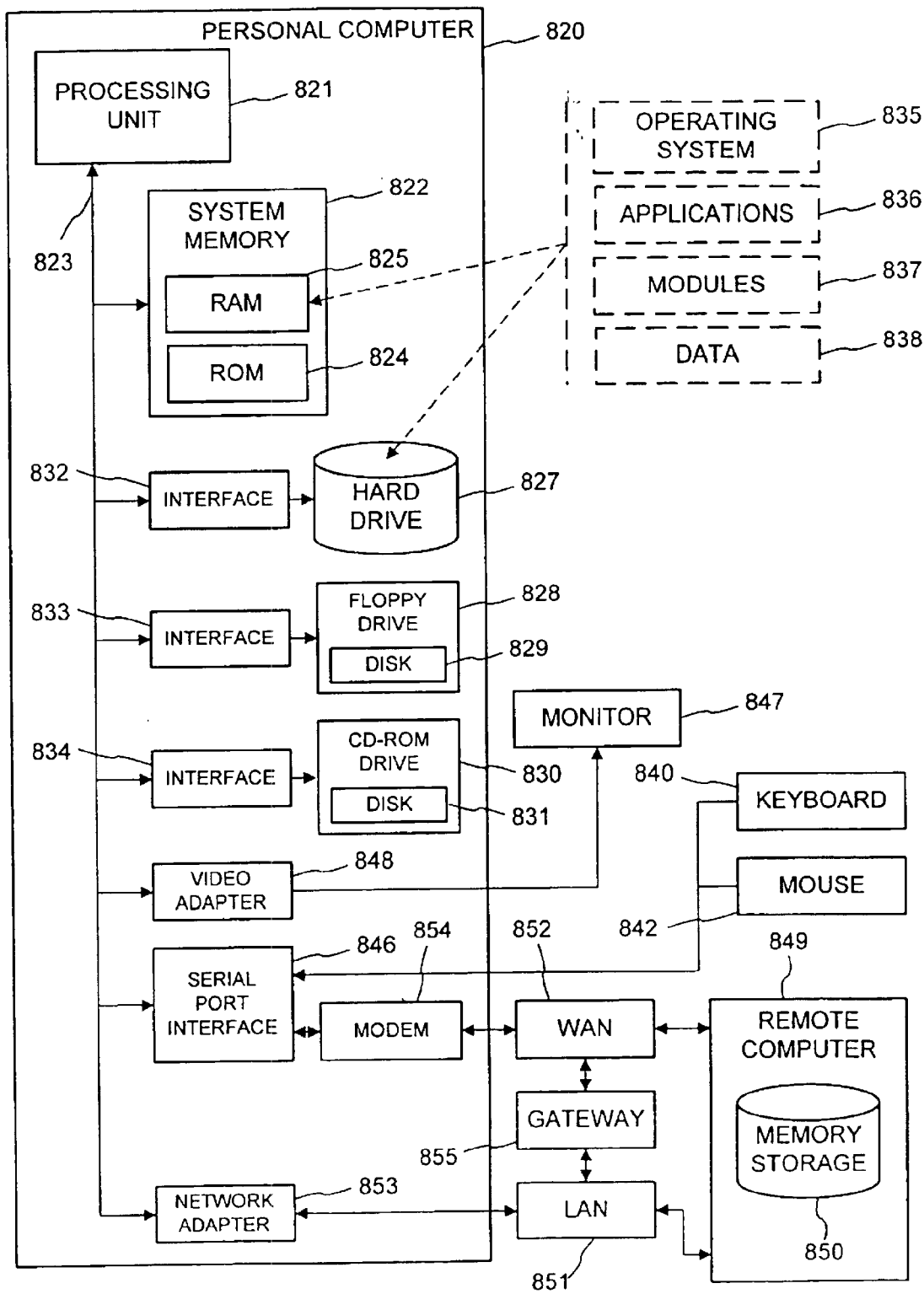
FIG. 25 is a block diagram of a computer system that may be used in the device control model of FIG. 3.

Exemplary Computer Hardware
   FIG. 25 and the following discussion are intended to provide a brief, general description of a suitable computer which may be used in the above described UPnP device control model. This conventional computer 820 (such as personal computers, laptops, palmtops or handheld-PCs, set-tops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838.

A user may enter commands and information into the computer 820 through a keyboard 840 and pointing device, such as a mouse 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated in FIG. 25. The logical connections depicted in FIG. 25 include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 820, unless indicated otherwise. Such acts and operations are sometimes referred to as being computer-executed. It will be appreciated that the acts and symbolically represented operations include the manipulation by the processing unit 821 of electrical signals representing data bits which causes a resulting transformation or reduction of the electrical signal representation, and the maintenance of data bits at memory locations in the memory system (including the system memory 822, hard drive 827, floppy disks 829, and CD-ROM 831) to thereby reconfigure or otherwise alter the computer system's operation, as well as other processing of signals. The memory locations where data bits are maintained are physical locations that have particular electrical, magnetic, or optical properties corresponding to the data bits.

Exemplary Embedded Computing Device

Figure 26:
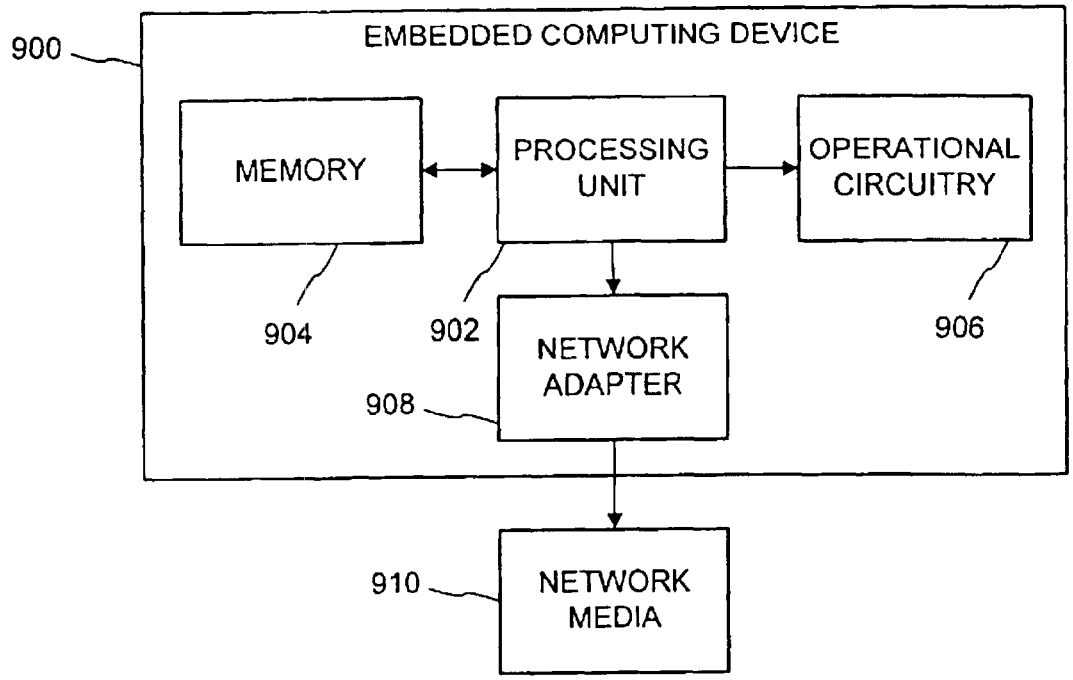
FIG. 26 is a block diagram of a device having embedded computing and networking capability per Universal-Plug-and-Play (UPnP) standards that may be used in combination with the computer system of FIG. 25 in the device control model of FIG. 3.
Figure 27:
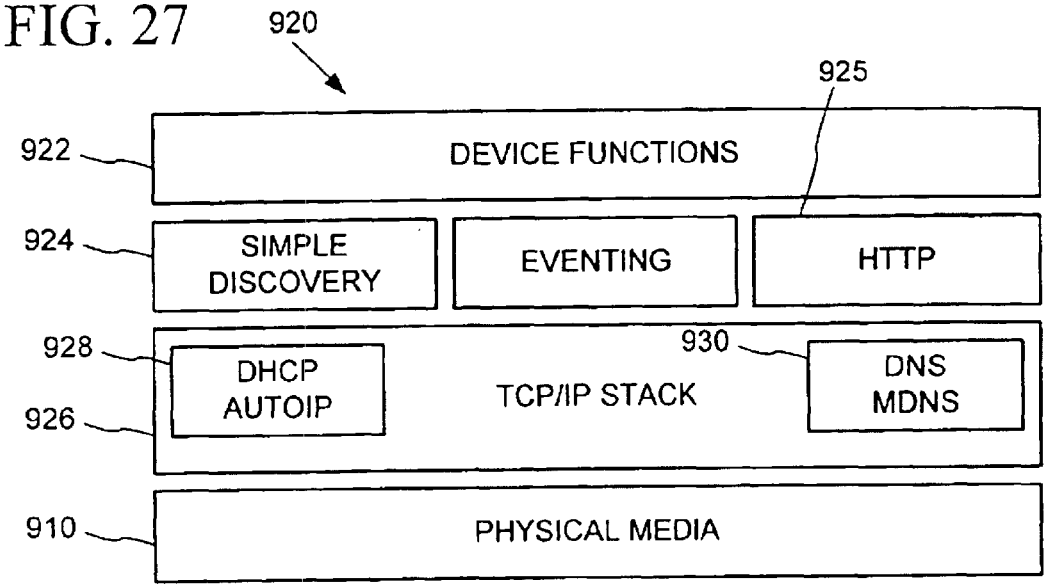
FIG. 27 is a block diagram of a software architecture per UPnP standards in the embedded computing device of FIG. 26.

FIGS. 26 and 27 are intended to provide a brief, general description of a suitable embedded computing device 900 which may be used in the illustrated implementation of the invention. The embedded computing device 900 can be any variety of device incorporating electronics to control operational functions (operational circuitry 906), and in which computing and networking capabilities are embedded. For example, devices in which computing and networking functions can be embedded include communications devices (e.g., telephones, cell phones, audio and video conferencing systems, 2-way radios, etc.), office equipment (printers, fax machines, copiers, dictation, etc.), audio-video equipment (audio and video recorders and players, including televisions, radio receivers, compact disk (CD), digital video disk (DVD), camcorders, etc.), entertainment devices (set-top boxes, game consoles, etc.), environment control equipment (thermostats, heating/ventilation/air-conditioning equipment, light switches, etc.), security systems, home appliances (coffee makers, dishwashers, clothes washer/dryer), automobiles, public facilities equipment (signs, traffic signals, etc.), manufacturing equipment, and many others.

With reference to FIG. 26, the device 900 includes a processing unit 902, and a memory 904 to provide embedded computing capability. The processing unit 902 has hardware interfaces to the operational circuitry 906 that operates devices functions. The processing unit 902 can be a microprocessor or micro-controller, such as are available from Intel, Motorola, IBM, and others. The memory 904 preferably incorporates RAM and ROM to hold software and data for basic operating code as well as for user applications.

The device 900 also includes a network adapter 908 for connecting with a network media 910 that is interconnected with the computer network in which the authoritative names registry (described below) is implemented in accordance with the invention. The network adapter 908 can be a network interface card (or chip set integrated on a single board with the processing unit 902) appropriate to the particular network media 910. The network media can be any of various wired or wireless network media, including Ethernet, IEEE 1394 (a.k.a. firewire), radio frequency (including satellite, cell, pager, commercial signal sideband, etc.), power line carrier (PLC), phone line, and television cable, among others.

With reference now to FIG. 27, the embedded computing device 100 (FIG. 26) has a software architecture 120 that conforms to the above described UPnP device control model. UPnP provides a mechanism for the embedded computing device to operate in the Internet, as well as networks that have no administrator and no connection to the Internet, and hence no access to configuration services like the Dynamic Host Configuration Protocol (DHCP). DHCP is a mechanism for providing devices with configuration information needed to access the Internet. The mechanism functions through the use of a multicast request for configuration information that is generally responded to with an IP address and DNS server location. Additional information can only be returned in the response.

In non-configured (ad-hoc) networks, UPnP uses the AutoIP protocol. AutoIP is an enhancement to DHCP that allows devices to claim IP addresses in the absence of a DHCP server or similar IP configuration authority. IP addresses are claimed from a reserved range that is not allowed to be transmitted on the open Internet; thus they are only good for the local network. The embedded computing device 100 claims an address by randomly generating an address in the reserved range and then making an ARP request to see if anyone else has already claimed that address. AutoIP systems will continually check for the presence of a DHCP server so that if one should ever come online, all the AutoIP devices will attempt to switch their IP addresses to one provided by the DHCP server. This allows a network to operate in isolation, be connected to the Internet with DHCP support and then to be returned to isolation. This type of scenario will be common in homes that use dial-up access.

UPnP also uses the Internet Domain Name System (DNS) for addressing the embedded computing device 900. The DNS is a mapping system that translates human readable domain names, like microsoft.com, into their equivalent IP address. Most corporate intranets implement an internal version of the same technology to provide the same services. In small networks, such as at home or in small business, DNS servers may not exist. Multicast DNS allows DNS requests to be multicast. This allows a machine to see requests for its own name and respond to them. Like AutoIP, Multicast DNS is only used when a DNS server is not available. (For more information, see B. Woodcock, Zocolo, and B. Manning, "Multicast Discovery of DNS Services," which can be found at http://search.ietf.orq/internet-drafts/draft-manning-multicast-dns-01.txt.)

UPnP implements a peer discovery mechanism that uses the Simple Service Discovery Protocol (SSDP) for discovery of devices on IP networks. SSDP is based on profiles. A single identifier specifies a profile that defines a contract between the client and service (e.g., operational functions provided by the embedded computing device). By identifying itself with the profile, the service advertises compliance with the associated contract. Using a single identifier makes it possible to implement an extremely simple discovery system. Clients send out a User Datagram Protocol (UDP) multicast packet containing the identifier of the desired service on some standard channel. Services listen on the standard channel, read the request, see whether they provide the service, and respond if so.

UPnP also provides a Directories mechanism to allow discovery to scale—to the entire Internet if needed. When present, a directory will read all incoming service requests and respond to them itself. This requires that all services (e.g., the embedded computing device 900) register with the directory so that the directory is able to properly answer on their behalf. The directory is also responsible for communicating with other directories in order to determine whether the service is available within the local network, the WAN and potentially the Internet.

To simplify the discovery protocol, directories are treated as proxies. A proxy is a service that accepts requests and takes responsibility for finding the proper response. When a client comes online, it will perform discovery for the proxy. If the proxy is present, then the client will send all future discovery requests to the proxy. If the proxy isn't present, then the client will send all discovery requests to the reserved discovery multicast channel. Regardless of the presence of a proxy, the client's request format and procedures will always be the same. The only difference will be the address to which the client sends its requests. For services, the difference between a proxied and unproxied network is their need to answer discovery requests. On a proxied network, services need do nothing once they have registered with the proxy. On an unproxied network, they answer discovery requests directly.

SSDP uses the UDP- and Transmission Control Protocol (TCP)-based Hyptertext Transport Protocol (HTTP) to provide for service discovery. SSDP uses a Uniform Resource Identifier (URI) to represent the service and the OPTIONS method to provide for discovery. SSDP also will provide support for proxies. These proxies, which are really just fronts for directories, redirect discovery requests to themselves. It is the proxy's job to collect announce requests in order to determine what services are available as well as to communicate with other proxies in order to provide for scalable service discovery.

The discovery process returns only the basic information needed to connect to the embedded computing device. Once a service has discovered its peers, the service often needs to find out more information in order to work best with them. The description process returns a schema providing descriptive data about the service.

A schema is a structured data definition that defines a set of structured values that provide descriptive information about a service. UPnP uses the Extensible Markup Language (XML) for schema, because XML's self-describing structured data format provides the level of expressiveness and extensibility needed by a universal schema and data format.

Accordingly, UPnP supports automatic network introduction, meaning that devices and their related services have the ability to be self-describing and allow automatic configuration. When a device is plugged into the computer network, the device automatically configures itself and acquires a TCP/IP address. The device then announces its presence to other devices already on the network using a simple discovery protocol based on the Internet HTTP protocol and is immediately ready to share its services with any device that requests them.

With UPnP, device developers are not required to develop specific device drivers to operate under UPnP. The task of preparing a device for operation in this network environment thus is fairly simple. Moreover, in configured networks, dynamic detection allows an operating system to immediately begin using added devices or stop using removed devices without rebooting.

UPnP Devices support automatic discovery, identification, and configuration to achieve interoperability in the home environment, but must also operate correctly in a managed corporate network. Devices can be networked instead of being attached directly to a PC, and devices are all autonomous citizens on the network, able to talk with each other and exchange information. UPnP provides a unified way of performing directory services with automatic configuration. Capability for simple discovery mechanism used in the home environment provides the ability for any device to become a node on the global Internet. Additionally, directory services can be leveraged if they are available in the corporate environment.

UPnP provides a common set of interfaces for accessing devices and services, enabling the operational unification of diverse media types. Communications protocols for Universal Plug and Play are based on industry standards, especially key Internet standards such as TCP/IP, HTML, XML, HTTP, DNS, LDAP, and others. Individual implementations for particular networks and buses are built on established protocols.

As shown in FIG. 27, the software architecture 920 of the embedded computing device 900 (FIG. 26) includes the following software code modules that implement UPnP: device functions 922, simple discovery 924, Hypertext Transport Protocol (HTTP) 925, Transmission Control Protocol/Internet Protocol (TCP/IP) stack 926, Dynamic Host Configuration Protocol (DHCP) with AutoIP extension 928, Domain Name System (DNS) with Multicast DNS extension 930, and physical media 910 (also shown in FIG. 26). The device functions 922 is a software code module to implement the device's functionality. For example, where the embedded computing device is a VCR, the device functions code can include code to implement start, stop, pause, record and other functions that the VCR can perform.

The simple discovery 924 is a software code module (about 4 Kbytes) that implements a simple discovery procedure (described below) for automatic network introduction under the UPnP protocol.

The simple discovery procedure additionally provides an Extensible Markup Language (XML) format device description, which is downloaded to clients that access the device to allow activation of device functionality from the client. XML is a textual, tag-based markup language. It was originally designed to be the "Webby" simplification of SGML (Standard Generalized Markup Language), and is therefore intended to be used to create "vocabularies" of tags that can be used to apply semantic markup to documents, such as who the author was, what constitutes a paragraph (semantically, not from a display point of view), when the author last had breakfast, and so on. (For more information, see A. Layman, E. Jung, E. Maler, H. Thompson, J. Paoli, J. Tigue, N. H. Mikula, S. De Rose, "XML-Data", which can be found at http://www.w3.org/TR/1998/NOTE-xml-data-0105; and MSDN Online, XML Data Center at http://msdn.microsoft.com/xml/default.asp.) In the context of UPnP, XML is used to provide the description of services and capabilities of the embedded computing device. The embedded computing device makes its features visible to clients by providing its XML device description, which the client can use to activate device functions 922. For example, if the device is a camera, the client's browser can direct the camera to zoom in/out or adjust contrast using the mechanism of XML.

The XML device description can provide links (via a uniform resource locator or URL address) to an accompanying XSL format style sheet. The XSL style sheets are used to present the data in different ways, i.e., the style sheets are applied to present different views of the same data. For example, if the device contains a file system, one style sheet can show the file selections; another shows the file sizes in some sort of diagram; yet another style sheet could make thumbnails of these image files.

The HTTP 925 is a software code modules (about 20 Kbytes) that implements the standard HTTP protocol, which is an open standard mechanism for client/server message-based communication. HTTP provides for proxying, content negotiation and security. (For more information, see R. Fielding, J. Gettys, J. Mogul, H. Frystyk, T. Berners-Lee, "Hypertext Transfer Protocol-HTTP/1.1", which can be found at http://www.ietf.org/rfc/rfc2068.txt.)

The TCP/IP stack 926 implements the standard TCP/IP networking protocols for communication on the computer network. The Internet Protocol (IP) is the foundation protocol of the Internet. It defines how a single message is sent from a source through zero or more routers to its final destination. It covers issues such as message length, message fragmentation, addressing, and routing concerns. The Transmission Control Protocol (TCP) is an IP-based protocol that provides support for the reliable, ordered delivery of messages over IP. Additionally, User Datagram Protocol (UDP) and Internet Group Management Protocol (IGMP) multicast send/listen capability are included in the implementation.

The AutoIP 928 is a software code module also used for automatic network introduction via AutoIP in the UPnP protocol. AutoIP uses a predefined set of IP addresses and, when a device is connected to the network, it pings an address in this address space. If it gets no replies, the device assumes that the address is available and assigns it to itself. To make this functionality even more useful it is combined with Multicast DNS, in which the device itself holds its own name. Thus it is not even necessary to determine what IP address the device assigned to itself, because its name can always be used instead. An IP Multicast is a mechanism for sending a single message to multiple recipients. IP multicasting is especially useful for discovery operations where one does not know exactly who has the information one seeks. In such cases, one can send a request to a reserved IP multicast address. Any services that can provide the requested information will also subscribe to the multicast request and thus be able to hear the information request and properly respond. Multicast DNS is a proposal to the IETF on rules for making normal DNS requests using multicast UDP. (For more information, see B. Woodcock, B. Manning, "Multicast Discovery of DNS Services", which can be found at http://www.ietf.org/internet-drafts/draft-manning-multicast-dns-01.txt.)

The DHCP 930 is a software code module that implements the Dynamic Host Configuration Protocol (DHCP), which is a mechanism for providing devices with configuration information needed to access the Internet. The mechanism functions through the use of a multicast request for configuration information that is generally responded to with an IP address and DNS server location. Additional information can only be returned in the response.

Figure 28:
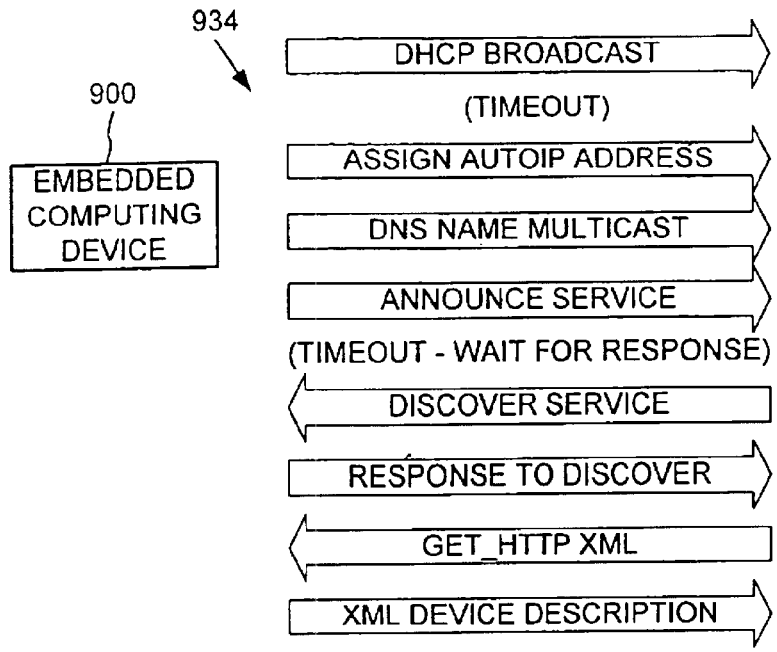
FIG. 28 is a data flow diagram of a process for automatic network introduction of the embedded computing device of FIG. 26 into an ad hoc computer network environment per the UPnP protocol.
Figure 29:
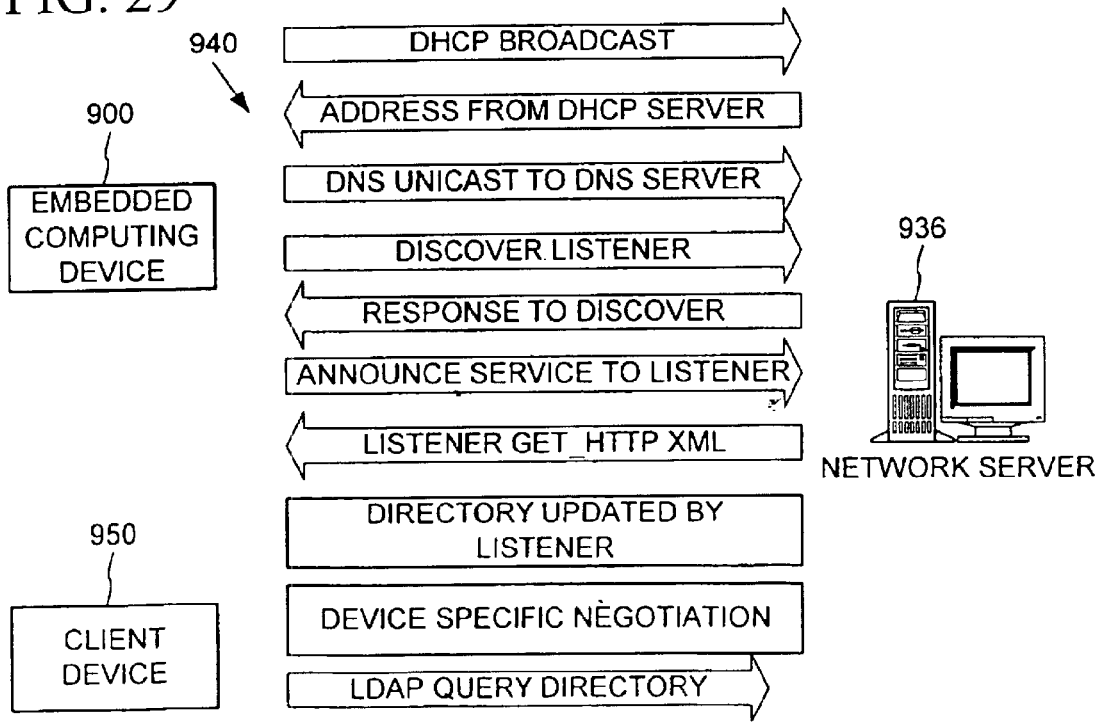
FIG. 29 is a data flow diagram of a process for automatic network introduction of the embedded computing device of FIG. 26 into a configured computer network environment per the UPnP protocol.

FIGS. 28 and 29 show processes 934, 940 per the UPnP protocol for automatic network introduction of the embedded computing device 900 (FIG. 26) into an ad hoc (where the device does not have a configured IP address) and a configured computer network environment, respectively. The automatic network introduction process establishes an appropriate configuration (e.g., with an IP address) of the embedded computing device upon connection to a server computer on a computer network, so as to enable access to the device from a client. The processes 934, 940 involve five phases: AutoIP, announce, discovery, response to discovery, and device description.

At the AutoIP phase, the AutoIP module 928 of the embedded computing device 900 uses a predefined set of IP addresses and, when the device is connected to the network, it pings an address in this address space. If no reply is received, the device 900 assumes that the address is available and assigns it to itself. Alternatively, the device 900 may combine AutoIP with Multicast DNS, and itself hold its own name. In which case, it is not necessary to determine what IP address the device assigned to itself, because its name can always be used instead.

At the announce phase, the embedded computing device 900 sends out a small multicast packet so that other devices can find it on the network. The multicast message packet essentially says, "I am here, I am, (say), a camera, and you can reach me at this IP address or URL."

At the discovery phase, the embedded computing device 900 listens for a discovery packet coming from a simple discovery client, i.e., the device announces itself, then listens for discovery. The discovery packet also is sent out by multicast.

At response to discovery, the embedded computing device 900 listens to the multicast address and then parses the information from a Simple Discovery request to decide if the request is for its kind of device. If so, the device 100 then sends back a response packet containing the following information: the IP address or URL where it can be reached; identification of its own device type; and the discovery packet ID so the requesting client knows which request is being answered.

Both the Announce and Discovery packets also contain a link or a URL to an XML file that is used by the embedded computing device at the device description phase to describe itself (i.e., its functionality). This XML data contains all the facts about the device. XML can also have URLs that point to appropriate style sheets (XSL files) that are used for optimal presentation. The XSL style sheets are used to present the data in different ways, i.e., the style sheets are applied to present different views of the same data. For example, if the device contains a file system, one style sheet can show the file selections; another shows the file sizes in some sort of diagram; yet another style sheet could make thumbnails of these image files.

Exemplary Client

Figure 30:
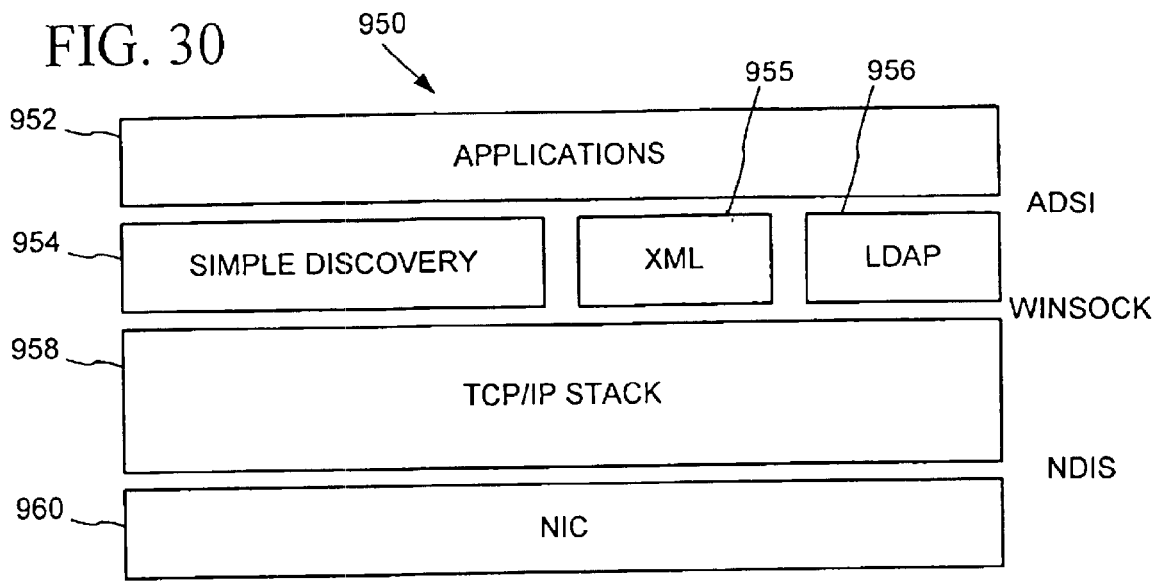
FIG. 30 is a block diagram of a software architecture of a client device per UPnP standards having embedded computing and networking capability that may be used in the device control model of FIG. 3.

With reference now to FIG. 30, a client that accesses and uses the embedded computing device 900 over the computer network has an exemplary client software architecture 950, which includes software code modules for applications 952, simple discovery 954, XML 955, LDAP 956, TCP/IP stack 958 and a network interface card (NIC) 960 that provides a physical connection to the computer network. The applications 952 is a software code module that provides a user interface features for locating desired devices (e.g., embedded computing device 900) and services on the computer network, and also user interface features to interact with the located device or service. The applications 952 can include an Internet browser, such as the Microsoft Internet Explorer, that can present the XML device description in accordance with an associated XSL style sheet for interaction with the embedded computing device and activation of its operational functionality.

The simple discovery 954 is a module that implements the above-described simple discovery per the UPnP protocol. The XML 955 is a module that processes the XML device description and XSL style sheets for presentation in the application's user interface. The LDAP 956 implements the standard LDAP directory protocol for name look-up. The TCP/IP stack 958 implements the TCP/IP protocol for communications over the computer network.

Illustrative Pervasive Computing Environment

FIG. 31 illustrates a pervasive computing environment 1000, such as may be installed in a home, office or public place, which includes a large number of embedded computing devices, such as the illustrated device 900 (FIG. 26). The pervasive computing environment 1000 includes personal computers 1002, 1004 (e.g., of the type shown in FIG. 25) connected via a local area network (LAN) 1006. The PC 1002 is connected via a universal serial bus 1016 to a telephone modem 1010, XDSL interface 1011 or a cable modem 1012, which in turn provide a connection with the computer network, e.g., the Internet.

Various embedded computing devices also connect to the computer network via various network connections to the PCs 1002, 1004. These include an audio device 1014 (e.g., speakers, radio tuner, microphone), and printer 1015 which connect to the PC 1004 through a USB 1017. Also, a digital camera 1020, a handheld PC (H/PC) 1021 and another personal computing device 1022 connect via an infrared port (IRDA) 1024, which also attaches to the PC 1004 through the USB 1017. Also, lighting switches 1030 and like home appliances are connected via an A/C power line-based networking 1032 to the PC 1002. Further, a chain of IEEE 1394 cables 1048 connect a digital TV 1040, DVD player 1041, digital video camcorder (DV/DVC) 1042, an audio device 1043 (e.g., CD player/recorder, radio receiver, amplifier, and like audio system component), and a game console 1044. Devices, such as a portable telephone 1050 and remote control 1051, have a radio frequency network connection with the PC 1004.

With their various inter-networked connections, the embedded computing devices are "visible" and accessible from a client device 950 (FIG. 31) also connected to the computer network.

Contract Definition Language

Overview

Contracts describe the public behavior of UPnP devices, and alternatively of other entities on the Web (reachable via HTTP, mostly) or other computer network that react to and emit messages. The Contract is written in a Contract Definition Language (CDL). The messages for the most part are structured documents, e.g., in XML. The messages may also be HTML pages, streaming media, images or other datatypes.

The contract will describe the following attributes:

end-point (well-defined name)

protocol messaging patterns delivery characteristics payloads

All of these attributes may not be present in the contract as some of them (the end-point, for instance) may not be available at development time.

Protocol Description

Entities on the Web can be accessed using multiple protocols: HTTP, GENA, SMTP, FTP, MSMQ, . . . This section discusses how the protocol bindings are explicitly declared. The templates for describing the protocol use the format:

```
<protocol>
    <HTTP>
        // HTTP specific settings go here
    </HTTP>
</protocol>
<protocol>
    <HTTP>
        // GENA specific settings go here
    </HTTP>
</protocol>
```

The "protocol" element may have an "id" attribute. This is useful when multiple messaging patterns will use the same protocol definition. This will be covered in more detail below.

For the sake of convenience, we only cover HTTP-based protocols here. Extending this model to cover the other protocols is straightforward.

HTTP
GET
```
<protocol>
    <HTTP version="1.0">
        <GET/>
            <URL> http://neteye.local/fullsize.jpg
            </URL>
    </HTTP></protocol>
```
GET with query string
```
<protocol>
    <HTTP version="1.1">
        <GET/>
        <URL> http://search.yahoo.com/bin/search
        </URL>
        <QUERY name="pattern" required="yes" />
        <QUERY name="limit" value="50" required="no" />
        <QUERY name="xml" value="yes" required="yes" />
    </HTTP>
</protocol>
```

This description indicates that the following are valid URLs:

http://search.yahoo.com/bin/search?pattern=Rio+player&limit=50&xml=yes http://search.yahoo.com/bin/search?xml=yes&pattern=Rio+player The reason for not associating the query variables with the GET verb is because it is valid to send a POST message to a URL containing query variables.

The "value" attribute for the "QUERY" element implies that the value is static—it is to be treated as a part of the URL. Declaring it this way allows the appropriate construction of the query string to be handled by the caller.

POST
```
<protocol>
    <HTTP version="1.1">
        <URL>
http://www.amazon.com/exec/obidos/generic-quicksearch-query </URL>
        <POST>
            <PARAM name="mode" default="blended" required="yes" />
            <PARAM name="keyword-query" required="yes" />
            <PARAM name="zipcode" value="98112"
```
-continued
```
required="yes" />
        </POST>
    </HTTP>
</protocol>
```

The default attribute indicates that the parameter's value can be changed.

```
M-POST
<protocol id="protocolDef">
    <HTTP version="1.1">
        <URL> http://investor.msn.com/stockquotes.xsp
        </URL>
        <QUERY name="symbol" required="yes" />
        <M-POST>
            <MAN> http://www.upnp.org/service-control/m-post </MAN>
        </M-POST>
        <HEADER name="Content-Type" value="text/xml" />
    </HTTP>
</protocol>
```

The M-POST and the enclosed MAN elements declare the mandatory extension mechanism to be used. The optional extension mechanism can also be handled in this way.

The "HEADER" element allows the declaration of HTTP headers to be used.

GENA

Payload Description

Below is an example of an XML payload description.

```
<schema    xmlns="urn:schema-microsoft-com:xml-data"
           xmlns:dt="urn:schema-microsoft-com:datatypes">
//
// symbol: a ticker symbol
//
<ElementType name="symbol" dt:type="string" />
//
// symbols: array of "symbol" elements
//
<ElementType name="symbols">
    <element type="symbol" maxOccurs="*" />
</ElementType>
//
// stockQuote: quote details
//
<ElementType name="stockQuote">
    <element type="company" />
    <element type="ticker" />
    <element type="previousClose" />
    <element type="openingTrade" />
    <element type="lastTrade" />
    <element type="volume" />
</ElementType>
<ElementType dt:type="string" name="company" />
<ElementType dt:type="string" name="ticker" />
<ElementType dt:type="string" name="previousClose" />
<ElementType dt:type="string" name="openingTrade" />
<ElementType dt:type="string" name="lastTrade" />
<ElementType dt:type="string" name="volume" />
//
// stockQuotes: array of "stockQuote" elements
//
<ElementType name="stockQuotes">
    <element name="stockQuote" maxOccurs="*" />
</Element>
//
```

```
-continued

// error: error info
//
<ElementType name="error">
    <element type="reason" />
</ElementType>
<ElementType dt:type="string" name="reason" />
</schema>
```

Using this declaration, the below are valid XML fragments:

```
<symbol> MSFT </symbol>
<symbols>
    <symbol> MSFT </symbol>
    <symbol> IBM </symbol>
    <symbol> AOL </symbol>
    <symbol> YHOO </symbol>
    <symbol> AMZN </symbol>
</symbols>
<stockQuote>
    <company>Microsoft %20Corporation</company>
    <ticker>MSFT</ticker>
    <previousClose>84%2011/16</previousClose>
    <openingTrade>85%201/16</openingTrade>
    <lastTrade>84%205/16</lastTrade>
    <volume>28.66%20Mil</volume>
</stockQuote>
```

Messaging Patterns

The messaging pattern declaration acts as an anchor for pulling together the protocol, delivery characteristics and the payload information. The messaging pattern declarations can include these types.

Request/response

Solicit/response

One way

Request/response (RR). The RR pattern is named. The two samples below are equivalent mechanisms for declaring the protocol to be used for the RR messaging pattern. The linking mechanism is useful when multiple RR pairs use the same protocol data. This is the case for UPnP. Also, a service may employ multiple protocols for achieving the same "method"-call. The "is" attribute accepts a list of ID-Refs—implying that either of the protocols are equally suitable for accessing the functionality.

```
<RequestResponse name="getimage">
    <protocol>
        <HTTP version="1.0">
            <GET/>
            <URL> http://172.30.184.20/fullsize.jpg
        </URL>
        </HTTP>
    </protocol>
    ...
</RequestResponse>
<protocol id="protocolDef1">
    <HTTP version="1.0">
        <GET/>
        <URL> http://172.30.184.20/fullsize.jpg </URL>
    </HTTP>
</protocol>
<RequestResponse name="getImage">
    <protocol is="protocolDef1" />
    ...
</RequestResponse>
```

The payloads for request, response and error, in case of XML data, are identified by the names of the elements referenced by the "is" attribute. The schema information is assumed to be in the same document. Below are examples using the two schemes:

```
<RequestResponse name="getQuote">
    // protocol declaration goes here
    <in       is="symbol" />
    <out      is="stockQuote" />
    <error    is="error" />
</RequestResponse>
<RequestResponse name="getQuote"
    xmlns:f="http://electrocommerce.org/finance.xml"
    xmlns:c="http://electrocommerce.org/common.xml"
>
    // protocol declaration goes here
    <in       is="f:symbol" />
    <out      is="f:stockQuote" />
    <error    is="c:error" />
</RequestResponse>
```

The CDL described herein keeps the element declarations in the "schema" block rather than sprinkle them in with the messaging pattern definitions. The reasons for this are:

Re-use of element declarations is easy.

We can re-use fragment validation support as is.

Keeping schemas in one place is consistent with the use of in-line schemas in SQLI2 and ADO.

In case the request or response are not XML documents but HTML documents, or binary files, the following syntax will be used. The contained element defines the nature of the data. The use of MIME is not in the HTTP-specific sense but in the "nature of the payload" sense. The presence of the "is" attributes indicates that the MIME type is "text/xml."

```
<RequestResponse name="getImage">
    ...
    <out>
        <mime type="image/jpeg"/>
    </out>
    ...
</RequestResponse>
```

Delivery Characteristics

The contract may specify the delivery characteristics (sometimes also referred to as quality of service) required or supported by the server. Examples are:

Ordered, best-effort

Guaranteed delivery

Fire-and-forget

Exactly once

At least once

Transactional

EXAMPLE

FIGS. 45–47 depict an exemplary contract for interacting with a stock quote Service.

FIGS. 48–51 depict an XML schema for defining Contracts.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A dynamically self-bootstrapping computing device comprising:
    addressing means at the computing device for self-assigning an address for the computing device on an ad hoc network by selecting an address from a reserved range of addresses, pinging the selected address on the ad hoc network, and absent response to said pinging assigning the selected address to the computing device;
    announcing means at the computing device for multi-casting an announcement message on a multi-cast communications channel of the ad hoc network informing of the computing device's assigned address;
    discovery means at the computing device for listening on the multi-cast communications channel of the ad hoc network for a discovery message sent from a discovery client inquiring for a device type of the computing device;
    discovery response means at the computing device for sending a response message responsive to the discovery message identifying the computing device; and
    description means at the computing device responsive to a description request received by the computing device on the ad hoc network for sending a peer-accessible description message dynamically defining interaction via data messaging with the computing device to remotely operate the computing device over the ad hoc network.

2. The dynamically self-bootstrapping computing device of claim 1 wherein the description message further contains presentation data defining a user interface for remote presenting on another computing device for remotely operating the computing device over the ad hoc network.

3. The dynamically self-bootstrapping computing device of claim 2 wherein the description message further contains a link to style sheet data for defining separate views of the presentation data on said other computing device.

4. The dynamically self-bootstrapping computing device of claim 1 wherein the description message is formatted according to a mark-up language.

5. The dynamically self-bootstrapping computing device of claim 1 wherein the response message comprises a link to the description message.

6. The dynamically self-bootstrapping computing device of claim 1 wherein the response message comprises a device type identifier of the computing device.

7. The dynamically self-bootstrapping computing device of claim 1 wherein the computing device has a predetermined name, and the announcement message contains the predetermined name.

8. The dynamically self-bootstrapping computing device of claim 1, wherein the description message defining interaction identifies a protocol to interact with the computing device and defines a data packet to exchange control information.

9. A method of dynamically configuring a computing device, comprising:
    self-assigning an address for the computing device on an ad hoc network by selecting an address from a reserved range of addresses, pinging the selected address on the ad hoc network, and absent response to said pinging assigning the selected address to the computing device;
    announcing on a multi-cast communications channel of the ad hoc network the computing device's assigned address;
    listening at the computing device on the multi-cast communications channel of the ad hoc network for a discovery message inquiring for a device type of the computing device;
    sending a response message responsive from the computing device to the discovery message identifying the device type of the computing device;
    receiving a description request message at the computing device responsive to the response message; and
    responding from the computing device to the description request message by sending a peer-accessible description message dynamically defining interaction with the computing device to control operational functions of the computing device over the ad hoc network.

10. The method of claim 9, further comprising terminating the interaction with the computing device to control operational function of the computing device.

11. The method of claim 9 wherein the description message further contains presentation data defining a user interface for remote presenting on another computing device for remotely operating the computing device over the ad hoc network.

12. The method of claim 11 wherein the description message further comprises a link to style sheet data for defining separate views of the presentation data on said other computing device.

13. The method of claim 9 wherein the description message is formatted according to a mark-up language.

14. The method of claim 9 wherein the response message comprises a link to the description message.

15. The method of claim 9 wherein the computing device has a predetermined name, and the announcement message contains the predetermined name.

16. The method of claim 9, wherein sending a response message responsive to the discovery message further comprises identifying the address assigned to the computing device.

17. The method of claim 16, further comprising specifying a device-specific protocol of data messages for interacting with the computing device.

18. The method of claim 9, wherein the description message defining interaction identifies a protocol to interact with the computing device and defines a data packet to exchange control information.

* * * * *